United States Patent
Schibler et al.

(10) Patent No.: US 10,756,995 B2
(45) Date of Patent: *Aug. 25, 2020

(54) METHOD, APPARATUS AND SYSTEM FOR REAL-TIME OPTIMIZATION OF COMPUTER-IMPLEMENTED APPLICATION OPERATIONS USING MACHINE LEARNING TECHNIQUES

(71) Applicant: Datagrid Systems, Inc., Redwood City, CA (US)

(72) Inventors: Ross Schibler, Los Altos Hills, CA (US); Peter Nickolov, Belmont, CA (US); Stephen Quintero, Desert Hot Springs, CA (US)

(73) Assignee: Datagrid Systems, Inc., Los Altos Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,516

(22) Filed: Jun. 9, 2019

(65) Prior Publication Data
US 2019/0312800 A1     Oct. 10, 2019

Related U.S. Application Data

(63) Continuation-in-part of application No. 16/197,273, filed on Nov. 20, 2018, now Pat. No. 10,608,911, which is a continuation of application No. 15/219,789, filed on Jul. 26, 2016, now Pat. No. 10,142,204.

(60) Provisional application No. 62/682,869, filed on Jun. 9, 2018, provisional application No. 62/197,141, filed on Jul. 27, 2015.

(51) Int. Cl.
*H04L 29/06* (2006.01)
*H04L 12/26* (2006.01)
*H04L 12/24* (2006.01)
*G06F 8/65* (2018.01)
*G06F 8/658* (2018.01)

(52) U.S. Cl.
CPC .......... *H04L 43/0817* (2013.01); *G06F 8/65* (2013.01); *H04L 41/0869* (2013.01); *H04L 63/1433* (2013.01); *G06F 8/658* (2018.02)

(58) Field of Classification Search
CPC ................................................. H04L 43/0817
See application file for complete search history.

(56) References Cited

U.S. PATENT DOCUMENTS 9,239,750 B1 * 1/2016 Lakshminarayanan ..................... H04N 21/42209
10,142,204 B2   11/2018 Nickolov et al.
(Continued)

FOREIGN PATENT DOCUMENTS

WO     2017019684 A1    2/2017

OTHER PUBLICATIONS

PCT International Search Report, PCT Application No. PCT/US2016/044040 based on U.S. Appl. No. 15/219,789, International Filing Date Jul. 26, 2016, Search report dated Oct. 5, 2016.

*Primary Examiner* — Adnan M Mirza
(74) *Attorney, Agent, or Firm* — Wolf IP Law PLCC; Dean E. Wolf, Esq.

(57) ABSTRACT

Various aspects described or referenced herein are directed to different methods, systems, and computer program products for facilitating real-time optimization of computer-implemented application operations using machine learning techniques.

33 Claims, 19 Drawing Sheets

(56) References Cited

U.S. PATENT DOCUMENTS

| | | |
|---|---|---|
| 2011/0289517 A1 | 11/2011 | Sather et al. |
| 2012/0117203 A1 | 5/2012 | Taylor et al. |
| 2014/0012945 A1 | 1/2014 | Barnhill, Jr. et al. |
| 2015/0088772 A1 | 3/2015 | Shwartz et al. |
| 2017/0257303 A1* | 9/2017 | Boyapalle ............... H04L 67/34 |

* cited by examiner

```
application:
  components:
    c1:                                    # component name
      index: 1                             # index of comp for application state
      label: component #1
      settings:                            # settings to optimize
        cpu:                               # setting name
          index:       1                   # index of comp setting for app state
          type:        range               # type of setting
          delta:       0.2                 # delta for changing setting value
          min_delta:   0.01                # minimum delta
          min:         0.1                 # minimum setting value
          max:         3.0                 # maximum setting value
          step:        0.01                # delta must be integer multiple of step
          value:       0.25                # current setting value
        mem:
          index:       2
          type:        range
          delta:       0.2
          min_delta:   0.01
          min:         0.1
          max:         3.0
          step:        0.01
          value:       0.25
    c2:
      index: 2
      label: component #2
      settings:
        cpu:
          index:       1
          type:        range
          delta:       0.2
          min_delta:   0.01
          min:         0.1
          max:         3.0
          step:        0.01
          value:       0.25
        mem:
          index:       2
          type:        range
          delta:       0.2
          min_delta:   0.01
          min:         0.1
          max:         3.0
          step:        0.01
          value:       0.25
measurement:
  control:                                 # measure driver configuration
    load:                                  # load to generate during measurement
      test_url:    "http://c2:8080/"       # apache benchmark target URL
      n_threads:   10                      # load concurrency - default 10
      n_requests:  1500                    # total num of requests - default 2000
  metrics:                                 # set of operational metrics
    throughput:                            # metric name
      value:    103.2                      # current metric value
      unit:     "requests/second"          # metric units
    time_per_request:
      value:    0.105
      unit:     seconds
```

Fig. 4                                                                    —400

```
        driver_config:                              # initial driver config
          run_type:           optimization          # this is an optimization run
          perf_def:           throughput            # use throughput metric for perf
          cost_model:         resource              # cpu+mem resource costing
          score_def:                                # scoring function specification
            method:           perf_power            # use: (perf**power) / cost
            power:            1.25                  # exponent of scoring method
          perf_precision:     4.20159237            # performance precision
          perf_normalization: 0.01134624            # perf normalization coefficient
          cost_normalization: 27.47482902           # cost normalization coefficient
          first_batch:        exploring             # first named batch to sequence
        batches:                                    # set of named batches
510 ──▶    exploring:                               # batch name
            driver_config:                          # driver configuration
              set_best:       true                  # batch end: set best score state
511 ──▶       next_batch:     exploiting            # next named batch to run
              deduplication:  1                     # deduplicate: 1 measurement/state
            opt_config:                             # optimization controller config
512 ──▶      reinforced_learning:                   # RL configuration
              epsilon:        0.5                   # random action probabilty
              epsilon_decay:  0.002                 # per epoch epsilon decay
              gamma:          0.6                   # discount factor
              max_epoch:      100                   # batch termination condition
514 ──▶     ouch:                                   # ouch configuration
              threshold:      3.0                   # threshold value for ouch
520 ──▶   exploiting:                               # batch name
            driver_config:
              set_best:       true
521 ──▶       next_batch:     monitoring
              deduplication:  1
            env_config:                             # environment controller config
              application:                          # batch override descriptor
                components:
                  c1:                               # component name
                    settings:                       # settings to optimize
                      cpu:                          # setting name
                        delta:  0.1                 # delta for changing setting value
                      mem:
                        delta:  0.1
                  c2:
                    settings:
                      cpu:
                        delta:  0.1
                      mem:
                        delta:  0.1
            opt_config:
522 ──▶      reinforced_learning:
              epsilon:        0.3
              epsilon_decay:  0.002
              gamma:          0.3
              max_epoch:      100
524 ──▶     ouch:
              threshold:      2.0
530 ──▶   monitoring:
            driver_config:
              set_best:       true
              next_batch:     exploring
              deduplication:  0                     # do not deduplicate
            opt_config:                             # optimization controller config
              monitor:                              # monitor configuration
                baseline_iterations: 3              # num measurements for baseline
                threshold:      3.0                 # threshold value for monitor
```

Fig. 5

```
batches:                                    # set of named batches
  size-count:                               # optimize size-count (pin JVM)
    driver_config:                          # driver configuration
      set_best:        true                 # batch end: set best score state
      next_batch:      jvm                  # next named batch to run
      deduplication:   1                    # deduplicate: 1 measurement/state
    opt_config:                             # optimization config
      shuffle:         {reinforced_learning: 50, Evolutionary: 50}  # weights
      terminate_on_all: [reinforced_learning, cma_es]

optimizers:                           # config for optimization controllers
        reinforced_learning:                # RL config
          epsilon:         0.6
          epsilon_decay:   0.002
          max_epoch:       100
          ouch:                             # ouch threshold config
            threshold:     2.0
        cma_es:                             # Evolutionary config: tolerance controls
          tol:             0.2              # convergenge determination
    env_config:                             # environment controller config
      application:                          # override of app desc
        components:
          c1:
            settings:                       # pin component c1 JVM settings, but
              replicas:                     # optimize the resource/replicas
                pinned:   false             # settings
              cpu:
                pinned:   false
              mem:
                pinned:   false
              GCType:
                value:    G1GC              # pinned value for GCType
                pinned:   true jvm:                                      # optimize JVM settings (pin size-count)
    driver_config:                          # driver configuration
      set_best:        true                 # batch end: set best score state
      deduplication:   1                    # deduplicate: 1 measurement/state
    opt_config:
      shuffle:              {bruteforce: 1} # weights of optimization controllers
      terminate_on_any:     [bruteforce]    # end batch when bruteforce is done env_config:
      application:
        components:
          c1:
            settings:                       # pin component c1 resources/replicas
              replicas:                     # but optimize the JVM settings
                pinned:   true
              cpu:
                pinned:   true
              mem:
                pinned:   true
              GCType:                       # JVM garbage collector type
                pinned:   false
```

Fig. 6

METHOD, APPARATUS AND SYSTEM FOR REAL-TIME OPTIMIZATION OF COMPUTER-IMPLEMENTED APPLICATION OPERATIONS USING MACHINE LEARNING TECHNIQUES

RELATED APPLICATION DATA

The present application claims benefit, pursuant to the provisions of 35 U.S.C. § 119, of U.S. Provisional Application Ser. No. 62/682,869, titled "METHOD, APPARATUS AND SYSTEM FOR REAL-TIME OPTIMIZATION OF COMPUTER-IMPLEMENTED APPLICATION OPERATIONS USING MACHINE LEARNING TECHNIQUES", naming SCHIBLER et al. as inventors, and filed 9 Jun. 2018, the entirety of which is incorporated herein by reference for all purposes.

This application is a continuation-in-part application, pursuant to the provisions of 35 U.S.C. § 120, of prior U.S. patent application Ser. No. 16/197,273 titled "TECHNIQUES FOR EVALUATING SERVER SYSTEM RELIABILITY, VULNERABILITY AND COMPONENT COMPATIBILITY USING CROWDSOURCED SERVER AND VULNERABILITY DATA" by NICKOLOV et al., filed 20 Nov. 2018, the entirety of which is incorporated herein by reference for all purposes.

U.S. patent application Ser. No. 16/197,273 is a continuation application, pursuant to the provisions of 35 U.S.C. § 120, of prior U.S. patent application Ser. No. 15/219,789 titled "TECHNIQUES FOR EVALUATING SERVER SYSTEM RELIABILITY, VULNERABILITY AND COMPONENT COMPATIBILITY USING CROWDSOURCED SERVER AND VULNERABILITY DATA" by NICKOLOV et al., filed 26 Jul. 2016, the entirety of which is incorporated herein by reference for all purposes. U.S. patent application Ser. No. 15/219,789 claims benefit, pursuant to the provisions of 35 U.S.C. § 119, of U.S. Provisional Application Ser. No. 62/197,141, titled "TECHNIQUES FOR EVALUATING SERVER SYSTEM RELIABILITY, VULNERABILITY AND COMPONENT COMPATIBILITY USING CROWDSOURCED SERVER AND VULNERABILITY DATA", naming Nickolov et al. as inventors, and filed 27 Jul. 2015, the entirety of which is incorporated herein by reference for all purposes.

BACKGROUND

The present disclosure generally relates to computer networks. More particularly, the present disclosure relates to techniques for implementing and facilitating optimization of computer-based applications in live, runtime production environments using machine learning techniques.

Many modern computer-based applications are deployed as collections of virtual infrastructure. For example, an application may be deployed as a collection of one or more virtual machines where at least one virtual machine contributes some of the overall application functionality, e.g., by providing database services, or serving web content, or providing a REST API interface. Such an application may be deployed on a private cloud or using a public cloud service such as Amazon AWS, Microsoft Azure, or Google Cloud Platform.

In general, the problem of optimizing the runtime configuration of an application is a difficult one, one whose difficulty increases with the complexity of the application (e.g., the number of components, and the number of settings of these components which may vary, such as resource assignments, replica count, tuning parameters or deployment constraints). By optimizing is here meant the determination of the settings of an application which best meet performance or service level objectives for a given application which is running in a live, runtime production environment, while generally minimizing cost (or minimizing the provisioning of unutilized/underutilized resources).

For practical examination, one may distinguish two types of application optimization, here termed continuous and discrete. Continuous optimization involves the ongoing optimization of a production application under live load (which may reflect cycles of usage as well as short or long term trends), while the application itself may also change through updates to component images, or even updates to the application architecture. Discrete optimization involves optimizing an application in a fixed environment such as a test bed or staging environment where load may be generated and controlled, and where the application components are also fixed (e.g., the VM or container image from which a component is instantiated is fixed during optimization, but the component instantiation is mutable through component settings).

Historically, optimization of even a single independent component is a non-trivial and error-prone task performed manually by a person with domain specific expertise. A multi-component application has complex interactions and limiting relations among its components, making their optimization as a harmonious system extremely difficult to achieve. The use of containerized microservices exacerbates this problem by increasing the number of application components which may need to be optimized together, increasing the dimensionality of the problem space. Often times, people may make their best guess at resource assignments for application components, test and tweak these settings a few times when first deploying the application, and leave it at that. As the application changes over time, and as the load on that application changes over time, the task of optimization may likely not be revisited until there is a performance problem, or until the cost becomes an obstacle.

An appreciation for why optimization is a difficult problem follows from an assessment of the size of the problem space. For example, if an application is comprised of five components, and at least one of these components has three settings which define its runtime configuration (e.g., CPU, memory, and network bandwidth resource assignments), and at least one setting varies through a range of 20 possible values, then there are $20^{15}$ (more than 30 quintillion) different runtime configurations in this 15-dimensional problem space. The exhaustive, or bruteforce, enumeration and assessment of some or all these combinations is impractical.

Accordingly, one objective of the present disclosure is to provide one or more automated techniques for implementing continuous optimization of computer-based applications, particularly applications running in live, runtime production environments.

BRIEF DESCRIPTION OF THE DRAWINGS

FIG. 4 shows an example embodiment of an application descriptor 400 which may be provided as input to one or more optimization run(s).

FIG. 5 shows an example embodiment of an optimization descriptor 500 which may be provided as input to one or more optimization run(s).

FIG. 6 shows an example embodiment of a hybrid/blended optimization descriptor 600 which may be provided as input to one or more optimization run(s).

DETAILED DESCRIPTION OF EXAMPLE EMBODIMENTS

Overview

Figure 1:
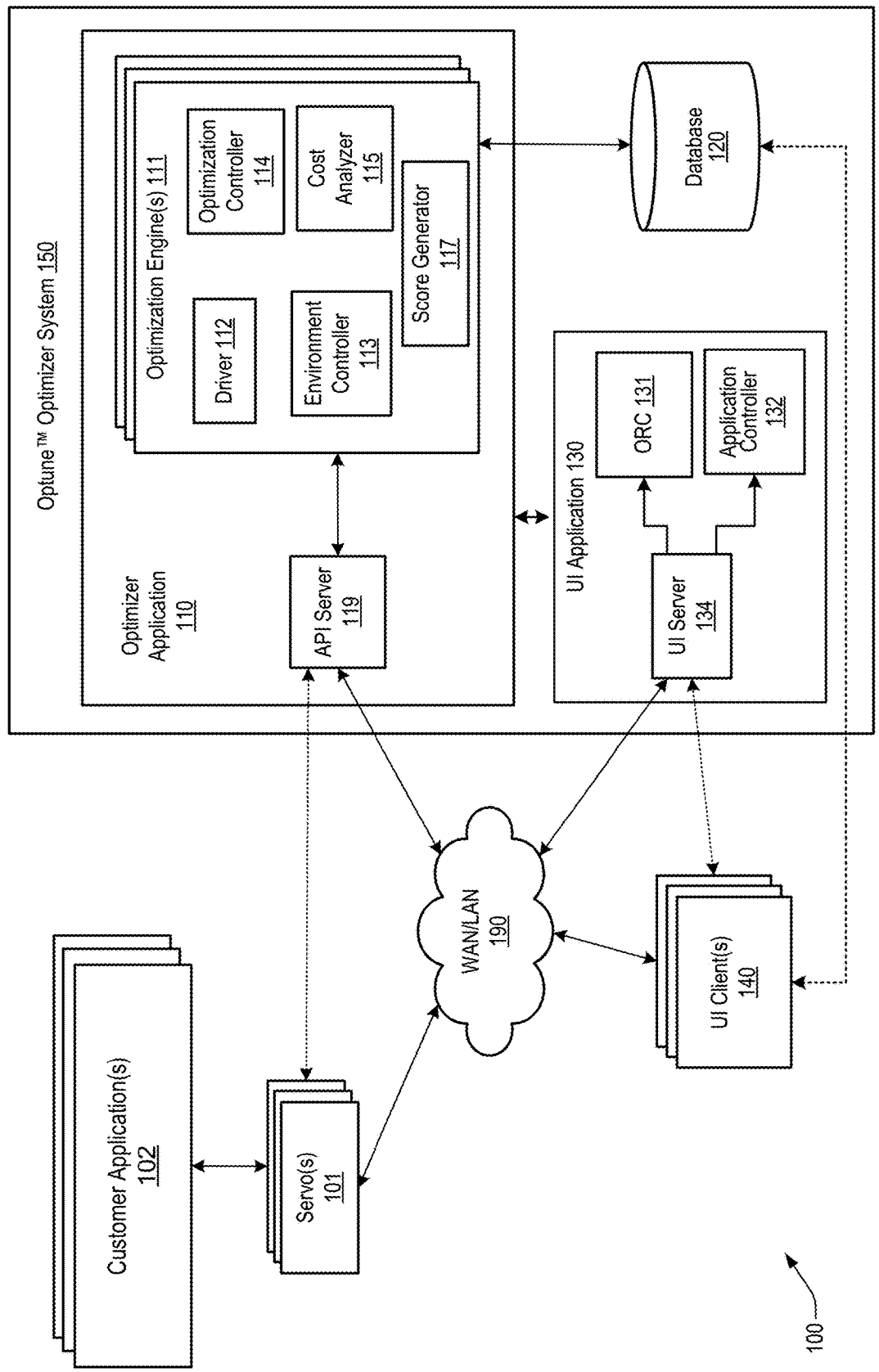
FIG. 1 illustrates an example embodiment of a functional block diagram of a network portion 100 which may be used for implementing various aspects/features described herein.

Various aspects described herein are directed to different services, methods, systems, and computer program products (collectively referred to herein as "Optune™ technology" or "Optune™ techniques") for implementing real-time optimization of computer-implemented application operations using machine learning techniques and/or other techniques (such as, for example, Q-Learning, Heuristic, Algorithmic, etc.).

One aspect disclosed herein is directed to different methods, systems, and computer program products for evaluating and scoring applications with respect to different types of criteria and/or metrics. In at least one embodiment, various method(s), system(s) and/or computer program product(s) may be operable to cause at least one processor to execute a plurality of instructions for: using as an optimization objective a scoring, or fitness, function which in a simplistic form may be expressed as the ratio of performance raised to exponent over cost ((perf^w1)/cost). This allows one to control, using the exponent, where on the simple perf/cost curve the optimization objective is pointed (e.g., where on the saturation curve of a sigmoid function). In practical terms, this provides the ability for a user or system to configure a weighted degree of preference between performance and cost (e.g., using a slider in a UI). The general form of this function allows for separately normalizing performance and cost, normalizing a particular score to a particular value (e.g., normalize such that the score of the first runtime configuration is 0), and scaling the exponential scores into a usable/fixed range.

Other embodiments are directed to various method(s), system(s) and/or computer program product(s) for causing at least one processor to execute a plurality of instructions for real-time optimizing of live applications (e.g., maximizing/minimizing a selected set of metrics/criteria, such as, for example, maximizing performance, as measured by a set of selected metrics, and minimizing cost, as measured by the application's costable resources such as cpu or memory resources) using reinforced learning (e.g., Q-learning using a neural network), as well as a variety of heuristic or algorithmic techniques. According to different embodiments, an application may be characterized as a system of one or more components (virtual or non-virtual).

In at least some embodiments, one or more different application settings may be dynamically adjusted (e.g., optimized) (any of the application's mutable runtime configuration), to dynamically accomplish/implement one or more of the following (and/or combinations thereof):

vertical resource scaling adjustment(s),
horizontal scaling adjustment(s), and/or,
parameter tuning adjustment(s).

Example List of types of application settings that may be dynamically adjusted may include various types of resources provided to any virtual machine or container, such as, for example, one or more of the following (and/or combinations thereof):

CPU cores,
memory,
network bandwidth,
number of replicas (copies) of a component deployed,
etc.

Some application components may also scale horizontally by increasing or decreasing the number of copies, or replicas, of that component which are running (e.g., a horizontally scalable web tier in an N-tier application). Operational parameters of application components may also be changed (e.g., the number of Apache worker threads, or MySQL memory pool size, or kernel tuning parameters such as TCP buffer size or the use of transparent huge pages). Deployment constraints may also be changed (e.g., co-locating VM components on the same physical machine, or container components on the same host). Taken together, the mutable runtime configuration of an application or its components is here termed settings, as in application settings or component settings. As used here, the term application settings may be taken to include both application wide settings (such as availability zone in which to deploy the application) and component specific settings (such as resource assignments).

At least one aspect disclosed herein is directed to different methods, systems, and computer program products for optimizing a mutable runtime configuration of a first application hosted at a remote networked environment that is communicatively coupled to a computer network. In at least one embodiment, the computer network includes an Optimizer System configured to store or access a first set of optimizer algorithms. In at least one embodiment, various method(s), system(s) and/or computer program product(s) may be operable to cause at least one processor to execute a plurality of instructions stored in non-transient memory to: cause at least one network device to initiate a first measurement of a first operational metric of the first application while the first application is operating in accordance with a first runtime configuration; cause the at least one network device to transmit first measurement information to the Optimizer System, where the first measurement information relates to the first measurement of the first operational metric of the first application; calculate, using the first measurement information, a first score in relation to a first optimization objective, the first score being calculated using a first scoring function; determine, at the Optimizer System, a first set of updated application settings relating to the mutable runtime configuration of the first application; cause, using the at least one network device, the first set of updated application settings to be deployed at the first application to thereby cause the first application to operate in accordance with a second runtime configuration; cause the at least one network device to initiate a second measurement of the first operational metric of the first application while the first application is operating in accordance with the second runtime configuration; cause the at least one network device to transmit second measurement information to the Optimizer System, where the second measurement information relates to the second measurement of the first operational metric of the first application; calculate, using the second measurement information, a second score in relation to the first optimization objective, the second score being calculated using the first scoring function; compute, using the second and first scores, a first reward; update the first set of optimization algorithms using information relating to the first reward; select, from the first set of optimization algorithms, a first optimization algorithm to be used for determining a second set of updated application settings relating to the mutable runtime configuration of the first application; determine, using the first optimization algorithm, a second set of updated application settings relating to the mutable runtime configuration of the first application; cause, using the at least one network device, the second set of updated application settings to be deployed at the first application to thereby cause the first application to operate in accordance with a third runtime configuration; cause the at least one network device to initiate a third measurement of the first operational metric of the first application while the first application is operating in accordance with the third runtime configuration; cause the at least one network device to transmit third measurement information to the Optimizer System, where the third measurement information relates to the third measurement of the first operational metric of the first application; calculate, using the third measurement information, a third score in relation to the first optimization objective, the third score being calculated using the first scoring function; compute, using the second and third scores, a second reward; update the first set of optimization algorithms using information relating to the second reward; select, from the first set of optimization algorithms, a second optimization algorithm to be used for determining a third set of updated application settings relating to the mutable runtime configuration of the first application; determine, using the second optimization algorithm, a third set of updated application settings relating to the mutable runtime configuration of the first application; cause, using the at least one network device, the third set of updated application settings to be deployed at the first application to thereby cause the first application to operate in accordance with a fourth runtime configuration; and determine, at the Optimizer System, if additional cycles of optimization adjustment are to be performed for the first application.

In at least one embodiment, if it is determined that additional cycles of optimization adjustment are to be performed for the first application, various method(s), system(s) and/or computer program product(s) may be further operable to cause at least one processor to execute additional instructions to: cause the at least one network device to initiate a fourth measurement of the first operational metric of the first application while the first application is operating in accordance with the fourth runtime configuration; cause the at least one network device to transmit forth measurement information to the Optimizer System, where the fourth measurement information relates to the fourth measurement of the first operational metric of the first application; calculate, using the fourth measurement information, a fourth score in relation to the first optimization objective, the fourth score being calculated using the first scoring function; compute, using the third and fourth scores, a third reward; update the first set of optimization algorithms using information relating to the third reward; select, from the first set of optimization algorithms, a third optimization algorithm to be used for determining a fourth set of updated application settings relating to the mutable runtime configuration of the first application; determine, using the third optimization algorithm, a fourth set of updated application settings relating to the mutable runtime configuration of the first application; and cause, using the at least one network device, the fourth set of updated application settings to be deployed at the first application to thereby cause the first application to operate in accordance with a fifth runtime configuration.

In at least one embodiment, the at least one network component includes a servo component deployed at the remote networked environment and configured or designed to implement instructions received from the Optimizer System, and to initiate interactions with the first application in response to the received instructions.

In at least one embodiment, the at least one network component includes a servo component deployed at the Optimizer System and configured or designed to implement instructions generated by the Optimizer System and to initiate interactions with the first application in response to the instructions.

Additional method(s), system(s) and/or computer program product(s) may be further operable to cause at least one processor to execute additional instructions to: calculate, using the first measurement information, a first performance indicator of the first application, the first performance indicator being representative of a first performance of the first application while operating in accordance with the first runtime configuration; calculate, using information relating to the first runtime configuration, a first cost indicator of the first application, the first cost indicator being representative of a first cost of resources utilized for operating the first application in accordance with the first runtime configuration; wherein the first score is calculated using the first performance indicator and first cost indicator; calculate, using the second measurement information, a second performance indicator of the first application, the second performance indicator being representative of a second performance of the first application while operating in accordance with the second runtime configuration; calculate, using information relating to the second runtime configuration, a second cost indicator of the first application, the second cost indicator being representative of a second cost of resources utilized for operating the first application in accordance with the second runtime configuration; and wherein the second score is calculated using the second performance indicator and second cost indicator. In some embodiments, the first reward may correspond to the second score. In other embodiments, the first reward may be calculated based on a comparison of the second score and the first score.

Additional method(s), system(s) and/or computer program product(s) may be further operable to cause at least one processor to execute additional instructions to: calculate, using the first measurement information, a first performance measurement of the first application; calculate, using information relating to the first runtime configuration, a first cost of the application; wherein the first score is calculated using the first performance measurement and first cost; and wherein the first scoring function corresponds to a scoring function selected from a group consisting of: performance measurement/cost; performance measurement$^{W1}$/cost, where W1 represents a weighted value; performance measurement, where cost is represented as constant; performance measurement bounded by a maximum cost; and cost while maintaining a minimum performance measurement value.

In at least one embodiment, at least one set of updated application settings may be selected from a group consisting of: at least one virtual machine associated with the first application; at least one container associated with the first application; at least one CPU core associated with the first application; at least one memory associated with the first application; network bandwidth associated with the first application; at least one provisioned disk IOPS associated with the first application; at least one resource setting associated with the first application; and number of replicas of a component deployed at the first application.

In at least one embodiment, the at least one set of updated application settings is selected from a group consisting of: the number of Apache worker threads associated with the first application; My SQL memory pool size associated with the first application; kernel tuning parameters associated with the first application; number of virtualized components of the first application which are co-located on a same physical machine; and number of virtualized container components of the first application which are co-located on a same host.

In at least one embodiment, the at least one selected optimization algorithm corresponds to a reinforced learning algorithm configured or designed to employ Q-learning using a neural network as a Q function.

In at least one embodiment, the first optimization algorithm corresponds to a first type of optimization algorithm selected from a group consisting of: a reinforced learning algorithm configured or designed to employ Q-learning using a neural network as a Q function, a Bayesian algorithm, an Evolutionary algorithm, an Ouch heuristic algorithm, a Stochastic algorithm, and a Bruteforce algorithm; the second optimization algorithm corresponds to a second type of optimization algorithm selected from a group consisting of: a reinforced learning algorithm configured or designed to employ Q-learning using a neural network as a Q function, a Bayesian algorithm, an Evolutionary algo-rithm, an Ouch heuristic algorithm, a Stochastic algorithm, and a Bruteforce algorithm; and the first type of optimization algorithm is different from the second type of optimization algorithm.

Additional method(s), system(s) and/or computer program product(s) may be further operable to cause at least one processor to execute additional instructions to cause at least one set of updated application settings to be deployed at the first application while the first application is running in a live production environment.

Additional method(s), system(s) and/or computer program product(s) may be further operable to cause at least one processor to execute additional instructions to cause at least one set of updated application settings to be deployed at the first application while the first application is running in a test bed environment.

Additional method(s), system(s) and/or computer program product(s) may be further operable to cause at least one processor to execute additional instructions to cause at least one set of updated application settings to be deployed at the first application while the first application is running in a canary environment, where score(s) may be computed by comparing the performance and cost of the canary deployment (which is adjusted) relative to the performance and cost of the non-canary deployment(s) of the application (which are not adjusted to any new runtime configuration).

In at least one embodiment, various method(s), system(s) and/or computer program product(s) are configured or designed to include functionality for enabling continuous optimization of the first application to be implemented as a SaaS service which is configured or designed to utilize the Optimizer System to remotely and securely optimize the first application.

Various objects, features and advantages of the various aspects described or referenced herein will become apparent from the following descriptions of its example embodiments, which descriptions should be taken in conjunction with the accompanying drawings.

Specific Example Embodiments

Various aspects described herein are directed to different services, methods, systems, and computer program products (collectively referred to herein as "Optune™ technology" or "Optune™ techniques") for evaluating server system reliability, vulnerability and component compatibility using crowdsourced server and vulnerability data; for generating automated recommendations for improving server system metrics; and for automatically and conditionally updating or upgrading system packages/components.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) is described with reference to one or more particular embodiments or Figures that form a part of the present disclosure, and in which are shown, by way of illustration, specific embodiments of one or more of the invention(s). It should be understood, however, that such features are not limited to usage in the one or more particular embodiments or Figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s). Further, although process steps, method steps, algorithms or the like is described in a sequential order, such processes, methods and algorithms may be configured to work in alternate orders. In other words, any sequence or order of steps that is described in this patent application does not, in and of itself, indicate a requirement that the steps be performed in that order. The steps of described processes may be performed in any order practical. Further, some steps is performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) is used in place of a single device/article. Similarly, where more than one device or article is described (whether or not they cooperate), it will be readily apparent that a single device/article is used in place of the more than one device or article. The functionality and/or the features of a device is alternatively embodied by one or more other devices that are not explicitly described as having such functionality/features. Thus, other embodiments of one or more of the invention(s) need not include the device itself. Techniques and mechanisms described herein will sometimes be described in singular form for clarity. However, it should be noted that particular embodiments include multiple iterations of a technique or multiple instantiations of a mechanism unless noted otherwise.

As noted above, many modern computer-implemented applications are deployed as collections of virtual infrastructure. For example, an application may be deployed as a collection of one or more virtual machines where at least one virtual machine contributes some of the overall application functionality, e.g., by providing database services, or serving web content, or providing a REST API interface. Such an application may be deployed on a private cloud or using a public cloud service such as Amazon AWS, Microsoft Azure, or Google Cloud Platform. In another example, an application may be deployed as a collection of software containers such as Docker containers.

Containers is a general term for an implementation of an operating-system-level virtualization method for running multiple isolated systems (containers) on a control host using a single kernel. Such an application may be deployed to a physical or virtual machine host, or to a collection of such hosts which together comprise a cluster, such as a Docker Swarm cluster or a Kubernetes cluster, or to a public container service such as Amazon ECS, Google Kubernetes Engine or Azure Container Service. Complex applications may span multiple clusters, and their architectures may vary from hierarchical organizations to largely independent microservices.

Virtualized applications may be readily changed. Software updates may be packaged as immutable images from which containers or virtual machines are instantiated. These images may be built and/or deployed using CI/CD tools such as Jenkins, GitLab CI or Skopos, furthering the automation of the application development/operations lifecycle, and shortening the time from code commit to production deployment. Similarly, changes in application architecture (in a general sense, changes to the set of VM or container components comprising the application, or to their relations or dependencies) may be rolled out or rolled back.

It is not just the immutable infrastructure underlying virtualized applications which may be changed during the application lifecycle. The instantiation (or deployment) of this infrastructure is also readily changeable. Resources provided to any virtual machine or container—such as CPU cores, memory, or network bandwidth—may be changed, scaling the resources of that component of the application vertically. Some application components may also scale horizontally by increasing or decreasing the number of copies, or replicas, of that component which are running (e.g., a horizontally scalable web tier in an N-tier application). Operational parameters of application components may also be changed (e.g., the number of Apache worker threads, or MySQL memory pool size, or kernel tuning parameters such as TCP buffer size or the use of transparent huge pages). Deployment constraints may also be changed (e.g., co-locating VM components on the same physical machine, or container components on the same host). Taken together, the mutable runtime configuration of an application or its components may be referred to as "settings", as in application settings or component settings.

In some embodiments, the term application settings may be taken to include both application wide settings (such as availability zone in which to deploy the application) and component specific settings (such as resource assignments). In at least some embodiments, the term "settings" refers to any/all of the mutable runtime configuration of an application. So, if a setting is "replicas" then changing that setting performs horizontal scaling. If a setting is "CPU" or "VM instance type", then changing that setting performs vertical scaling. If a setting is "MySQL query cache size" then changing that setting tunes the performance of MySQL (e.g., of a MySQL component of the application). If a setting is "TCP buffer size" then changing that setting tunes the kernel (e.g., of a component of the application).

In general, the problem of optimizing the runtime configuration of an application is a difficult one, one whose difficulty increases with the complexity of the application (e.g., the number of components, and the number of settings of these components which may vary, such as resource assignments, replica count, tuning parameters or deployment constraints). By optimizing is here meant the determination of the settings of an application which best meet performance or service level objectives for the application, generally while minimizing cost (or minimizing the provisioning of unutilized/underutilized resources). In practice, what is best may not be precisely determinable, but is approachable and may be converged upon.

For practical examination, we may distinguish two types of application optimization, here termed continuous and discrete. Continuous optimization involves the ongoing optimization of a production application under live load (which may reflect cycles of usage as well as short or long term trends), while the application itself may also change through updates to component images, or even updates to the application architecture. Discrete optimization involves optimizing an application in a fixed environment such as a test bed or staging environment where load may be generated and controlled, and where the application components are also fixed (e.g., the VM or container image from which a component is instantiated is fixed during optimization, but the component instantiation is mutable through component settings). Because discrete optimization may come to a conclusion, it may be suitable for optimizing an application before its production deployment, in order to determine the runtime configuration of that deployment.

Historically, optimization of even a single independent component is a non-trivial and error-prone task performed manually by a person with domain specific expertise. A multi-component application has complex interactions and limiting relations among its components, making their optimization as a harmonious system difficult to achieve. The use of containerized microservices exacerbates this problem by increasing the number of application components which may need to be optimized together, increasing the dimensionality of the problem space. Often times, people may make their best guess at resource assignments for application components, test and tweak these settings a few times when first deploying the application, and leave it at that. As the application changes over time, and as the load on that application changes over time, the task of optimization may not be revisited until there is a performance problem, or the cost becomes an obstacle.

An appreciation for why optimization is a difficult problem follows from an assessment of the size of the problem space. For example, if an application is comprised of five components, and at least one of these components has three settings which define its runtime configuration (e.g., CPU, memory, and network bandwidth resource assignments), and at least one setting varies through a range of 20 possible values, then there are $20^{15}$ (more than 30 quintillion) different runtime configurations in this 15-dimensional problem space. The exhaustive, or bruteforce, enumeration and assessment of some or all these combinations is impractical.

FIG. 1 illustrates an example embodiment of a functional block diagram of a network portion 100 which may be used for implementing various aspects/features described herein. As illustrated in the example embodiment of FIG. 1, network portion 100 may include, but are not limited to, one or more of the following hardware/software components (or combinations thereof):

Customer Application(s) 102. According to different embodiments, an application may be deployed as a collection of one or more virtual machines where at least one virtual machine contributes some of the overall application functionality, e.g., by providing database services, or serving web content, or providing a REST API interface. Such an application may be deployed at various types of subscriber environments such as, for example, on a private cloud or using a public cloud service such as Amazon AWS, Microsoft Azure, or Google Cloud Platform. In another example, an application may be deployed as a collection of software containers such as Docker containers. Containers is a general term for an implementation of an operating-system-level virtualization method for running multiple isolated systems (containers) on a control host using a single kernel. Such an application may be deployed to a physical or virtual machine host, or to a collection of such hosts which together comprise a cluster, such as a Docker Swarm cluster or a Kubernetes cluster, or to a public container service such as Amazon ECS, Google Kubernetes Engine or Azure Container Service. Complex applications may span multiple clusters, and their architectures may vary from hierarchical organizations to largely independent microservices.

Optune™ Optimizer System 150. The Optune™ Optimizer System (also referred to as the "optimizer" or the "Optimizer System") may be implemented as a networked server system which may be configured or designed to implement the backend of the Optune™ SaaS service. It is responsible for driving the optimization of customer applications through communicating with servo agents 101. For any optimization run, the Optimizer System implements a control loop for the cycles of select-update-measure, and is thus primarily responsible for the efficient optimization of applications through selecting application runtime configurations to deploy and measure, and feeding back the results of measurement to inform further selection. In at least some embodiments, the Optimizer System provides at least two customer facing interfaces: UI clients (140) interact with the optimizer through a web interface and control API exposed by the UI application (130); and servos (101) interact with the optimizer through the SaaS API 119, which is exposed to at least one servo by its associated optimizer application (110).

WAN/LAN 190, which, for example, may include local area networks (e.g., LANs) and/or wide area networks (e.g., WANs), including, for example, the Internet, cellular networks, VPNs, cloud-based networks, etc.

Servo(s) 101. In at least one embodiment, servo(s) 101 may be configured or designed to update the runtime configuration(s) of one or more customer application(s) (e.g., 102) and/or measure an application's operational metrics. Servo(s) 101 may also be configured or designed to discover the configurable settings of a customer application and its available metrics, providing these to the API server 119. In at least one embodiment, servo(s) 101 may communicate with API server 119, and may perform tasks and/or operations pursuant to instructions provided by the API server.

UI Client(s) 140: In at least one embodiment, the UI client web interface 140 allows customers to configure, start, stop or view the progress and results of optimizations runs. In at least one embodiment, the UI client gets its static content from the UI server 134 and starts or stops optimization runs using the control API of the UI server. The UI client may use the database 120 for some or all data services related to its operation (e.g., the configuration and visualization of optimization runs).

UI Application 130: In at least one embodiment, the UI application may be configured or designed to provide the customer facing web interface (e.g., UI client(s) 140) (as well as the backend 150) functionality for orchestrating the deployment of optimizer applications. In one embodiment, the UI Application may be implemented as containerized Docker application.

UI Server 134: The UI server serves static content to UI clients 140 and exposes a control API these clients may use to start or stop an optimization run. When starting an optimization run the UI server 134 may use ORC 131 to generate an optimization descriptor.

ORC 131: As instructed by the UI server 130 the optimization run constructor (ORC) generates an optimization descriptor for an optimization run. An example of an optimization descriptor is illustrated in FIG. 5.

Application Controller 132: As instructed by the UI server 130, the application controller 132 starts or stops optimizer applications. In at least one embodiment, both start and stop operations may be performed using the application controller 132.

API Server 119: The API server instructs servo(s) 101 to update or measure a customer application, and returns results to the optimization engine(s) 111.

Optimization Engine(s) 111: The optimization engine(s) control and drive forward the optimization of a customer application, yielding update and measure commands on demand to the API server 119 and saving traces of optimization runs to the database 120.

Driver 112: The driver sequences the batches of an optimization run, and for at least one batch, implements the main control loop for the optimization cycles of select, update and measure (e.g., as reflected in FIG. 8). In at least some embodiments, the driver 112 communicates with the environment controller 113 to keep application state, and communicates with the optimization controller 114 to select new application runtime configurations to assess and to feedback the results of these assessments. The driver 112 may also communicate with the API server 119 to yield update and measure commands for these assessments.

Environment Controller 113: The environment controller keeps state for the application environment and represents this state to the driver 112, and indirectly through the driver to the API server 119. Environment Controller 113 also uses the cost analyzer 115 to determine a cost for the current application state.

Optimization Controller 114: as directed by the driver 112 the optimization controller selects a next runtime configuration to assess and processes feedback from the results e.g., change in score of selections.

Cost Analyzer 115: As directed by the environment controller 113, the cost analyzer calculates and returns a cost of the current application state.

Score Generator 117: In at least one embodiment, the Score Generator may be configured or designed to dynamically generate one or more "score(s)", where each score represents an assessment of the application's current runtime configuration in relation to the optimization objective (e.g., where higher scores are better). For example, the score may be expressed as the ratio of performance over cost, so that the optimization objective is to maximize performance while minimizing cost such that this example ratio, used as the scoring or fitness function, is maximized. The difference between the score of a present step and that of the previous step is used as the reward which provides the reinforcement, through back propagation, used to train the neural network (of the Reinforced Learning optimization controller). In at least one embodiment, the operational metrics may be used to create a performance measurement of the application, and the runtime configuration may be used to create a cost measurement of the application, either or both of which may be used by the Score Generator 117 to generate a current score for the application's current runtime configuration. The ratio of performance over cost is an example of a more general form of a scoring function used by the Optimizer System which, in one embodiment, uses as the score the ratio of performance raised to an exponent over cost (perf**w1/cost). The general form of this function allows for separately normalizing performance and cost, normalizing a particular score to a particular value (e.g., normalize such that the score of the first runtime configuration is 0), and scaling the exponential scores into a usable/fixed range. This scoring function allows one to control, using the exponent, where on the simple performance/cost curve the optimization objective is pointed (e.g., where on the saturation curve of a sigmoid function). In practical terms, this allows a user to indicate a weighted degree of preference between performance and cost (e.g., using a slider in a UI). According to different embodiments, various example Optimization score-related objectives may include, but are not limited to, one or more of the following (and/or combinations thereof):

Maximize the performance-to-cost ratio (perf/cost);
(performance$^{w1}$)/cost;
performance (perf) with maximum cost;
cost while maintaining a minimum performance;
Number of users supported (or other business metric); and/or other desired objectives.

Database 120: In at least one embodiment, the database 120 may be configured or designed to provide real-time No SQL database services for the optimization engine 111 and the UI client 140. In some embodiments, the database stores account and user data as well as application specific data such as traces of optimization runs, and configuration for these runs. In some embodiments, the Optimizer System may use Google Firestore for database services, which, for example provides database 120 with functionality for implementing real-time NoSQL database services, as well as authentication, for UI clients 140 and the Optimizer Application 110.

It will be appreciated that the various application optimization techniques described herein may be implemented in other computer networks having different components and/or configurations than that of FIG. 1. For example, in at least one embodiment, the Optimizer System may be configured or designed to perform application optimization of a remote customer application without requiring the use of a servo that is remotely deployed at the customer environment. An example of one such embodiment is illustrated in FIG. 19.

Figure 19:
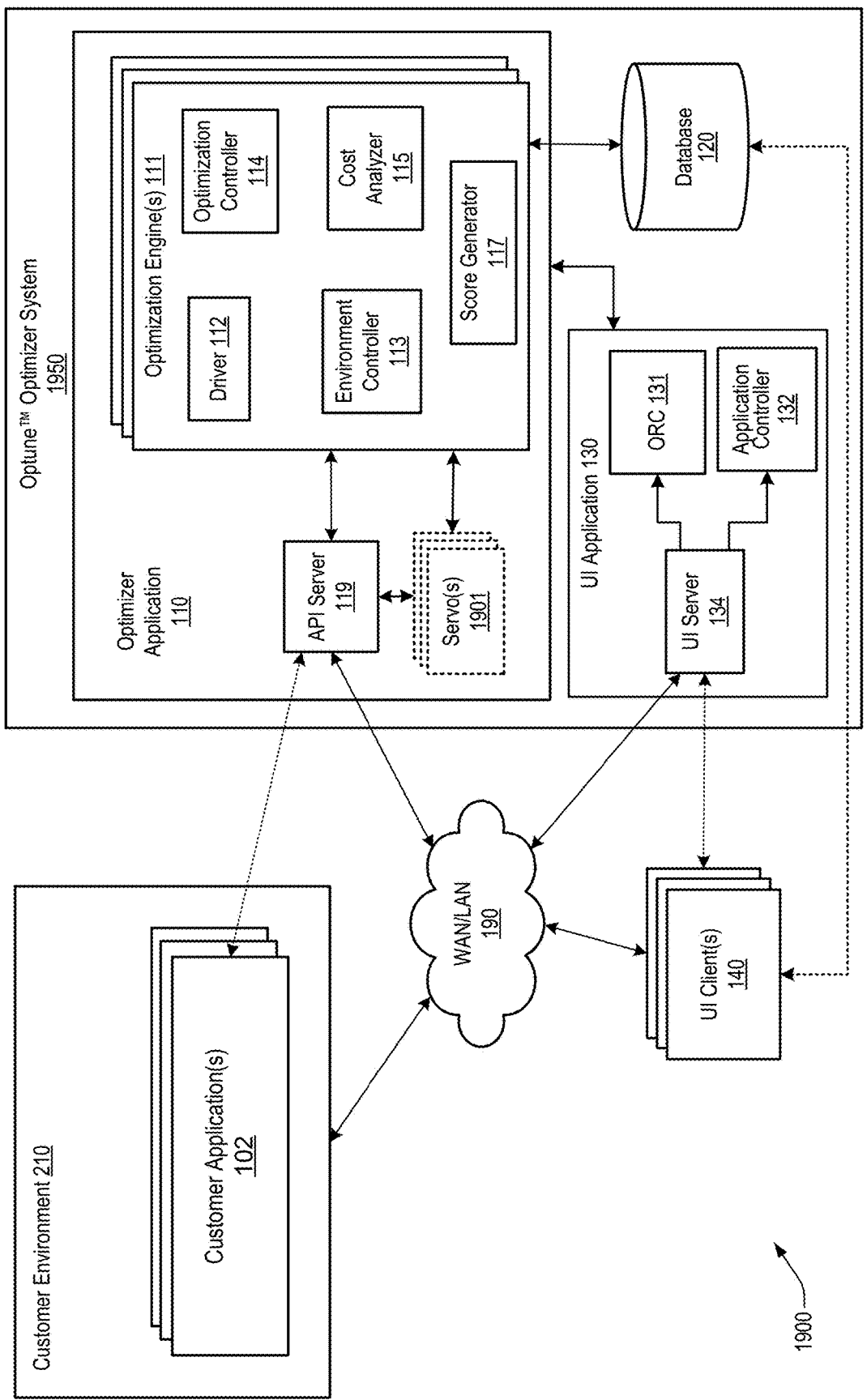
FIG. 19 illustrates an alternate example embodiment of a network portion 1900 which may be used for implementing various optimization aspects/features described herein.

FIG. 19 illustrates an example of an alternate embodiment of a network portion 1900 which may be used for implementing various optimization aspects/features described herein. In the specific example embodiment of FIG. 19, the Optimizer System 1950 is configured or designed to include functional components (e.g., servo components 1901) which are configured or designed to include functionality similar to that of servos 101 of FIG. 1. In at least one embodiment, the servo components 1901 may be implemented via a combination of hardware+software components deployed at the Optimizer System.

Additionally, as illustrated in the example embodiment of FIG. 19, the Optimizer System 1950 includes functionality for enabling the components of the Optimizer System to communicate directly with hardware and/or software components deployed at the customer environment 210. In at least some embodiments, the Optimizer System may issue instructions to one or more of the nodes or components deployed at the customer environment 210 to carry out specific optimization-related operations or activities, including, for example, measuring application metrics, reporting application measurement information and/or other information to the Optimizer System, deploying updated application settings for one or more customer applications, etc. In some embodiments, the Optimizer System 1950 may be configured or designed to include functionality for communicating directly with one or more customer application(s) 102 deployed at the customer environment 210. In the context of FIG. 19, a direct communication between the Optimizer System and a component of the customer environment may be achieved by routing such communications via a wide area network 190 such as the Internet or World Wide Web.

Figure 2:
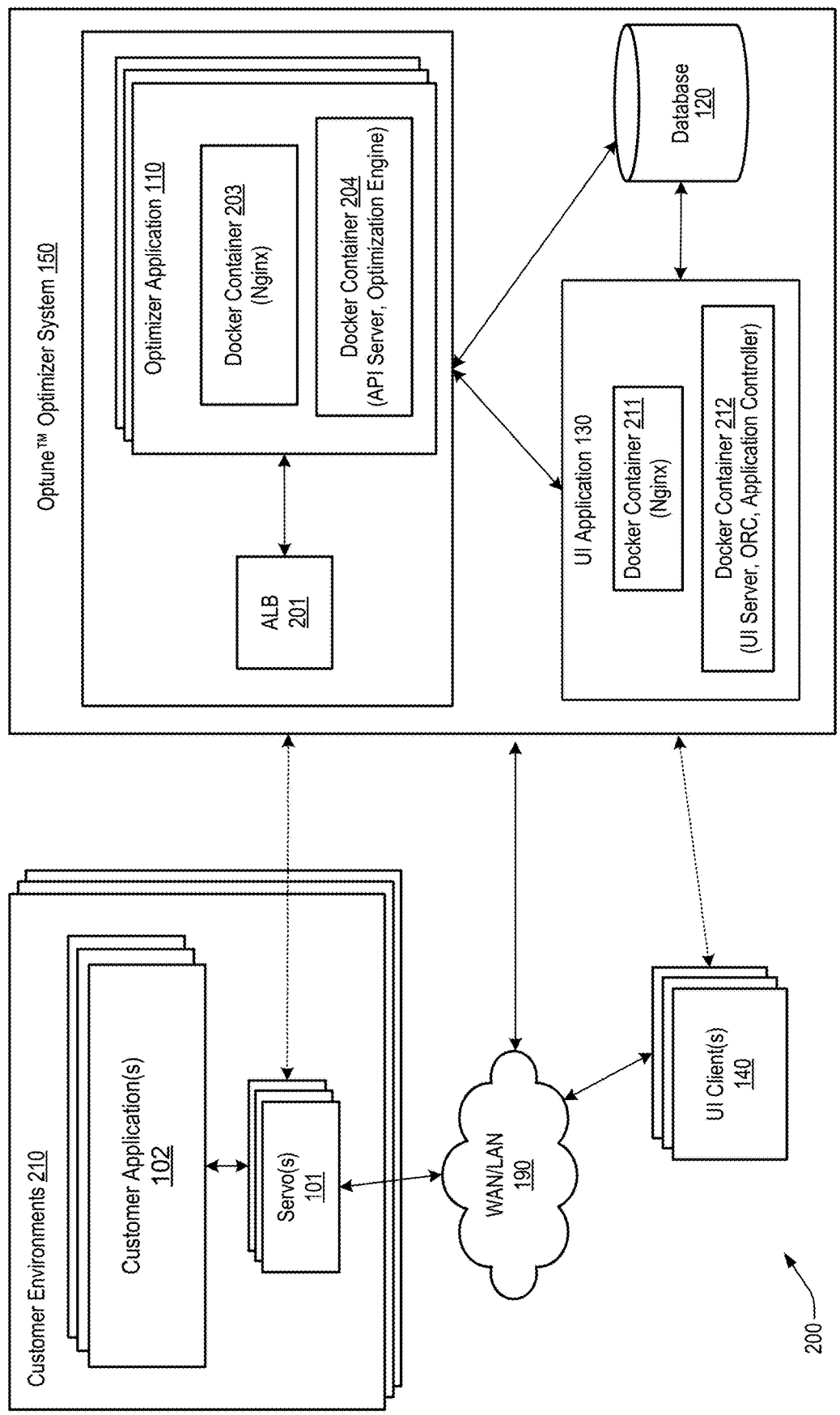
FIG. 2 illustrates an example embodiment of an architectural diagram of a network portion 200 which may be used for implementing various aspects/features described herein.

FIG. 2 illustrates an example embodiment of an architectural diagram of a network portion 200 which may be used for implementing various aspects/features described herein. For example, Application optimization techniques described herein may be implemented as a SaaS service which can securely optimize a customer's application in any of a wide variety of remote environments (e.g., public clouds or container services, private clouds or container clusters). Architecturally, the SaaS service separates functionality between a servo or agent, which is installed in the customer's environment, and a backend SaaS service (referred to herein as the optimizer or Optimizer System or Optune™ server). The servo uses pluggable update and measure drivers which support the specific customer application environment, and uses a fault tolerant SaaS protocol to communicate with the optimizer. This protocol inverts the usual client-server control relationship such that the servo self-synchronizes with the optimizer leading and the servo following. The optimizer, or backend Optune™ server, steers and moves forward the Optune™ Application Optimization Procedure(s).

As illustrated in the example embodiment of FIG. 2, network portion 200 may include, but are not limited to, one or more of the following hardware/software components (or combinations thereof):

- Customer Environments 210: Networked Subscriber systems or other networked environments (e.g., public clouds or container services, private clouds, container clusters, etc.) where one or more Customer Applications 102 are deployed.
- Servo(s) 101: A servo is typically packaged as a Docker container and instantiated within a customer environment where it acts as an agent of the optimizer 150 in order to update the runtime configuration of a customer application, or measure its operational metrics, and return the results to its associated optimizer application 110 which is driving forward the optimization of that customer application.
- UI Client(s) 140: A UI client is typically a browser which renders the web interface of the Optimizer System 150. In one embodiment, a UI client uses Google Firestore for database and authentication services, obtains its static content from the UI Application 130 and uses the control API exposed by this application to start or stop optimizer applications 110
- Optimizer System 150: The optimizer is the backend of the Optune™ SaaS. In one embodiment, it may be configured or designed to provide at least two customer facing interfaces: UI Clients 140 interact with the optimizer through a web interface and control API exposed by the UI Application 130; and servo(s) 101 interact with the optimizer through the SaaS API exposed to at least one servo by its associated optimizer application 110. In at least one embodiment, the optimizer uses Google Firestore for database services. In one embodiment, the Optimizer System 150 may be virtually implemented using, for example, Amazon EC2 VMs (e.g., as a single Docker Host, or as a collection of VMs which together form a Docker Swarm).
- ALB 201: The Amazon AWS Application Load Balancer ALB routes servo 101 API requests to the optimizer application 110 associated to that servo.
- Optimizer Application(s) 110: An optimizer application is instantiated by the UI Application 130 at the start of an optimization run. It communicates with a single servo 101 to optimize one customer application. In at least one embodiment, an optimizer application may be deployed as a docker-compose project comprised of one or more containers (e.g., 203 and 204).
- Docker container (Nginx) 203: The Nginx container provides traffic encryption, as well as authentication for the servo 101 using services provided by the database 120.
- Docker container (API Server, Optimization Engine) 204: In at least one embodiment, the API server and optimization engine of an optimizer application 110 are packaged together as a Docker container which may be configured or designed to provide the optimizing services of that application, and to provide access to one or more optimization algorithms which are used by the Optimizer System.
- UI Application 130: The UI application may be implemented as a containerized Docker application which may be configured or designed to provide the customer facing web interface of the Optimizer System 150 as well as the backend functionality for orchestrating the deployment of optimizer applications 110. In at least one embodiment, the UI application may comprise a plurality of containers (e.g., 211 and 212).
- Docker container (Nginx) 211: The Nginx container may be configured or designed to provide traffic encryption, as well as authentication for UI Clients 140 using services provided by the database.
- Docker container (UI Server, ORC, Application Controller) 212: In at least one embodiment, the UI server, ORC and application controller of the UI application may be packaged together as a Docker container which serves static content to UI Clients 140, and exposes a control API for starting or stopping optimizer applications 110.
- Database 120: In at least one embodiment, the database 120 may be configured or designed to provide real-time No SQL database services for the optimization engine 111 and the UI client 140. In some embodiments, the database stores account and user data as well as application specific data such as traces of optimization runs, and configuration for these runs.

Example Optune™ Optimization Techniques

According to different embodiments, the Optune™ application optimization techniques described herein (also referred to as "Optune™") may be utilized as tools for optimizing applications and/or workloads (e.g., middleware optimization (e.g., PostgreSQL) as well as infrastructure optimization (e.g., k8s cluster for a specific app)). It does not rely on domain or application specific human expertise, but uses application operational metrics (e.g., performance metrics such as the number of requests per seconds served by the application, or request latency) to assess the application under load, in various runtime configurations, in order to determine, or converge upon, an optimal runtime configuration. In this sense Optune™ is application agnostic and may be considered to perform black-box optimization. As we may see, however, Optune™ may also enrich the optimization process by relating a present application's optimization to historical data of this and other applications' optimization, and in this process may make use of some application specific characteristics such as types of components (e.g., a MySQL server, an Apache web server, etc.). According to different embodiments, Optune™ optimization techniques may be applied to optimize horizontal scaling, vertical scaling and/or tuning parameters.

In at least one embodiment, Optune™ uses reinforced learning (e.g., Q-learning using a neural network), as well as a variety of other heuristic or algorithmic techniques (e.g., including other machine learning techniques such as Bayesian optimization, LSTM, etc.) to optimize an application where, for example:

an application is a system of one or more components;
any applications settings may be optimized (any of the application's mutable runtime configuration), e.g., to accomplish vertical resource scaling, horizontal scaling, and/or parameter tuning; and
optimization may be continuous or not.

Viewed from a high level, Optune™ optimizes an application through iterative cycles of:

dynamically selecting, or determining, a next application runtime configuration to assess;
updating the application so that this next/updated runtime configuration is deployed;
measuring the operational metrics of the application with these new settings: this assessment may be configured or designed to provide feedback to inform further selection of new runtime configurations to assess.

Considering at least one such cycle as a step in the optimization process, the neural network learns from feedback from steps it selects. Feedback from assessments selected by heuristic or algorithmic techniques may also be used to train the neural network, where these techniques may be applied at the beginning of an optimization run or mixed in with assessments selected by reinforced learning during the course of an optimization run.

In at least one embodiment, the operational metrics are used to create a performance measurement of the application, while the runtime configuration is used to create a cost measurement of the application. The performance and cost are used to create a score which is an assessment of this runtime configuration in relation to the optimization objective (e.g., where higher scores are better). For example, the score may be expressed as the ratio of performance over cost, so that the optimization objective is to maximize performance while minimizing cost such that this example ratio, used as the scoring or fitness function, is maximized. The difference between the score of a present step and that of the previous step may be used as the reward which provides the reinforcement, through back propagation, used to train the neural network.

The ratio of performance over cost is an example of a more general form of a scoring function used by Optune™ which, in one example embodiment, uses as the score the ratio of performance raised to an exponent over cost (e.g., $((perf)^{\wedge}(w1))/cost$). The general form of this function allows for separately normalizing performance and cost, normalizing a particular score to a particular value (e.g., normalize such that the score of the first runtime configuration is 0), and scaling the exponential scores into a usable/fixed range. This scoring function allows one to control, using the exponent, where on the simple performance/cost curve the optimization objective is pointed (e.g., where on the saturation curve of a sigmoid function). In practical terms, this allows a user to indicate a weighted degree of preference between performance and cost (e.g., using a slider in a UI).

In the optimization cycle of select-update-measure, the dynamic point of control which steers the optimization process is selecting a next runtime configuration to assess. A selection may be made using the neural network (e.g., its best prediction), or be made stochastically to perform simple exploration, or be made using heuristic or algorithmic techniques such as ouch (as described in the detailed description below). These selections steer the process of exploring the problem space, exploiting what has been learned, and converging on the optimization objective. During the course of an optimization run, feedback from any selection may be used to train the neural network. In at least some embodiments, other machine learning techniques may be used instead of neural networks.

According to different embodiments, Optune™ may also improve the efficiency of optimization through various techniques such as, for example:

Dimensionality reduction:
feature selection: for example, first optimize application tuning parameters, then optimize application resources vertically, then optimize application resources horizontally;
feature extraction: for example, functionally combine a plurality of operational metrics to derive a single performance metric.

Deduplication: if a runtime configuration which has already been assessed is selected to be assessed again, the measurement of a previous assessment may be used instead of updating the application and measuring again (e.g., contingent on the age of the previous assessment, or on the number of times this runtime configuration has been previously deployed and measured).

Replay: a previous optimization run may be replayed during a present optimization run. Replay causes a trace of the steps of a previous run, at least one step of which relates a runtime configuration to a set of measured operational metrics, to be replayed without updating the application or measuring again. Replay may be used both to inform deduplication and to train the neural network used by reinforced learning. Replay also allows for changes in the performance or scoring functions to be applied to previous optimization runs.

In at least one embodiment, Optune™ may be implemented as a SaaS service. One of the significant practical problems solved by Optune™ is how to optimize a customer's application in any of a wide variety of environments (e.g., public clouds or container services, private clouds or container clusters) with a minimal footprint in the customer's environment, and while not compromising the security of that environment, and while using a SaaS service to drive the optimization. The high-level architecture of the Optune™ service separates functionality between a servo, or agent, which is installed in the customer's environment and a backend Optimizer System or Optimizer Server, which, for example, may be configured or designed to deploy its application optimization techniques as a SaaS service.

In one embodiment, the Optune™ servo, or agent, is responsible for updating an application's runtime configuration and measuring the application's operational metrics, as well as for discovering, and providing a description of, the configurable settings of an application and available metrics.

It uses pluggable update and measure drivers to perform these operations according to the environment with which the servo needs to interact (e.g., the application may be deployed to a Kubernetes cluster and measurement may be performed using Apache benchmark). In one embodiment, the servo communicates with the optimizer, or server, using a fault tolerant SaaS protocol which inverts the usual client-server control relationship such that the servo self-synchronizes with the optimizer leading and the servo following.

The Optune™ optimizer, or Optimizer System, implements the backend of the Optune™ SaaS service. It is responsible for driving the optimization of customer applications through communicating with any servo agents. For any optimization run, the optimizer implements a control loop for the cycles of select-update-measure, and is thus primarily responsible for the efficient optimization of applications through selecting application runtime configurations to deploy and measure, and feeding back the results of measurement to inform further selection.

The optimizer also exposes a web UI (e.g., UI Client 140) which provides functionality for enabling customers to sign up for the Optune™ service, access an account dashboard to manage users and applications, and access application dashboards to manage the optimization of applications.

One benefit of the servo-optimizer architecture is that it allows the optimizer to be built in a way that does not depend on the specific environment where an application runs, or on specific measurement techniques. Additionally, the servo-optimizer architecture may be configured or designed to provide separation of concerns, where the servo and the application descriptor abstract the optimization task in relation to the application environment (e.g., as done by a customer), and where the optimizer performs the optimization in an environment-agnostic manner (e.g., as the SaaS provider). This separation of concerns removes the need for the customer to be knowledgeable in machine learning, and removes the need for the SaaS provider to integrate with and understand diverse customer environments in order to optimize applications. This makes Optune™ widely applicable, easy to use and secure.

Figure 3:
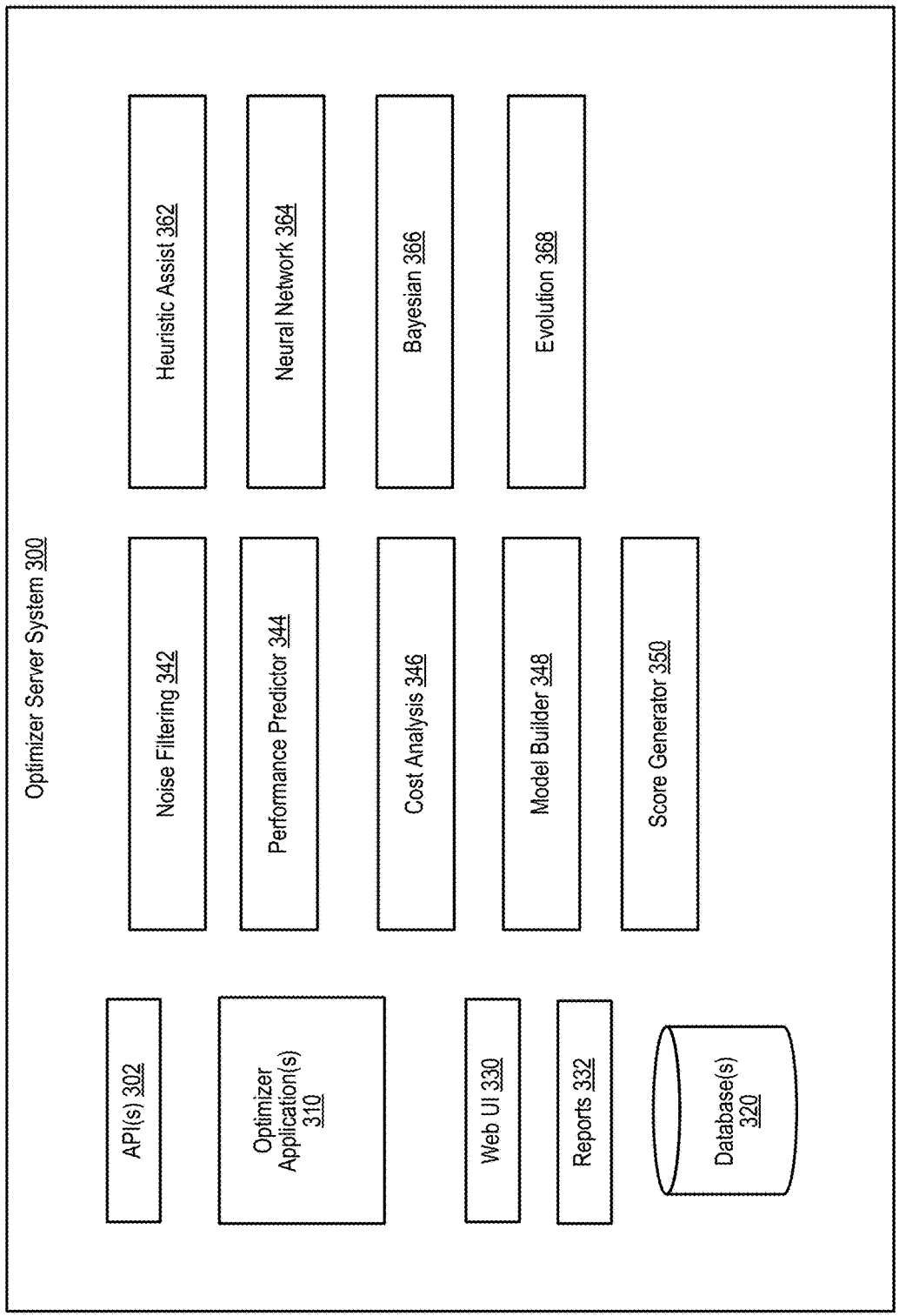
FIG. 3 illustrates an example embodiment of an Optimizer Server System 300 which may be used for implementing various aspects/features described herein.

FIG. 3 illustrates an example embodiment of an Optimizer Server System 300 which may be used for implementing various aspects/features described herein. As illustrated in the example embodiment of FIG. 3, Optimizer Server System 300 may include, but are not limited to, one or more of the following hardware/software components (or combinations thereof):

API(s) 302: The API Server implements the SaaS protocol used for communication between the SaaS backend and any servos.

Noise Filtering 342: Filters for removing noise or outliers from measurements, or for aggregating measurements; used to process measurement data returned by a servo into particular metrics and their values.

Cost Analysis 346: Provides for cost measurements of runtime configuration (e.g., based on costable resources such as CPU cores, memory, or VM instance type).

Model Builder 348: Provides model building functionality for generating one or more optimization models, for example, using one or more optimization algorithms and/or machine learning algorithms. In at least some embodiments, the models may be used, for example, for predicting application performance (e.g., via Performance Predictor 344).

Performance Predictor 344: Predicts the expected performance and/or score using a model built with existing algorithms (and/or or unrelated machine learning algorithms which are fed the data points). If the predicted performance/score aligns with the measured data, this provides an indication that the model is good or accurate. Using such models, the system may skip a few measurements and use the predicted data generated by the model. Alternatively, the performance predictor may be used based on prior measurements to verify a new version's performance. If substantially different from what was measured previously, this may indicate new/changed code; hence open up exploration.

Optimizer Server System 300: The driver, the environment controller, and any instantiated optimization controllers (e.g., Bayesian, Evolution, etc.).

Heuristic Assist 362: Heuristics used with the Reinforced Learning optimization controller.

Neural Network 364: The Reinforced Learning optimization controller, referred to as "neural network" because it uses a neural network to represent the Q function of reinforced learning.

Bayesian 366: The Bayesian optimization controller.

Evolution 368: An Evolutionary-type optimization algorithm.

Database(s) 320: Data store for storing data, including optimization data.

Web UI 330: Displays an Optune dashboard GUI via a web-based browser interface. Static content is provided by the data store.

Score Generator 350 functionally similar to score generator 117 (FIG. 1).

Optimizer Application(s) 310 functionally similar to Optimizer application 110 (FIG. 1).

Reports 332: Generates reports which, for example, may include at least a portion of information similar to that of the executive dashboard. In at least one embodiment, the Reports module 332 may provide or generate reports to users which may provide a summary and historical view of results, improvements made, etc.

Optimization Controllers

According to different embodiments, various application optimization techniques may be employed by the Optimizer System using different optimization controllers or optimization algorithms, including, for example, one or more of the following (or combinations thereof):

Bruteforce.

Reinforced Learning. For example, in one embodiment, the Optune heuristics may be implemented within the context Reinforced Learning (that is the optimization controller within which they operate).

Bayesian.

Evolutionary.

Hybrid/Blended.

And/or other desired optimization algorithms.

Bayesian Optimization Controller Examples

One embodiment of an Optune Bayesian optimizer may use the Bayesian Optimization module of the methods package of GPyOpt, a Python open-source library for Bayesian optimization developed by the Machine Learning group of the University of Sheffield. It is based on GPy, a Python framework for Gaussian process modelling. GPyOpt documentation: sheffieldml.github.io/GPyOpt/(the entirety of which is incorporated herein by reference for all purposes). Example GPyOp module: gpyopt.readthedocsio/en/latest/GPyOpt.methods.html (the entirety of which is incorporated herein by reference for all purposes).

In one embodiment, the Optune Bayesian optimizer may implement as the objective function being optimized a Python function which receives a next application state (e.g., including, for example, list of settings values, as a location suggested by GPyOpt and provided to the driver as a next state to measure) as input, waits on feedback from the driver, and then returns the score for that state (as indicated by feedback). In at least some embodiments, Bayesian also may receive external solutions as provided by other optimizers during the optimization process (e.g., when used with Hybrid/Blended optimization controllers, as described below).

Evolutionary Optimization Controller Examples

In at least one embodiment, the Optune™ Evolutionary optimizer may be configured or designed to utilize various types of Evolutionary Algorithm. Example, documentation regarding Evolutionary Algorithms may be accessed from the following online resource: en.wikipedia.org/wiki/Evolutionary_algorithm (the entirety of which is Incorporated herein by reference for all purposes).

In one embodiment, the Optune Evolutionary optimizer implements as the objective function being optimized a Python function which receives a next application state (e.g., including, for example, list of settings values, as a location suggested by an Evolutionary optimization algorithm and provided to the driver as a next state to measure) as input, waits on feedback from the driver, and returns the score for that state (as indicated by feedback). In at least some embodiments, an Evolutionary optimization algorithm also may receive external solutions as provided by other optimizers during the optimization process (e.g., when used with Hybrid/Blended optimization controllers, as described below)

Hybrid/Blended Optimization Controller Examples

In at least one embodiment, Hybrid/Blended is an optimization controller that may be configured or designed to run other optimization controllers. It can be examined as both a proxy and multiplexer of optimizers, for example:

- As a proxy: For example, outwardly, facing the driver, Hybrid/Blended may be configured or designed to act as a single optimization controller, providing responses to requests for a next runtime configuration to assess, or to handle feedback from such assessments.
- As a multiplexor: For example, internally, Hybrid/Blended may be configured or designed to instantiate one or more optimization controllers which will work together during optimization (e.g., Reinforced Learning, Bayesian, Evolutionary or Bruteforce). During optimization, Hybrid/Blended:
    Selects which optimization controller will provide the next runtime configuration to assess. For example, in one embodiment, Hybrid/Blended uses time-slicing so that only one optimization controller at a time provides a next runtime configuration for assessment. Other implementations may provide for parallellizing these assessments. Additionally, in some embodiments, Hybrid/Blended may be configured via an optimization descriptor with a numeric weight for each instantiated optimization controller, and these weights determine the relative frequency of their turns providing a next runtime configuration.
    Multiplexes and propagates feedback from the driver to all instantiated optimizers capable of receiving feedback (e.g., Reinforced Learning, Evolutionary and Bayesian), regardless of which optimization controller selected the runtime configuration assessed.
    Terminates when, as configured, one or more of its instantiated optimizers terminates, or no optimizer provides a non-empty next runtime configuration to assess.

In at least one embodiment, the Hybrid/Blended optimization controller may be configured or designed to include functionality for supporting blending/sequencing of optimizers within a batch, and for cross-feedback. In one embodiment, a batch may correspond to one or more measurement cycles which use a specified set of one-or-more optimizers to optimize a specified set of one or more settings. In at least one embodiment, an optimization run may be comprised of one or more batches.

Noise Filtering, Data Cleaning, Preprocessing

According to different embodiments, Optune servo measure drivers may integrate with a variety of 3rd party monitoring systems in order to obtain application metrics. For example, these systems may include Prometheus, SignalFx, Datadog, Wavefront and NewRelic. On their own, some of these may provide functionality for noise filtering or data cleaning, as well as functionality for data aggregation (e.g., of multiple time-series of metrics data).

In some embodiments, Optune may also work with raw time-series metrics, in which case currently available methods of anomaly detection and data cleaning may be used, such as, for example, one or more methods disclosed in one or more of the following references (each of which is herein incorporated by reference in its entirety for all purposes):

- US Patent Publication No. US20030139828A1, by Bruce FergusonEric Hartman, titled: SYSTEM AND METHOD FOR PRE-PROCESSING INPUT DATA TO A SUPPORT VECTOR MACHINE.
- US Patent Publication No. US20140108359A1, by Farnoush Banaei-KashaniYingying ZHENGSi-Zhao QinMohammad AsghariMandi Rahmani MofradCyrus ShahabiLisa A. Brenskelle, titled: SCALABLE DATA PROCESSING FRAMEWORK FOR DYNAMIC DATA CLEANSING.
- US Patent Publication No. US20150095719A1, by Young-Hwan NAMKOONGJae-Young LeeA-Young JUNGDa-Woon KIM, titled: DATA PREPROCESSING DEVICE AND METHOD THEREOF.
- Jason W. Osborne: Best Practices in Data Cleaning, Chapter 5-8, SAGE Publications, CA, USA (2012).
- Tamraparni Dasu, Theodore Johnson: Exploratory Data Mining and Data Cleaning, pp. 140-162, Wiley-Interscience, NJ, USA (2003).
- Time Series Analysis: With Applications in R, by Authors: Cryer, Jonathan D, Chan, Kung-Sik, Springer-Verlag New York, 2008, Chapter 'Trends' & 'Time Series Regression Models', ISBN 978-0-387-75959-3.
- Time Series Analysis and Its Applications, by Authors: Shumway, Robert H., Stoffer, David S., Springer International Publishing, 2017, Chapter 'Time Series Regression and Exploratory Data Analysis', ISBN 978-3-319-52452-8.

Descriptors

In at least some embodiments, optimization runs may be descriptor driven. For example, in some embodiments, both an application descriptor (e.g., 400 FIG. 4) and an optimization descriptor (e.g., 500, FIG. 5) are provided as input to an optimization run. In at least one embodiment, an application descriptor may specify the settings of the application which are to be optimized, the operational metrics used to measure performance, and the configuration for the servo update and measure drivers. In at least one embodiment, an optimization descriptor may specify how the application is to be optimized during the optimization run, e.g., as a sequence of batches where each batch may use different heuristics or algorithms, if any, may use reinforced learning or not, and may specify configuration options for any of these.

FIG. 4 shows an example embodiment of an application descriptor 400 which may be provided as input to one or more optimization run(s). In the specific example embodiment of FIG. 4, application descriptor 400 represents an example application descriptor in YAML for a two component Kubernetes application whose update driver uses the kubectl command line utility (no non-default configuration required), and whose measure driver uses Apache benchmark (non-default configuration as specified).

In at least one embodiment, an application descriptor may be generated by merging an operator override descriptor, specified by a user using the Optune™ UI, with the remote application descriptor provided by the servo. The remote application descriptor may be configured or designed to provide a specification of available settings and metrics discovered by the servo, while the operator override descriptor specifies any additional settings to use, the further specification of settings (e.g., their minimum and maximum values), and configuration for the update and measure drivers.

FIG. 5 shows an example embodiment of an optimization descriptor 500 which may be provided as input to one or more optimization run(s). In at least one embodiment, an optimization descriptor specifies the initial driver configuration for the run (e.g., cost model, performance and cost definitions, etc.) as well as a set of named batches (e.g., Exploring, Exploiting) where at least one batch may specify further configuration for the driver, configuration for the environment controller (e.g., batch override descriptor), and/or configuration for the optimizer (e.g., options for reinforced learning and/or any heuristics/algorithms to be used in the batch). In the specific example embodiment of FIG. 5, optimization descriptor 500 represents an example optimization descriptor in YAML for a continuous optimization run which may use the example application descriptor 400 (FIG. 4).

FIG. 6 shows an example embodiment of a hybrid/blended optimization descriptor 600 which may be provided as input to one or more optimization run(s). In the specific example embodiment of FIG. 6, optimization descriptor 600 represents an example hybrid/blended optimization descriptor in YAML for a multi-batch optimization run:

The first batch, named "size-count", optimizes the resources and replica count (number of instances) of a single component c1, while pinning the JVM settings for this component. This batch uses both the Reinforced Learning and the Evolutionary optimization controllers.

The second batch, named "jvm", pins the optimal resource and replica settings (determined by the first batch) and proceeds to un-pin and optimize the JVM settings (in this example, a single setting GCType). This batch uses the Bruteforce optimization controller to enumerate the JVM garbage collector types.

In one embodiment, an optimization descriptor specifies how the application, specified by the application descriptor, is to be optimized during the optimization run. An optimization run is executed as a sequence of one or more batches, where at least one batch may specify configuration for the driver, the environment controller, and the optimization controller. In general, an optimization descriptor specifies:
  driver configuration: the driver configuration specifies any initialization of the optimization run, as well as any driver configuration common to some or all batches, such as:
    the type of run: discovery, calibration or optimization
    cost model and performance function (e.g., its extraction from application metrics)
    scoring function, including score normalization
    performance precision: the precision within which two performance measurements may be considered the same
    application scoped boundary conditions such as maximum cost
    deduplication
    the first named batch to run
  a set of named batches: at least one batch specifies configuration specific to this batch of the optimization run such as:
    configuration for the environment controller:
      batch override descriptor: if provided the batch override descriptor is merged into the application descriptor at the beginning of the batch; it is typically used to change settings, for example, to set initial values for the first runtime configuration of the batch, or change the delta of a range setting
    configuration for the optimization controller:
      configuration for reinforced learning and/or any other heuristics or algorithms used in this batch
    driver configuration:
      a list of 0 or more historical optimization runs for this application whose traces may be replayed at the beginning of this batch, e.g. to inform deduplication or train the neural network of reinforced learning
    on completion:
      a next named batch, if any, to run
      whether or not to update the application to use that runtime configuration from this batch which has the highest score The first batch indicates a named entry point into the set of batches, where any batch may indicate a next batch. In this way any set of linked batches describe a directed graph where at least one node is a batch and at least one connection indicates a progression to a next batch.

Example Procedures and Flow Diagrams

FIGS. 7-15 illustrate various example embodiments of different Optune™ procedures and/or procedural flows which may be used for facilitating activities relating to one or more of the Optune™ aspects disclosed herein.

According to different embodiments, at least a portion of the various types of functions, operations, actions, and/or other features provided by the Optune™ Procedures of FIG. 7-15 may be implemented at one or more client systems(s), at one or more System Servers (s), and/or combinations thereof.

In at least one embodiment, one or more of the Optune™ procedures may be operable to utilize and/or generate various different types of data and/or other types of information when performing specific tasks and/or operations. This may include, for example, input data/information and/or output data/information. For example, in at least one embodiment, the Optune™ procedures may be operable to access, process, and/or otherwise utilize information from one or more different types of sources, such as, for example, one or more local and/or remote memories, devices and/or systems.

Additionally, in at least one embodiment, the Optune™ procedures may be operable to generate one or more different types of output data/information, which, for example, may be stored in memory of one or more local and/or remote devices and/or systems. Examples of different types of input data/information and/or output data/information which may be accessed and/or utilized by the Optune™ procedures may include, but are not limited to, one or more of those described and/or referenced herein.

In at least one embodiment, a given instance of the Optune™ procedures may access and/or utilize information from one or more associated databases. In at least one embodiment, at least a portion of the database information may be accessed via communication with one or more local and/or remote memory devices. Examples of different types of data which may be accessed by the Optune™ procedures may include, but are not limited to, one or more of those described and/or referenced herein.

According to specific embodiments, multiple instances or threads of the Optune™ procedures may be concurrently implemented and/or initiated via the use of one or more processors and/or other combinations of hardware and/or hardware and software. For example, in at least some embodiments, various aspects, features, and/or functionalities of the Optune™ procedures may be performed, implemented and/or initiated by one or more of the various systems, components, systems, devices, procedures, processes, etc., described and/or referenced herein.

According to different embodiments, one or more different threads or instances of the Optune™ procedures may be initiated in response to detection of one or more conditions or events satisfying one or more different types of minimum threshold criteria for triggering initiation of at least one instance of the Optune™ procedures. Various examples of conditions or events which may trigger initiation and/or implementation of one or more different threads or instances of the Optune™ procedures may include, but are not limited to, one or more of those described and/or referenced herein.

According to different embodiments, one or more different threads or instances of the Optune™ procedures may be initiated and/or implemented manually, automatically, statically, dynamically, concurrently, and/or combinations thereof. Additionally, different instances and/or embodiments of the Optune™ procedures may be initiated at one or more different time intervals (e.g., during a specific time interval, at regular periodic intervals, at irregular periodic intervals, upon demand, etc.).

In at least one embodiment, initial configuration of a given instance of the Optune™ procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Optune™ procedures may correspond to and/or may be derived from the input data/information.

It will be appreciated that the procedural diagrams of FIGS. 7-15 are merely specific examples of procedural flows and/or other activities which may be implemented to achieve one or more aspects of the Optune™ techniques described herein. Other embodiments of procedural flows (not shown) may include additional, fewer and/or different steps, actions, and/or operations than those illustrated in the example procedural diagrams of FIGS. 7-15.

Figure 7:
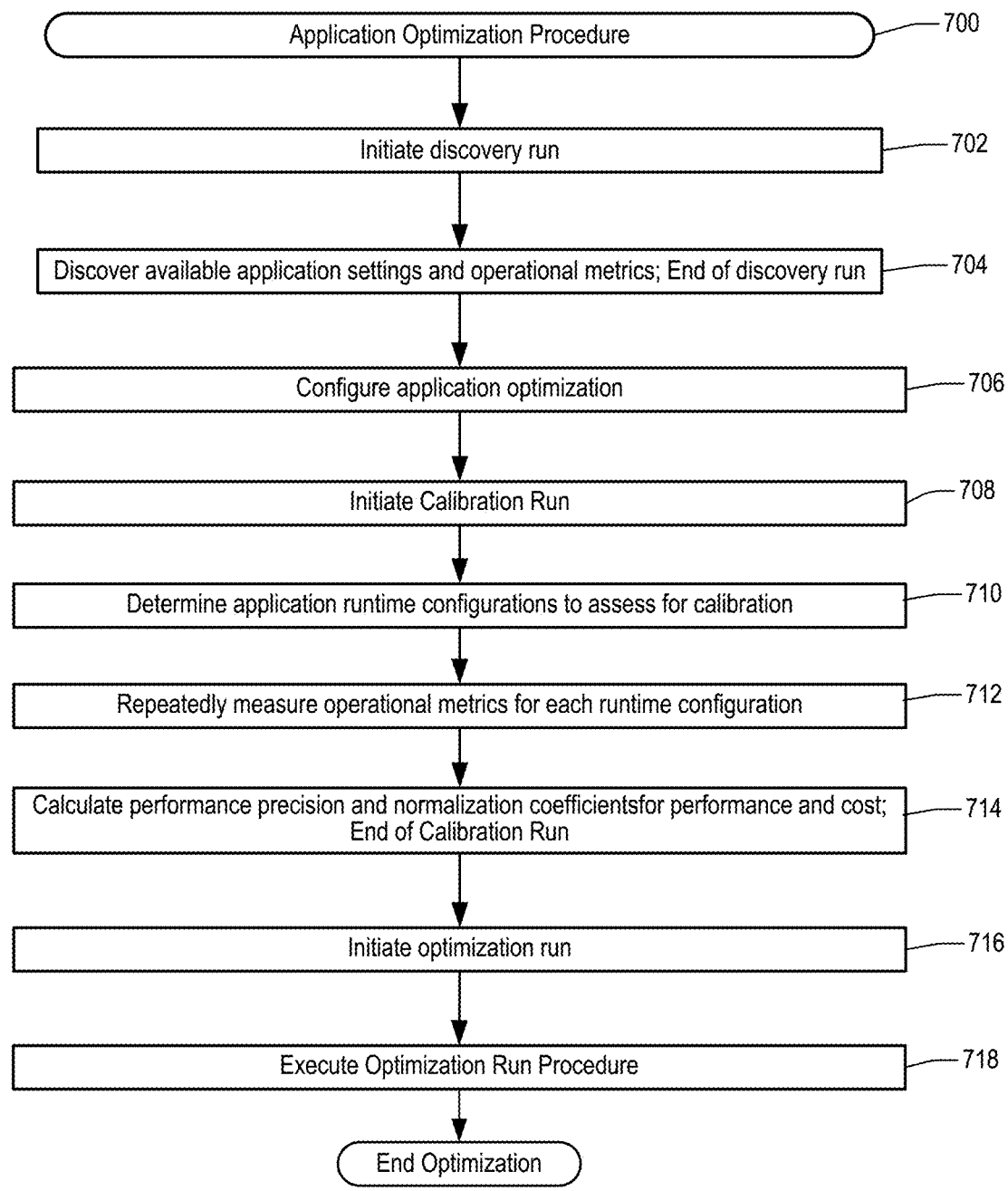
FIG. 7 illustrates an example embodiment of an Application Optimization Procedure 700 which may be utilized for facilitating activities relating to one or more of the application optimization techniques disclosed herein.

FIG. 7 illustrates an example embodiment of an Application Optimization Procedure 700 which may be utilized for facilitating activities relating to one or more of the application optimization techniques disclosed herein.

In at least one embodiment, prior to execution of the Application Optimization Procedure 700, a user configures and starts a servo for the target application environment. The servo configuration includes an API access token and the application ID. In at least some embodiments, the Optimizer System may be configured or designed to include functionality for enabling multiple instances of the Application Optimization Procedure to run simultaneously or concurrently for different client applications.

As shown at 702, using the UI client, a user initiates a discovery run. In at least one embodiment, a UI client may be configured or designed to enable a user to initiate a discovery run. The optimizer provisions an optimizer application to provide backend services for the discovery run.

As shown at 704, the servo discovers (or may be configured by the user with) available application settings and operational metrics and provides these to the optimizer application in the form of a remote application descriptor. In at least one embodiment, the servo includes functionality for automatically and dynamically generating the application descriptor. The optimizer application stores this descriptor in the database and terminates the discovery run.

As shown at 706, using the UI client, a user configures the application optimization, for example, by:
defining or selecting a performance function (based on metrics) and cost model (e.g., Amazon EC2 instance type pricing, or memory and CPU based resource consumption pricing);
providing any non-default configuration for the servo update/measure drivers (e.g., measurement duration);
defining or selecting a scoring function;
selecting which application settings to optimize, (optionally) specifying new settings, and completing the descriptive specification of these settings (e.g., by defining the minimum and maximum values of range settings);
and/or performing other application optimization configuration activities.

As shown at 708, using the UI client, a user initiates a calibration run. In response, the optimizer provisions an instance of an optimizer application to provide backend services for the associated calibration run.

As shown at 710, the optimizer application employs one or more algorithms to automatically and dynamically determine application runtime configurations to assess for calibration, which, for example, may include identifying a set of application runtime configurations to assess, in addition to the initial runtime configuration.

As shown at 712, the optimizer application may repeatedly measure operational metrics for each runtime configuration, for example, by instructing the servo to update the application to at least one of the calibration runtime configurations, and to repeatedly measure the operational metrics of the application in at least one of these configurations.

As shown at 714, based on these measurements, the optimizer application calculates performance precision and normalization coefficients for performance and cost in the scoring function. The optimizer application stores these computed values in the database and terminates the calibration run.

As shown at 716, using the UI client, a user initiates an optimization run. The optimizer provisions an instance of an optimizer application to provide backend services for the associated optimization run.

Figure 8:
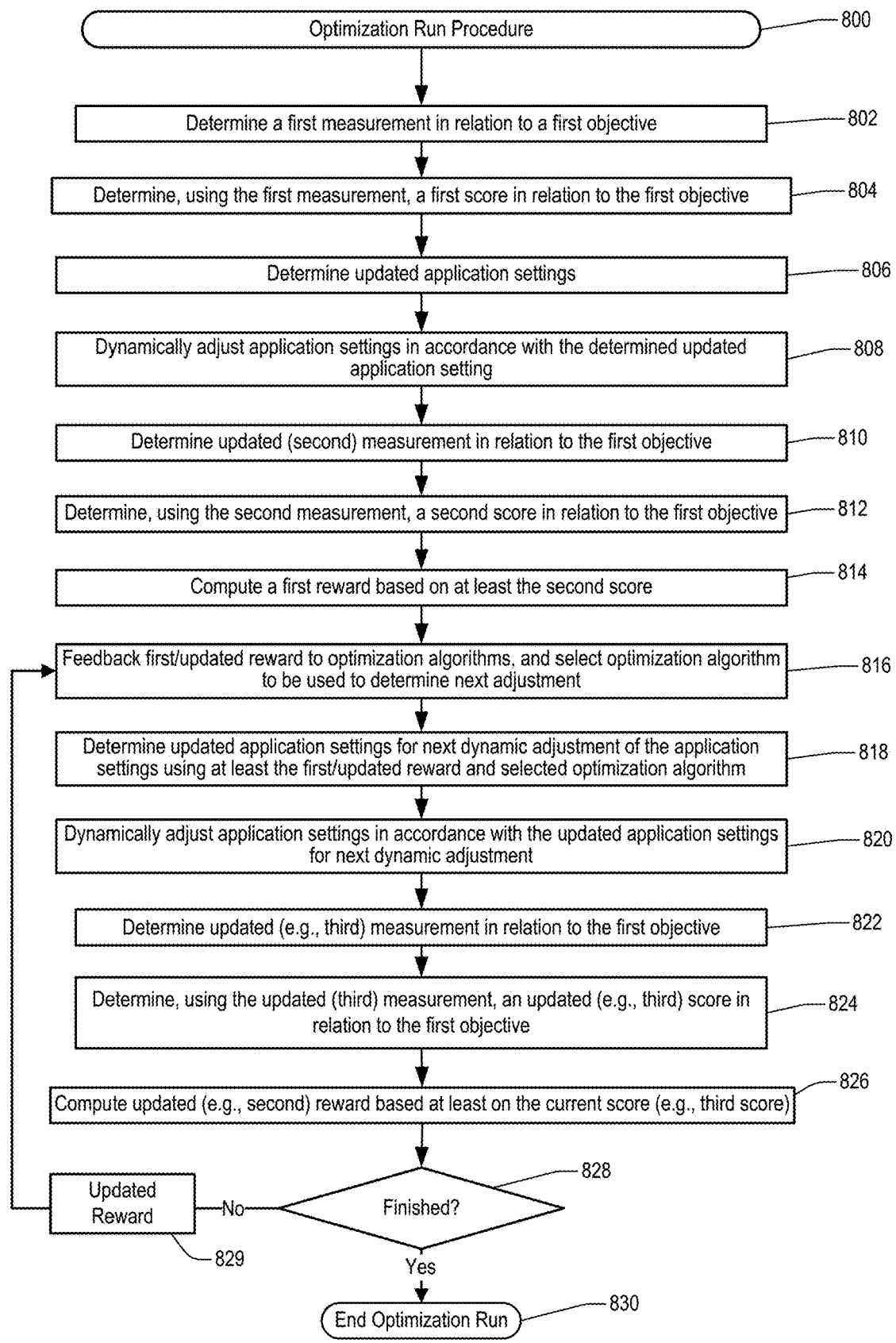
FIG. 8 illustrates an example embodiment of an Optimization Run Procedure 800 which may be utilized for facilitating activities relating to one or more of the application optimization techniques disclosed herein.

As shown at 718, the Optimizer System performs an optimization run, for example, by executing the Optimization Run Procedure 800 (FIG. 8).

The Optimizer System runs the Optimization Run Procedure until completion, and stores the optimization run trace in the database. After the optimization run has run until completion and the optimization run trace data stored in the database, the optimizer application terminates the optimization run. This is the end of application optimization A user may reconfigure application optimization and initiate further optimization runs for the application at will, or even re-calibrate after such changes.

According to different embodiments, optimization may be continuous, or periodic, or implemented based on triggering events/conditions.

According to different embodiments, various different optimization techniques may be used or employed during the course of application optimization. Examples of such optimization techniques may include, but are not limited to one or more of the following (or combinations thereof):

Reinforced Learning (e.g., Q-learning using a neural network as the Q function).
Bayesian.
Evolutionary.
Heuristics techniques such as, for example, algorithms which may be configured or designed to provide a solution for a problem which may not be exact (e.g., because an exact solution may not be findable), but which approaches, or approximates, an exact solution). For example, the ouch heuristic which undoes an adjustment whose reward passes a negative threshold.
Bruteforce.
and/or other algorithmic techniques.

According to different embodiments, different optimization techniques may be used in different phases of the optimization, where these phases may be sequenced for optimization (e.g., as specified by batches in an optimization descriptor). As well, different optimization techniques may be used together in the same phase, or batch, of optimization.

Different settings may be optimized in different phases (batches), so that, for example, a first batch may optimize resources, and a succeeding batch may, while pinning the optimized resources, proceed to optimize JVM settings, for example.

Feedback from assessments driven by any optimization technique may be propagated to all (or selected) optimization techniques in use which are capable of using this feedback (e.g., Reinforced Learning, Evolutionary, Bayesian, heuristics, etc.). For example, feedback from Evolutionary optimization algorithms, or heuristics such as ouch may also be used to train the neural network used by reinforced learning or to provide an external solution to Bayesian. Or, for example, feedback from reinforced learning may also be used to provide external solutions to Evolutionary or Bayesian, or to provide a reward to heuristics, e.g. ouch.

Other embodiments are directed to various method(s), system(s) and/or computer program product(s) for causing at least one processor to execute a plurality of instructions for implementing and/or performing various Optune™-related procedures such as, for example:

Discovery: For example, at least one Optune™ UI may be configured or designed to enable a user to initiate a discovery run. The servo discovers (or may be configured by the user with) available application settings and operational metrics and provides these to the optimizer in the form of a remote application descriptor. The optimizer stores this descriptor in its database.

Configuration: For example, at least one Optune™ UI may be configured or designed to enable a user to initiate or perform various tasks or activities such as, for example: define or select a performance function (based on metrics) and cost model; provide configuration for the servo update and measure drivers; define or select a scoring function; select which application settings to optimize, optionally specifying new settings, and completes the descriptive specification of these settings (e.g., by defining the minimum and maximum values of range settings).

Calibration: For example, at least one Optune™ UI may be configured or designed to enable a user to initiate a calibration run. Optune™ measures the performance of the application in its initial runtime configuration and a small number of algorithmically determined runtime configurations. These measurements are repeated several times in order to determine the precision of measurement and assess the magnitude of change of performance and cost. The results are used to calculate default normalization coefficients for performance and cost in the scoring function, and a performance precision for optimization In one embodiment, if the precision is not satisfactory, remediation (e.g. reconfiguration of the servo measure driver) may be the responsibility of a user.

Optimization: For example, at least one Optune™ UI may be configured or select and initiate one or more different types of optimization runs (e.g., discrete or continuous) to perform as well as any options for this type.

FIG. 8 illustrates an example embodiment of an Optimization Run Procedure 800 which may be utilized for facilitating activities relating to one or more of the application optimization techniques disclosed herein.

According to different embodiments, different instances of the Optimization Run Procedure may be automatically initiated by the Optimizer System (e.g., in response to detecting the occurrence of specifically defined event(s) and/or condition(s)). Additionally, one or more users may initiate instances of the Optimization Run Procedure using the UI client interface 140 (FIG. 1). Upon initiation of the Optimization Run Procedure, the Optimizer System provisions an optimizer application to provide backend services for the optimization run. In at least some embodiments, the Optimizer System may be configured or designed to include functionality for enabling multiple instances of the Optimization Run Procedure to run simultaneously or concurrently.

As shown at 802, the Optimizer System causes a first measurement (or first set of measurements) to be determined in relation to a first objective. For example, in one embodiment, the servo 101 is directed by the Optimizer System to measure the operational metrics of the application in its initial runtime configuration, and returning the first measurement(s) to the optimizer. For example, in one embodiment, the first objective may be defined as: Measure Application Metrics using the measurement parameter: Throughput.

It will be appreciated that, in some embodiments, the measurement(s) of the application's operational metrics are not necessarily be made in relation to any particular objective, but rather are simply measurements. However, if one looks at the score as depending on performance, and performance depending on measured metrics, then the measurement(s) may be interpreted as being made in relation to a first objective (e.g., where the first objective corresponds to the type(s) of measurement parameters being measured (e.g., first objective=measurement parameter=throughput).

As shown at 804, the Optimizer System determines, using the first measurement, a first score in relation to the first objective. For example, in one embodiment, the optimizer calculates a first performance measurement of the application based on the measured metrics, and a first cost of the application based on its runtime configuration (e.g., provisioned resources). Based on the performance and cost, the optimizer determines a first score in relation to the optimization objective defined by the scoring function. Illustrative examples:

First Objective: Measure Application Metrics; Measurement parameter=Throughput;
Compute score using scoring function and measured throughput;
e.g., score=Throughput/cost (how much resources used);
e.g., First Score=2

In at least one embodiment, a scoring function which relates application performance to cost may be used as the optimization objective, where performance is computed from a combination of measured application metrics such as throughput or response time (or latency), and cost is computed from the application's costable resources such as component VM instance types, component cpu or memory resources, and/or the number of each such component. For example, according to different embodiments, the scoring objective may be defined to maximize one or more of the following (or combinations thereof):

performance-to-cost ratio (perf/cost);
a weighted balance between performance and cost, such as, for example: $perf^{w1}/cost$;
performance (where cost is represented as constant);
performance bounded by a maximum cost;
cost while maintaining a minimum performance;
number of users supported;
and/or other business metric(s) or Key Performance Indicator(s) (KPI(s));

As shown at 806, the optimizer determines updated applications settings to be assessed next. For example, based on the value of epsilon, the optimizer may select a random action or the action with the highest Q-value to determine the updated application settings. According to different embodiments, the determination of the updated application settings may be facilitated using one or more different heuristics and/or optimization controllers such as, for example: Q-learning using neural network as the Q function; Ouch heuristic; Stochastic (random choice); Bayesian; Evolutionary; Bruteforce; etc. Illustrative example: Updated applications settings to be assessed next=Increase CPU resources by 10%.

As shown at 808 the Optimizer System causes the application settings to be adjusted in accordance with the determined updated application settings. For example, in one embodiment, the servo is directed by the Optimizer System to dynamically adjust or modify a selected portion of the application's settings in accordance with the updated applications settings determined at 806. In at least one embodiment, the adjustment of the application settings may occur while the application is running in a live production environment. In other embodiments, the adjustment of the application settings may occur while the application is running in a test bed environment.

As shown at 810 the Optimizer System causes updated (second) measurement(s) to be determined in relation to the first objective. For example, in one embodiment, the servo is directed by the Optimizer System to measure the operational metrics of the application after the adjustment of the application settings (e.g. at 808) has been performed, returning a second measurement (or second set of measurements) to the optimizer Illustrative example: Take updated throughput measurements based on updated application settings.

According to different embodiments, measurements of the operational metrics of the application may be performed periodically over one or more time periods (e.g., every 2-3 hours). In at least one embodiment, measurements for each given metric may be reduced to a scalar (numeric) value.

As shown at 812, the Optimizer System determines, using the second measurement, a second score in relation to the first objective. For example, according to one embodiment, the optimizer calculates a second performance measurement of the application based on the measurements of the operational metrics (e.g., performed at 810), and calculates a second cost of the application based on its runtime configuration (e.g., provisioned resources). Using the second performance and second cost calculations, the optimizer determines a second score in relation to the optimization objective defined by the scoring function. Illustrative example:

Compute score using scoring function and measured throughput;
e.g., score=Throughput/cost (how much resources used)
e.g., Second Score=5

As shown at 814, the Optimizer System computes a first reward based on at least the second score. For example, in some embodiments, the first reward may correspond to the latest or most recent score (e.g., second score) which has been calculated. In other embodiments, the reward may be calculated based on a comparison of the second score and first score. For example, in one embodiment, the reward may be calculated based on the difference between the second and the first scores. Illustrative example:

Compute reward (e.g., difference between 2 scores)
Reward=+3

As shown at 816, the Optimizer System feeds the most recently calculated reward (e.g., first reward) back to all (or selected) optimization algorithms, and selects an optimization algorithm to be used to determine next cycle of adjustment. For example, in at least one embodiment, the Optimizer System feeds the calculated reward back to all (or selected) optimization techniques which can receive such feedback (e.g., all but bruteforce). The Optimizer System identifies and selects one optimization technique to provide the next adjustment.

According to different embodiments, the selection of which optimization technique is to be used depends on the configuration parameters of the optimization technique and/or heuristics for the current phase (batch), and may vary from batch to batch within an optimization run. For example, when using reinforced learning and the ouch heuristic in an if-then hierarchy:

(a) check ouch,
(b) if not-ouch check epsilon (random),
(c) if not epsilon then best-Q from Q-learning.

In at least some embodiments, these sequences of activities and decisions may be implemented as conditional steps or operations in the Optimization Run Procedure.

In some embodiments, the selection of which optimization technique to be used may be specified in the optimization descriptor. In some embodiments, a hybrid or blended combination of optimization technique(s) may be used, which may include the blending of different optimizers within a batch, outside of the example if-then hierarchy. For example, a hybrid/blended optimization technique may be used within a batch to specify which optimization techniques are to be used and how they are to be sequenced, according to some schema (e.g., hybrid/blended optimization descriptor 600, FIG. 6).

As shown at 818, the Optimizer System determines, using at least the first reward or updated reward and selected optimization algorithm, updated application settings for the next cycle of adjustment of the application settings. For example, during execution of the first feedback cycle, the updated application settings may be determined using the first reward. In a subsequent feedback cycle, newly updated application settings may be determined using an updated reward (e.g., generated at 826).

In at least one embodiment, the reward is not directly used to determine the updated application settings for the next cycle of adjustment, but rather, has already been fed back into the optimization algorithm(s). For example, in one embodiment, the reward is used to update various fields in the Neural Network/Bayesian/etc. (e.g., weights and biases on some of the Neural Network neurons), and then the resulting updated data is used to generate the updated application settings for the next cycle of adjustment. In such embodiments, the reward is indirectly used to determine the updated application settings.

Various examples of how the Optimizer System may determine the updated application settings are provided below for illustrative purposes:
   (a) The first reward is used algorithmically to train the neural network of reinforced learning (e.g., in relation to the transition from the first runtime configuration to the second).
   (b) Based on the first reward, the optimizer may use ouch to select a next action, which, for example, may be the inverse of the previous action (e.g., backing out the previous step); or, failing that . . . .
   (c) Based on the value of epsilon, the optimizer may select a random action; or, failing that . . . .
   (d) The optimizer may select the action with the highest Q-value to determine the updated application settings.

According to different embodiments, the Evolutionary optimization technique may be configured or designed to process feedback in populations (e.g., of size 5). In some embodiments where bruteforce optimization is used, it may not rely on feedback. For example, in one embodiment, we may have a first batch which does coarse bruteforce optimization, followed by a second batch which uses reinforced learning optimization, going forward from the best state/score found by bruteforce.

In at least one embodiment, the "next cycle" of adjustment (also referred to herein as the "feedback cycle") may correspond to the sequence of operations described with respect to operations 816-828 of FIG. 8.

As shown at 820, the Optimizer System causes the application settings to be adjusted in accordance with the updated application settings for next dynamic adjustment. For example, in one embodiment, the servo is directed by the Optimizer System to dynamically adjust the application settings in accordance with the updated application settings for next dynamic adjustment. Illustrative example:
   (a) Application was in state A initially;
   (b) Adjusted to state B, resulting in reward of +3;
   (c) Optimizer determines a next state C based on history of reward(s) and/or history of updated application settings.

As shown at 822, the Optimizer System causes an updated (e.g., third) measurement (or third set of measurements) to be determined in relation to the first objective. For example, in one embodiment, the servo is directed by the Optimizer System to measure the operational metrics of the application in its current state of configuration, and return a third measurement (or third set of measurements) to the optimizer.

As shown at 824, the Optimizer System determines, using the updated (third) measurement, an updated (e.g., third) score in relation to the first objective. For example, in one embodiment, the Optimizer System calculates a third performance measurement of the application based on the measured metrics, and a third cost of the application based on its runtime configuration (e.g., provisioned resources). Based on the performance and cost, the optimizer determines an updated (e.g., third) score in relation to the optimization objective defined by the scoring function.

As shown at 826, the Optimizer System computes an updated (e.g., second) reward based on at least the current or most recently calculated score (e.g., third score). For example, in some embodiments, the second reward may correspond to the latest or most recent score (e.g., third score) which has been calculated. In other embodiments, the reward may be calculated based on a comparison of the third score and second score (and/or other previously calculated scores). For example, in one embodiment, the optimizer calculates a second reward based on comparing the third and second scores (e.g., the reward may be the difference between the third and second scores).

As shown at 828, the optimizer determines if the optimization run is finished. If not finished, the newly updated reward (e.g., generated at 826) is fed back to all (or selected) optimization algorithms, and the Optimizer System performs a next cycle of adjustment, for example, by repeating operations 816-828.

According to different embodiments, the Optimizer System may determine that an optimization run is finished when it detects that specific conditions and/or events have occurred or have been satisfied such as, for example:
   Manual termination
   An external interrupt is detected. For example, using the UI client, a user initiates a request to stop an optimization run. In some embodiments, the external interrupt request may be automatically generated by a remote component of the optimization network.
   Condition(s)/event(s) detected for automatically terminating. For example:
      Convergence detected, or a convergence threshold is met (e g, diminishing returns in increase of score, or as ordinarily determined by an Evolutionary algorithm).
      Pre-configured amount of work has been performed (e.g., predetermined number of assessments have been performed).
      Pre-configured degree of improvement is obtained (e.g., a specified score threshold has been reached).
      A maximum number of epochs is reached on the last batch of a sequence.
      A maximum number of steps is reached by the driver.
      A specified score threshold (or percent increase in score) is reached.
      Magnitude of change meets specified criteria.
      No more fine changes to be made (vs coarse changes).
      Predetermined amount of changes has been achieved (e.g., stop after x hours; stop after x updates/steps; etc.)

As shown at 830, if the Optimizer System determines that the optimization run is finished or completed, it may store the optimization run trace in the database, and terminate that instance of the Optimization Run Procedure.

In at least some embodiments, feedback from assessments driven by heuristic or algorithmic techniques may also be used to train the neural network used by reinforced learning, where these techniques may be applied at the beginning of an optimization run, or may be in mixed in with assessments driven by reinforced learning during the course of the optimization run.

In at least some embodiments, the Optimizer System may be configured or designed to use deduplication to improve optimization efficiency.

In at least some embodiments, the Optimizer System may be configured or designed to replay previous optimization run(s) both to inform deduplication and to train the neural network used by reinforced learning. Replay also allows for changes in the scoring function to be applied to previous optimization runs.

In at least some embodiments, the representation of the application environment may be represented as a list of actuators (N-dimensional problem space), and its state may be represented as a list of numbers (application state). These representations make possible the optimization of any settings of any application using abstract data structures.

In at least some embodiments, one or more Application Optimization techniques described herein may be implemented as SaaS service which can securely optimize a customer's application in any of a wide variety of remote environments (e.g., public clouds or container services, private clouds or container clusters). Architecturally, the SaaS service separates functionality between a servo, or agent, which is installed in the customer's environment and a backend SaaS service here termed the optimizer, or server. The servo uses pluggable update and measure drivers which support the specific customer application environment, and uses a fault tolerant SaaS protocol to communicate with the optimizer. This protocol inverts the usual client-server control relationship such that the servo self-synchronizes with the optimizer leading and the servo following. The optimizer, or backend Optune™ server, steers and moves forward the Optune™ Application Optimization Procedure(s).

Figure 9:
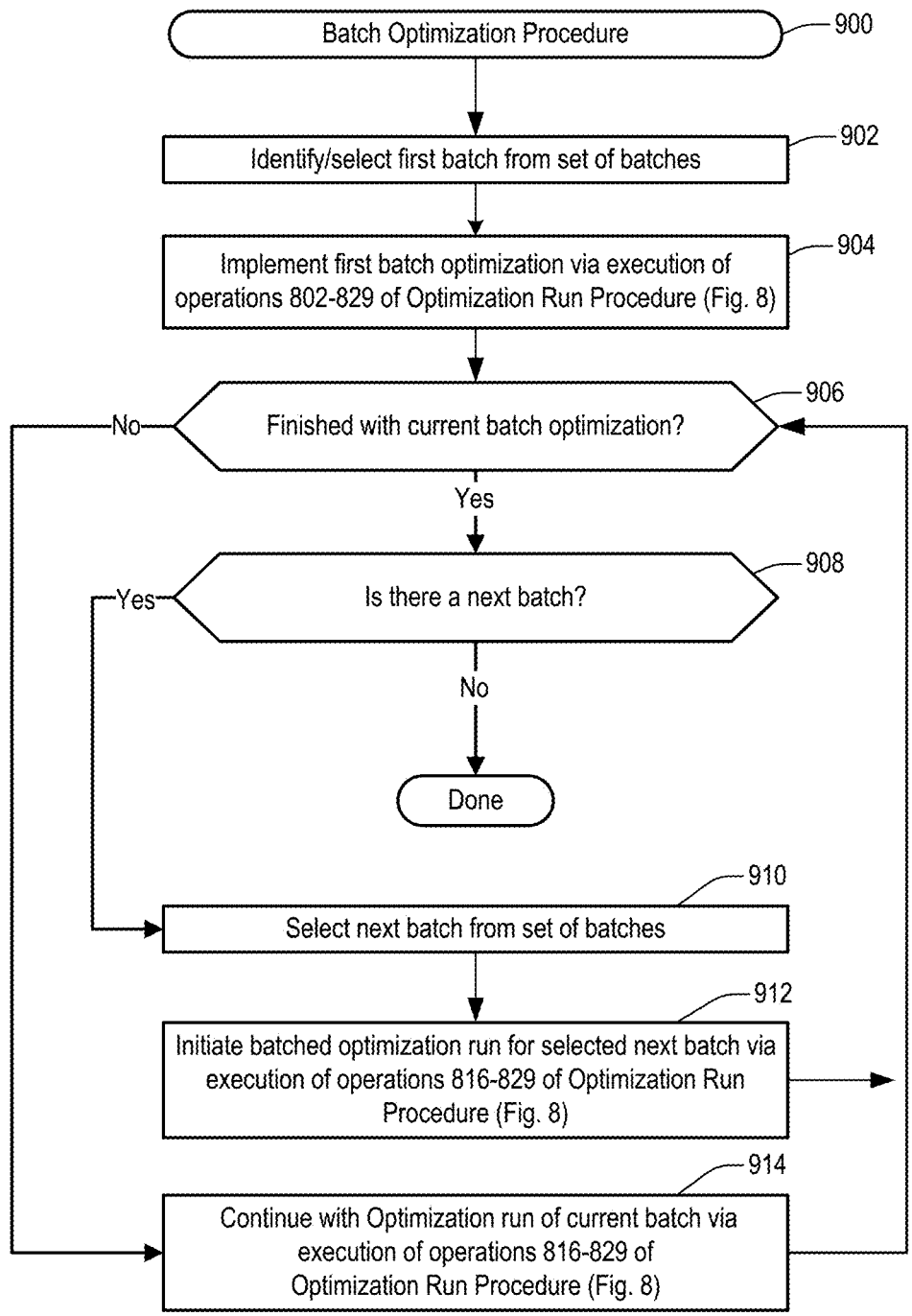
FIG. 9 illustrates an example embodiment of a Batch Optimization Procedure 900 which may be utilized for facilitating activities relating to one or more of the application optimization techniques disclosed herein.

FIG. 9 illustrates an example embodiment of a Batch Optimization Procedure 900 which may be utilized for facilitating activities relating to one or more of the application optimization techniques disclosed herein.

According to different embodiments, different instances of the Batch Optimization Procedure may be automatically initiated by the Optimizer System (e.g., in response to detecting the occurrence of specifically defined event(s) and/or condition(s)). Additionally, one or more users may initiate instances of the Batch Optimization Procedure using the UI client interface 140 (FIG. 1). Upon initiation of the Batch Optimization Procedure, the Optimizer System provisions an instance of an optimizer application to provide backend services for the optimization run(s). In at least some embodiments, the Optimizer System may be configured or designed to include functionality for enabling multiple instances of the Batch Optimization Procedure to run simultaneously or concurrently.

As shown at 902, the Optimizer System may identify/select a first batch from set of batches. In one embodiment, each optimization descriptor may describe a set of batches to be used during an optimization run. In at least one embodiment, the optimization descriptor may indicate an order or sequence in which different batches are to be run. Similarly, in at least some embodiments, one or more batches may be configured or designed to include information indicating a next batch to be run. In at least one embodiment, each batch may be configured or designed to include functionality for enabling multiple optimization techniques to be run in parallel or concurrently.

By way of illustration, referring to the example optimization descriptor 500 of FIG. 5, it can be seen in this particular example that the optimization descriptor 500 includes a description for at least three different batches, namely, Exploring 510, Exploiting 520, and Monitoring 530. As illustrated in the example embodiment of FIG. 5, the Exploring batch portion 510 of the optimization descriptor describes use of at least two different optimizer techniques, namely reinforced learning 512, and ouch 514. Exploring batch portion 510 also describes a next batch to be run at 511 (e.g., next batch=Exploiting). Similarly, as illustrated in the example embodiment of FIG. 5, the Exploiting batch portion 520 describes use of at least two different optimizer techniques, namely reinforced learning 522, and ouch 524. Exploiting batch portion 520 also describes a next batch to be run at 521 (e.g., next batch=Monitoring batch).

Returning to the flow diagram of FIG. 9, as shown at 904, the Optimizer System may implement a first batch optimization (e.g., Exploring batch 510) via execution of operations 802-829 of Optimization Run Procedure (FIG. 8).

As shown at 906, the Optimizer System makes a conditional determination as to whether (or not) the optimization run of the current batch is finished. In at least one embodiment, the processes by which the Optimizer System may determine if the current batch optimization has been completed may be similar to those described with respect to 828 of FIG. 8.

In at least one embodiment, if the Optimizer System determines that that the current batch optimization has not been completed (i.e. "No"), then the Optimizer System may continue (914) with the optimization run of current batch, for example, via execution of operations 816-829 of the Optimization Run Procedure (FIG. 8).

Alternatively, if the Optimizer System determines (at 906) that the current batch optimization has been completed (i.e. "Yes"), then the Optimizer System may next determine (908) whether (or not) there is a next batch optimization to be performed.

For example, in a specific embodiment where an instance of the Batch Optimization Procedure 900 is initiated using the optimization descriptor 500 of FIG. 5, if it is assumed that the Batch Optimization Procedure is currently performing a batch optimization run for the Exploring batch portion 510, and determines at 906 that the current Exploring batch optimization has been completed, the Optimizer System may determine 908 that there are two additional batch optimization runs to be performed, namely those associated with Exploiting batch 520, and Monitoring batch 530.

Accordingly, as shown at 910, the Optimizer System may select a next batch from the set of remaining batches to be run for optimization In this specific example embodiment, the Optimizer System would select the Exploiting batch 520 as the next batch to be used for an optimization run, since, as illustrated in the example embodiment of FIG. 5, the Exploring batch 510 portion of the optimization descriptor identifies (e.g. at 511) the Exploiting batch as the next batch.

As shown at 912, the Optimizer System may initiate a batch optimization run for the selected next batch via execution of operations 816-829 of Optimization Run Procedure (FIG. 8).

In at least one embodiment, the Optimizer System may store the appropriate optimization run trace(s) in the database. When the Optimizer System determines that the optimization run for all batches has been completed, it may terminate that instance of the Batch Optimization Procedure.

Figure 10:
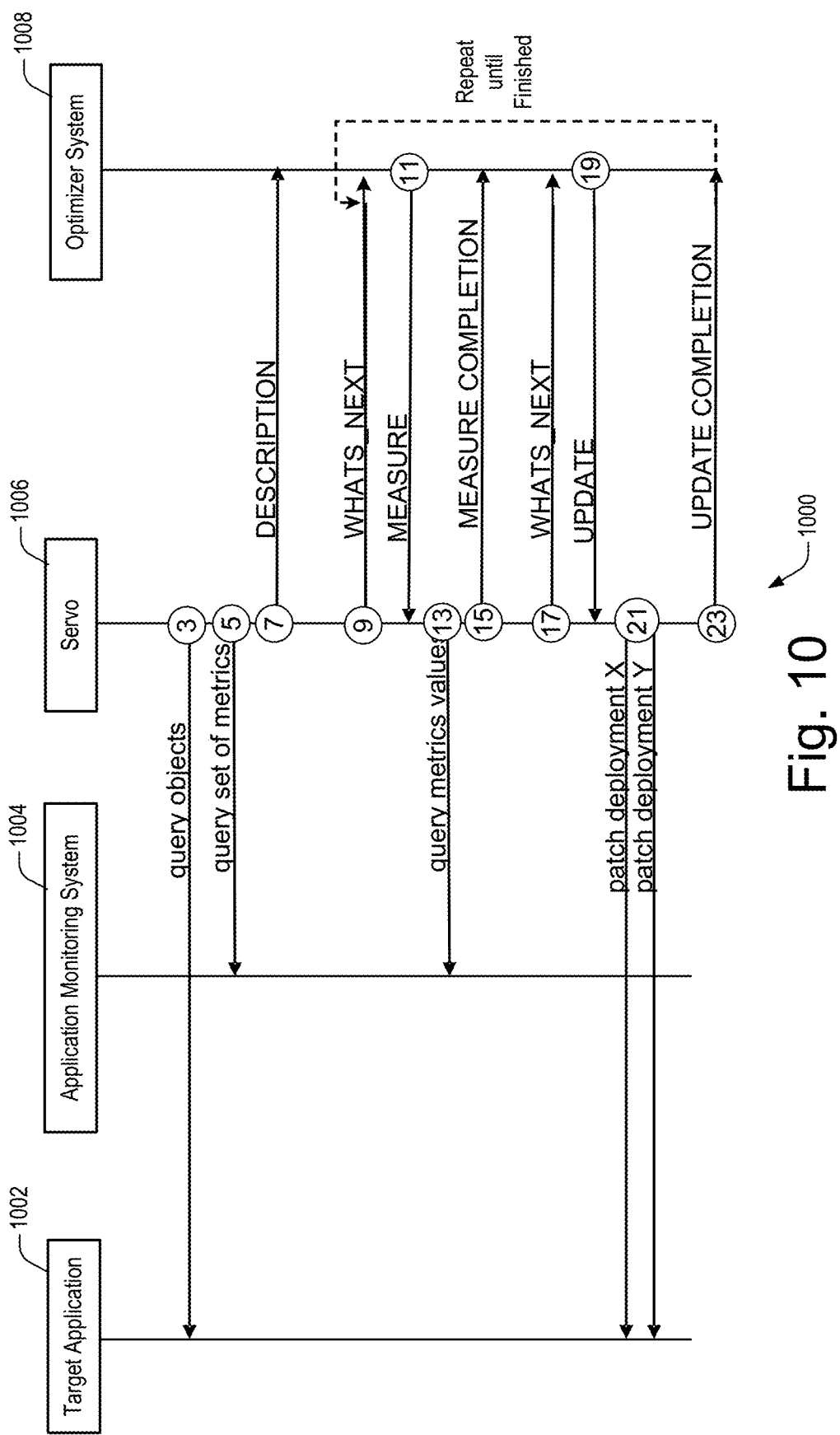
FIG. 10 illustrates an example servo optimization cycle event flow diagram 1000 which may be utilized for facilitating activities relating to one or more of the application optimization techniques disclosed herein.

FIG. 10 illustrates an example servo optimization cycle event flow diagram 1000 which may be utilized for facilitating activities relating to one or more of the application optimization techniques disclosed herein. In the specific example embodiment of FIG. 10, it is assumed that servo 1006 is optimizing a Kubernetes application 1002 within a customer environment which may be configured or designed to provide application operational metrics via an application monitoring system 1004. In one embodiment, the application monitoring system 1004 may be implemented using the Prometheus open-source systems monitoring and alerting toolkit.

On start, the servo 1006 queries (3) the application objects (1002) to obtain a set of application settings, and queries (5) the Prometheus API (1004) to obtain a set of metrics. When the servo first connects to the Optimizer System 1008, it may provide (7) this discovered data to the optimizer in a description request. The servo then performs cycles of measure and update (e.g., Operations 9-23 of FIG. 10), as directed by the Optimizer System 1008. For example, as illustrated in the example embodiment of FIG. 10:

The servo requests (9) whatsnext to the Optimizer System, and the optimizer responds (11): measure.
The servo queries (13) the Prometheus metrics from the application monitoring system 1004.
The servo requests (15) completion for the measure command to the Optimizer System, sending its results.
The servo requests (17) whatsnext to the Optimizer System, and the optimizer responds (19): update.
The servo patches (21) the deployment objects of the Kubernetes application 1002 to perform the update.
The servo requests (23) completion for the update command, sending its results.

In at least one embodiment, the sequence of operations corresponding to 9-23 of FIG. 10 may be repeated until the Optimizer System determines that the optimization run has finished.

In at least some embodiments, the Optune™ servo may be packaged as a container for convenience. The base agent and a set of update and measure drivers may be provided in a public github repository, together with a template Dockerfile which may be used to build a servo image. Because the driver commands are executed in a customer's environment, the servo may preferably be implemented using open source software, for example, so that it may be examined and its functioning verified or modified.

For example, in one embodiment, an Optune™ user may use a pre-built servo image which includes drivers which are suitable for their target environment and application. Alternatively a user may use the public servo repository to build a servo image which meets their particular need, for example, by:

Changing the servo base image;
Changing library packages installed on the servo (e.g., python3, requests) or installing additional packages which may be needed by the servo drivers (e.g., kubectl), or which may be desired by the user (e.g., logging agent, monitoring agent); and/or
Choosing which update and measure drivers to install on the servo, including any custom drivers the user may create.

In some embodiments, one instance of a servo may be responsible for a single application, and multiple servo runtime instances may exist concurrently on the same host. In one embodiment, the servo is stateless in the sense that it does not save state outside of its runtime operation.

Figure 11:
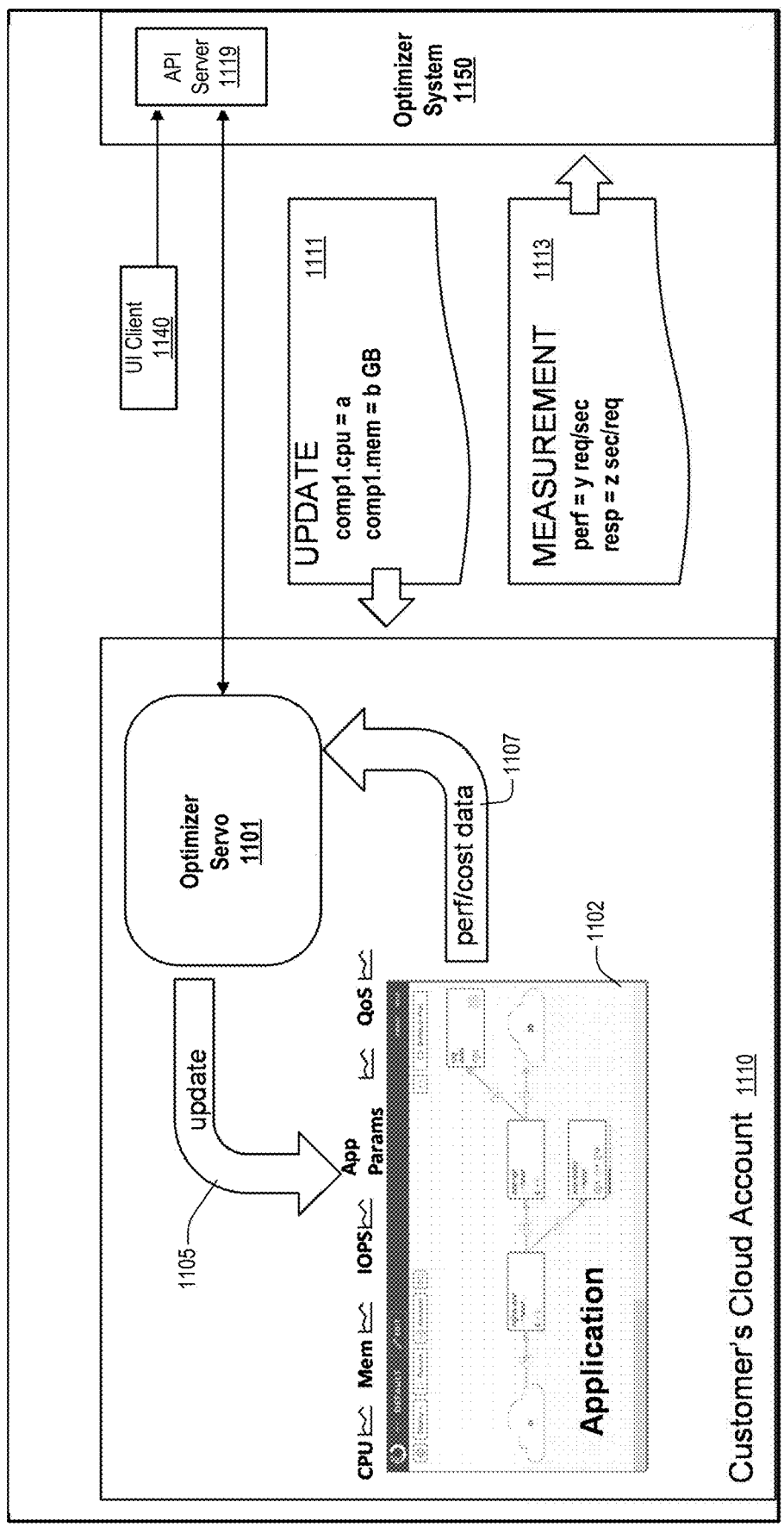
FIG. 11 illustrates an example embodiment of data exchange between various network components of an application optimization network.

FIG. 11 illustrates an example embodiment of data exchange between the servo 1101 and customer's environment 1110 and between the servo 1101 and the Optune™ SaaS API 1119. In the specific example embodiment of FIG. 11:

The servo 1101 authenticates with the Optune™ SaaS API 1119 of Optimizer System 1150, and communicates using a secure, encrypted communication protocol (e.g., HTTPS) to establish a secure encrypted connection to the Optune™ service. The optimizer drives the servo's operation within the customer's environment, e.g., by instructing the servo to update the application's settings, or to measure the application's performance. These operations may take less than a minute or more than ten minutes to perform; for this reason, the communication between the servo and the optimizer may preferably be configured or designed to support asynchronous communications.

Within the customer's environment (e.g., customer's cloud account 1110) the servo uses pluggable update and measure drivers to effect its operations and interactions with the target application 1102. In at least some embodiments, these drivers do not communicate directly with the Optune™ service. As instructed by the optimizer (e.g., as shown at 1111), the servo executes 1105 application update(s), and performs 1107 measure operations, returning results to the optimizer (e.g., as shown at 1113).

Figure 12:
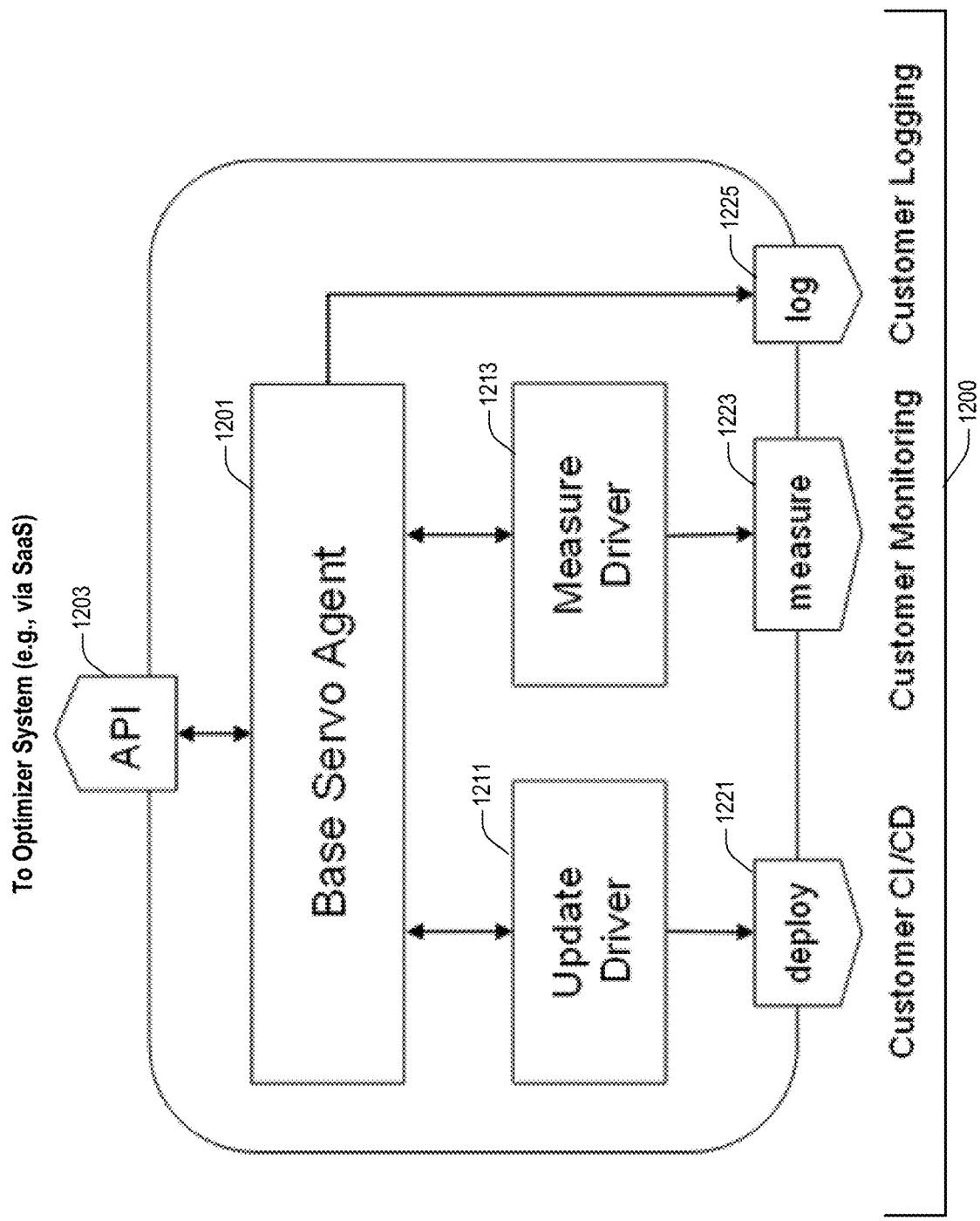
FIG. 12 illustrates an example embodiment of an Optune™ servo 1200 which has been configured or designed to include functionality for integration in a customer's environment.

FIG. 12 illustrates an example embodiment of an Optune™ servo 1200 which has been configured or designed to include functionality for integration in a customer's environment. By way of illustration, the various components and functions of the Optune™ servo 1200 are described below. As described in greater detail below, the Optune™ servo 1200 may be configured or designed in accordance with one or more of the following aspects:

Servo is a stateless agent.
Servo is packaged as a container or VM, typically running as part of the application.
Pre-packaged servos available.
User-packaged servo:
 user chooses base OS/image;
 open source servo base utility;
 open source adjustment driver;
 open source measurement driver;
 user finalizes Dockerfile.
Configuration:
 API access token;
 Application ID;
 optional YAML descriptor;
Standard container logging or user-installed logging agent (optional).

Base Servo Agent 1201

In one embodiment, the base servo agent is the servo container entrypoint (e.g., that executable which is run when the container is started). The base servo agent communicates with the Optune™ SaaS API 1203 (deployed at the Optimizer System) as described, for example, in the Saas Protocol section below. It uses this API to synchronize with the optimizer on start, and thereafter follows the optimizer's direction in optimizing the application, for example, by executing the update and measure drivers to effect changes in the application's runtime configuration, measuring the application's operational metrics, and/or obtain information about the application or its settings or its operational metrics from the environment.

The base servo agent includes functionality for writing logs 1225 to stdout and stderr, following the standard container logging practice. Customers who build their own servo images may install any kind of logging agent they choose.

Update Driver 1211

In one embodiment, an update driver exposes a command interface which is used by the base servo agent as described in the Driver Commands section below. This driver integrates with the customer environment so that it may perform or deploy (e.g., 1221) a variety of operations such as, for example:

- update the settings of an application such that the runtime configuration changes are deployed;
- provide a description of the application and its settings and their values (e.g., by querying the environment);
- and/or other types of update operations to be deployed in the customer environment.

By way of illustration, the following are example means whereby an update driver may integrate with an environment:

- via an API exposed by the environment such as the Docker API, the Kubernetes API, the Amazon EC2 API, etc.;
- via a command line tool which interacts with the environment such as the Docker CLI, kubectl, the Amazon AWS CLI, etc.;
- via the API or command interface of a CI/CD tool or deployment orchestrator such as Skopos or Mesosphere;
- via integration with custom deployment or CI/CD tools which may be available to the customer;
- via direct modification of the application, e.g., by executing commands in a shell of one or more application components to modify kernel tuning parameters, and restarting that component as required;
- etc.

Measure Driver 1213

A measure driver also exposes a command interface as described in the Driver Commands section below. In one embodiment, this driver may be configured or designed to integrate with the customer environment so that it may perform various operations, such as, for example:

- measure (e.g., 1223) the operational metrics of the application;
- provide a description of the application operational metrics and their values (e.g., by querying the environment, or through its own implementation as in the case of an Apache Benchmark measure driver which may describe its own performance metrics);
- and/or other types of measure operations to be conducted in the customer environment.

In at least one embodiment, a measure driver may be configured or designed to include functionality for measuring the application's performance under a load outside the control of the driver, such as the ordinary operational load of the application, or load provided by a test bed or staging environment. Alternatively, a driver may artificially generate load on the application and measure its performance under this synthetic load.

By way of illustration, the following are example means whereby a measure driver may integrate with an environment:

- via the API or command interface of application monitoring systems such as Nagios, Zabbix, or Prometheus;
- via the API or command interface of the environment, such as that provided by the Kubernetes Heapster and Core Metrics services via the Kubernetes API;
- via the API or command interface of application benchmark tools such as Apache Benchmark, Apache JMeter, or CloudStone; where:
    - such a tool may already exist, with access to the application environment, and may expose an API or command line interface which may be accessed by the measure driver
    - or, such a tool may be included in the packaging of the measure driver and be executed directly by that driver
- via integration with custom load generating or performance measurement tools which may be available to the customer;
- etc.

Configuration

In one embodiment, the servo may be configured on start via its command line interface. This configuration may include, for example:

API access token. In one embodiment, the API access token may be configured or designed to provide the security identity of the servo and is used to access the Optune™ SaaS API. In one embodiment this may be implemented as a Google Firebase authentication token generated when an Optune™ user logs in via the Optune™ web UI (e.g., which uses Firebase for authentication).

Application ID. In one embodiment, the Application ID may represent the application's unique identifier within the set of some or all applications associated to a customer account. In one embodiment the Application ID may correspond to, or may include the application name.

In at least some embodiments, the servo may optionally be configured with a remote application descriptor made available within the filesystem of the servo. Recall that the update driver may provide information about the application and its available settings, and the measure driver may provide information about available operational metrics. These two sets of data may be combined to form a remote application descriptor which may be sent by the servo to the optimizer. If the servo is configured with a remote application descriptor on start (e.g., as a YAML, descriptor within the filesystem of the servo), then this provided descriptor may be used instead of that obtained from the drivers. See the Driver Commands section below for details regarding the contents of the application settings and measurement descriptions provided by the update and measure drivers.

Driver Commands

In one embodiment, the base servo agent executes a driver as a Python3 subprocess, and decodes this process's stdout line-by-line as it occurs (e.g., to support progress messages). A driver receives basic input such as the application ID on its command line, and structured JSON text input on stdin (e.g., the settings describing a next application runtime configuration to deploy). Driver commands output progress or results in the form of structured JSON text, one object per line of output, on stdout, and exit with a code reflecting the completion status of the driver operation (e.g., 0 for success, >0 for failure conditions). Drivers output debug information on stderr which may be logged by the base servo agent.

In at least one embodiment, the driver command interface may be configured or designed to support the following basic operations:

query: return a description provided by the driver
an update driver returns a description of the configurable settings an application and their current values
a measure driver returns a description of the application operational metrics update: change the application's configurable settings to match the input values and instantiate, or deploy, these changes measure: return a set of measured operational metrics (e.g., performance metrics); some drivers may also generate load as part of performing a measurement The update and measure commands may take a long time to complete. For this reason, as applicable these commands periodically output progress messages on stdout and support cancellation via a signal handler for SIGUSR1. On failure, any of these commands may report an error message.

In some embodiments may be preferable that agent not run multiple update or measure commands concurrently. The agent itself, or a particular command, or even the agent host, might fail and cause an abnormal exit. Where applicable driver commands check for any outstanding operation which may have been initiated with an asynchronous interface such as AWS EC2 or a similar control API.

If a command detects that a previous operation has not exited or has left over unfinished work, it attempts to clean up and reset the environment to a state where it may begin operation normally. A failure to clean up or any other failure that prevents initiating the operation is considered fatal and is reported with a fatal error message. The agent transmits this to the SaaS service which in turn requests operator attention in the web UI.

Drivers

In at least one embodiment, Optune™ may include one or more different drivers for the servo, as described in greater detail below.

Update Drivers k8s: the Kubernetes update driver uses the kubectl command line utility to effect its operations; an alternate implementation may use the Kubernetes API directly.
It may require for its configuration a kubectl configuration file.
The query command returns for at least one component of the application:
CPU resource assignments, both the limit and the reserve
memory resource assignments, both the limit and the reserve
replica count
the set of environment variables exposed as part of the component's runtime configuration
The update command uses the kubect1 patch command to effect changes in the applications settings (e.g., by patching Kubernetes deployment objects).

skopos: the Skopos update driver uses the Skopos API to effect its operations, and may optimize applications in any environment supported by Skopos (e.g., Docker single host, Docker Swarm, Kubernetes, ec2-asg).
It may require for its configuration a Skopos application model descriptor and a list of Skopos target environment descriptors (TEDs). These may be specified in any form accepted by Skopos (e.g., a file path in the servo file system, or an HTTP URL or github URL to fetch the descriptor from).
The query command returns a set of settings for the application and for at least one component of the application. These settings are extracted from the Skopos model descriptor and their values from the effective target environment descriptor as returned by the Skopos API. They may be any settings instrumented for the application or its components using the Skopos descriptor variable substitution mechanism.
The update command generates a last sequential TED which sets the variable values needed to adjust any application settings, loads the application model and TED descriptors using the Skopos API, and deploys these changes. Progress and completion are provided by querying the Skopos API to obtain the deployment status.

Measure Drivers ab: the Apache Benchmark measure driver uses this command line utility to effect its operations.
It may require for its input control the following load data:
the number of concurrent threads to use when generating load
the number of requests to make
the target URL to generate requests against
optionally: a user name and password to use when authenticating with the target server
The query command returns a description of the following metrics:
request throughput in requests per second
the time taken in seconds by the ab execution
the number of error responses received
the mean time taken per request in seconds
the mean time taken per request in seconds across some or all concurrent requests
The measure command uses the ab command to generate load on the application and measure the application's performance under that load. It parses the standard output of this command to obtain the supported metrics' values.

prometheus: the Prometheus measure driver uses the Prometheus API to effect its operations. It does not generate any load on the application.
Some or all commands may require for input control userdata indicating the base URL of the Prometheus API server to use.
The query command returns a description of some or all available Prometheus metrics.
The measure command additionally may require for its input control a set of metrics from among the available metrics whose values may be measured, and for at least one of these a relative API endpoint in relation to the base URL. This command uses the Prometheus API to query the value of at least one such metric after any warm up period or measurement duration has elapsed.

SaaS Protocol

The Optune™ SaaS protocol is used for communications between any servo and the optimizer. The protocol is based on HTTP(S) with the servo being the client the optimizer being the server. In the text below, then, client refers to the servo and server refers to the optimizer. The client authenticates with the server using the API access token configured with the servo.

By design this protocol is insensitive to failures and restarts of either the client or the server, while requiring no persistent storage on the client and only such persistent storage on the server as might be necessary to allow an optimization run to survive restart of the backend server. This fault tolerance is achieved through these basic means:

inversion of control: the usual client-server relation of control is inverted so that the client repeatedly makes a request asking the server what to do next, and while doing that next action may make further requests informing the server of its progress, and on completing that action makes a further request informing the server of its results. Whereupon the client again asks what's next.

client self-synchronization: on start the client makes a description request to the server providing its remote application descriptor with the request data. This allows the server to answer the succeeding what's next request, and allows the client to self-synchronize with the server leading and the client following.

error handling: both the client and the server respond to TCP errors, unexpected responses, and HTTP errors in such a way as to continue or recover where possible, or re-synchronize when continuation is not possible.

Some or all requests are sent as HTTP(S) POST to a URL consisting of a constant base URL (the Optune™ SaaS service base API endpoint) plus a query string specifying the request type. The JSON POST data of some or all requests specifies the application ID. The SaaS protocol supports the following client requests:

description: the description request may be configured or designed to provide JSON POST data specifying a remote application descriptor (the client discovered application settings and operational metrics), and receives an empty response ({ }). The client sends this request when it first successfully connects to the server, whenever it detects loss of connection to the server, or when requested by the server (see the whatsnext request below).

whatsnext: the client sends a whatsnext request repeatedly, as long as there is no previous whatsnext pending completion. The server replies with one of the following commands, optionally including arguments data, telling the client what it may do:

nop: do nothing—this is returned when the server has no command that it wants to send describe: send a description request abort: terminate a command in progress. The arguments include a command and arguments which may exactly match the command that is to be terminated.

reset: terminate any running command—this is returned if the server detects that it is out of synch with the client and no other corrective action could be taken update: update the application to a new runtime configuration. The arguments include the effective state of the target runtime configuration (see the environment controller for details).

measure: measure the operational metrics of the application. The arguments include a specification of the metrics to be measured as provided by the environment controller.

progress: the client sends a progress request periodically while a command, initiated by a reply to a whatsnext request, is in progress. The request data includes a command and arguments for which the progress is reporting.

completion: the client sends a completion request when a command, e g update or measure, completes. The request data includes the results of the command end: the client sends an end request when the servo is about to terminate during a normal shutdown See e.g., FIG. 10 for an example servo optimization cycle event flow diagram which illustrates the typical use of the SaaS protocol during such a cycle.

Optimizer

The optimizer, or Optimizer System, is the backend of the Optune™ SaaS service. At a high level:

The optimizer exposes a web interface customers may use to:

create an application within the scope of that user's Optune™ account, obtaining an API access token and application ID which may be used to configure a servo for the remote application specify an operator override descriptor (as described below): this descriptor is merged with the remote application descriptor provided by the servo to create an application descriptor (see e.g., FIG. 4)

configure an optimization run:

select or specify a cost model, performance function and scoring function select a type of optimization run and specify any options for that run start or stop an optimization run view the progress and results of optimization runs delete an application from that user's Optune™ account When a user starts an optimization run, the optimizer generates an optimization descriptor (see e.g., FIG. 5) based on the run configuration and the application descriptor. The optimizer then instantiates a virtualized optimizer application which may be configured with the customer account ID and application ID as well as the application and optimization descriptors. During its lifecycle, the optimizer application optimizes one remote application. It is destroyed when the optimization run completes. The optimizer application optimizes the remote application through iterative cycles of select, update and measure:

selection is accomplished using reinforced learning as well as a variety of other heuristics or algorithms update and measurement are accomplished by communicating with the remote application servo Examined as a workflow, the optimization of an application is typically accomplished in three phases (see e.g., FIG. 7):

1. Discovery and configuration:

a. Discovery: using the Optune™ UI a user initiates a discovery run. The servo discovers, or may be configured by the user with, available application settings and operational metrics and may be configured or designed to provide these to the optimizer in the form of a remote application descriptor. The optimizer stores this descriptor in its database.

b. Configuration: using the Optune™ UI a user:
defines or selects a performance function (based on metrics) and cost model (e g, Amazon EC2 instance type pricing, or memory and CPU based resource consumption pricing)
may be configured or designed to provide any non-default configuration for the servo update and measure drivers (e.g., measurement duration)
defines or selects a scoring function
selects which application settings to optimize, optionally specifying new settings, and completes the descriptive specification of these settings (e.g., by defining the minimum and maximum values of range settings)
2. Calibration:
a. Using the Optune™ UI a user initiates a calibration run. Optune™ measures the performance of the application in its initial runtime configuration and a small number of algorithmically determined runtime configurations. These measurements are repeated several times in order to determine the precision of measurement and assess the magnitude of change of performance and cost. The results are used to calculate default normalization coefficients for performance and cost in the scoring function, and a performance precision for optimization (if the precision is not satisfactory, remediation, e.g., reconfiguration of the servo measure driver, is the responsibility of a user)
3. Optimization:
a. Using the Optune™ UI a user selects a type of optimization run (e.g., discrete or continuous) to perform as well as any options for this type, and initiates the optimization run (see FIG. 8)

One skilled in the art may readily understand that the actions described above as performed by user (e.g., selecting settings, initiating calibration run, selecting scoring functions, etc.) may also be performed automatically via computer program and/or using default values.

Figure 13:
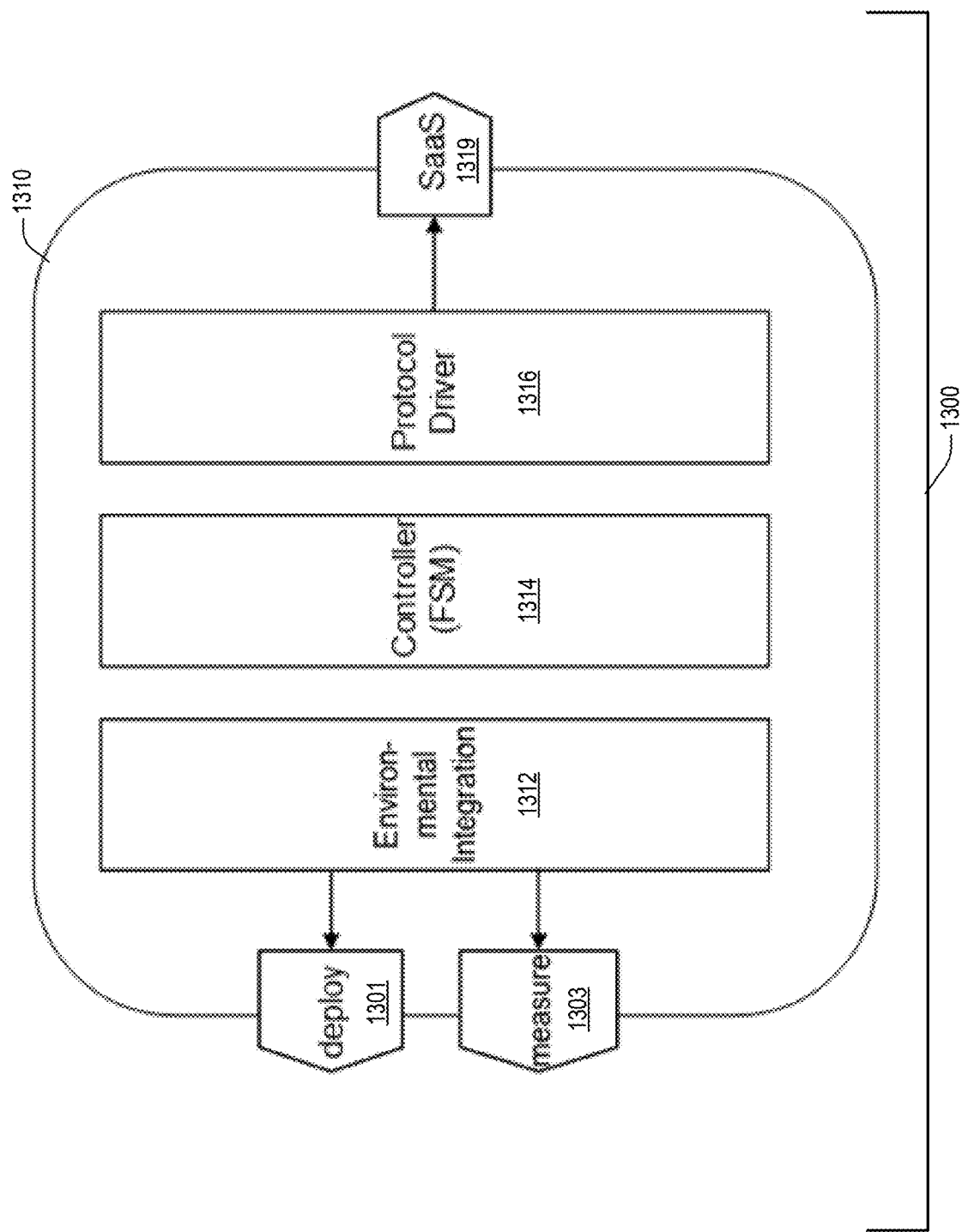
FIG. 13 illustrates an example functional embodiment of an Optune™ servo 1300

FIG. 13 illustrates an example functional embodiment of an Optune™ servo 1300 which is represented as functional layers, each with its distinct responsibilities. For example:
Protocol driver 1316 (to Optune SaaS API 1319):
connects and authenticates;
marshals and unmarshals;
inverts control (servo polls);
queues and aggregates events when API is inaccessible.
Controller 1314 (FSM):
maintains state;
effects transitions.
Environment Integration 1312:
connects to environment;
initiates and tracks updates;
initiates and tracks measurement;
accepts interruptions (e.g., Jenkins);
provides (partial) app and settings information.

In one embodiment, the protocol driver layer 1316 and controller layer 1314 may be embodied in the base servo agent, while the environment integration layer 1312 may be embodied in the update/deploy 1301 and measure 1303 drivers. In some embodiments, the deploy update and measurement operations may be long processes (e.g., 10 min or more each) and may be considered asynchronous to the servo. The servo can initiate them, check their progress and report upon their completion (ok/fail).

In at least one embodiment, the protocol driver layer 1316 may be configured or designed to include functionality for:
connecting to and authenticating with the Optune™ SaaS API using the configured API access token;
marshaling and unmarshaling data when communicating with this API;
inverting the usual client-server control relation so that the optimizer leads and the servo follows (e.g., see the Saas Protocol section below for details);
queuing and aggregating controller events when the SaaS API is inaccessible;
etc.

In at least one embodiment, the controller layer 1314 may be implemented as a finite state machine (FSM), and may be configured or designed to include functionality for:
synchronizing with the optimizer so that the optimizer is leading and the agent following;
maintaining agent state (e.g., as discussed with respect to FIG. 14);
effecting state transitions;
etc.

In at least one embodiment, the environment integration layer 1312 may be configured or designed to include functionality for:
connecting to the environment, e.g., via APIs;
initiating and tracking updates;
initiating and tracking measurements;
accepting interruptions, e.g., cancelling an update or measurement:
as directed by the optimizer, e.g., during synchronization with the optimizer after an interruption in optimizer service, or under operator control via the web UI;
when on start after an abnormal exit the agent discovers any outstanding operation it may have initiated with an asynchronous interface such as AWS EC2 or a similar control API;
providing a description of the application and its available settings and operational metrics;
etc.

Figure 14:
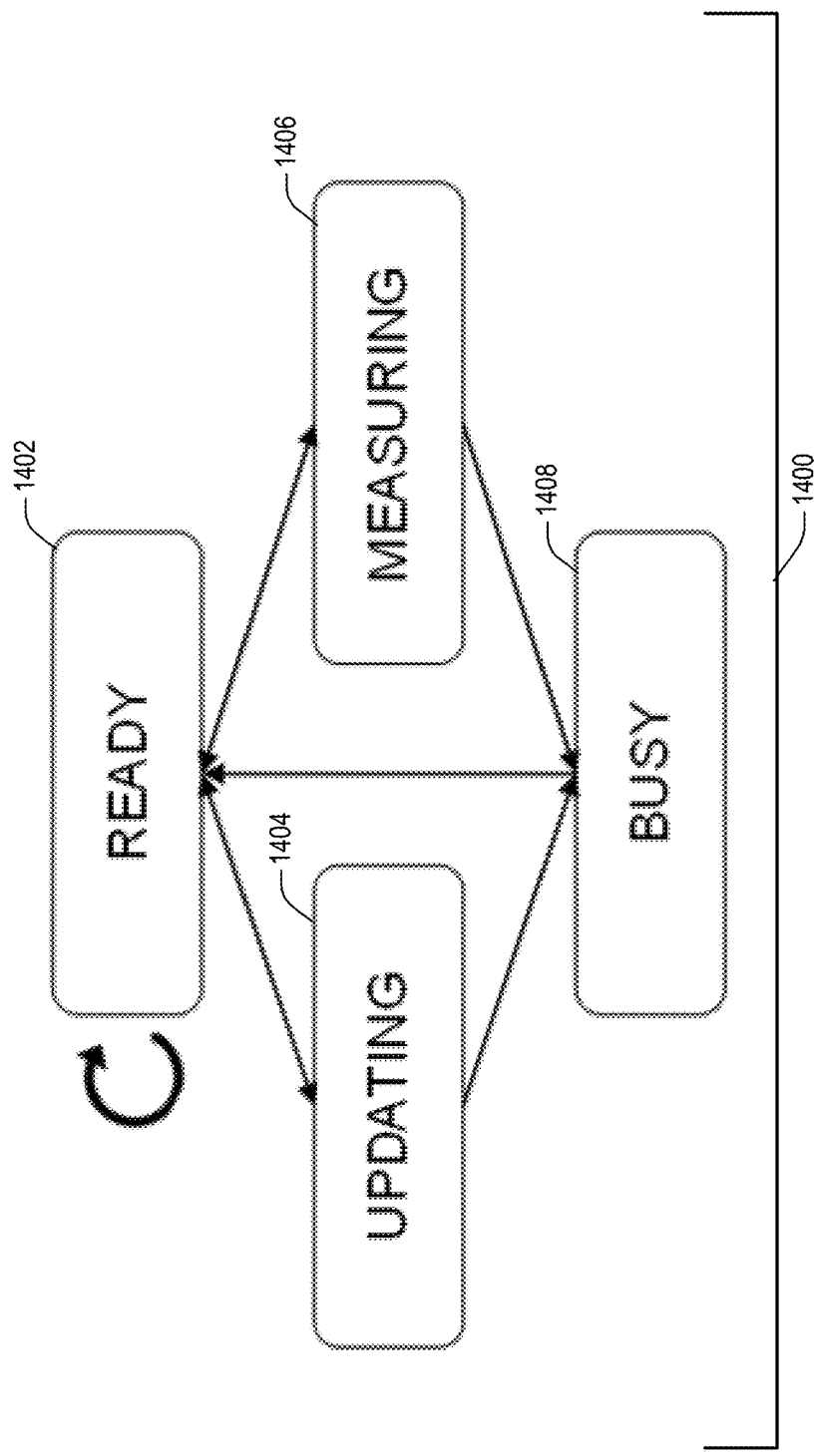
FIG. 14 illustrates a simplified example embodiment of a finite state machine (FSM) 1400

FIG. 14 illustrates a simplified example embodiment of a finite state machine (FSM) 1400, which may be configured or designed to perform the functions of the servo's controller layer (e.g., 1314, FIG. 13). As illustrated in the example embodiment of FIG. 14, the FSM may be configured or designed to include functionality for maintaining and effecting transitions among the following states:
Ready 1402: enabled, waiting for instructions.
Updating 1404: updating application run time configuration (deployment).
Measuring 1406: measuring application operational metrics (performance).
Busy 1408: busy completing/cleaning up some process, unable to process new requests; will go to ready soon.

Figure 15:
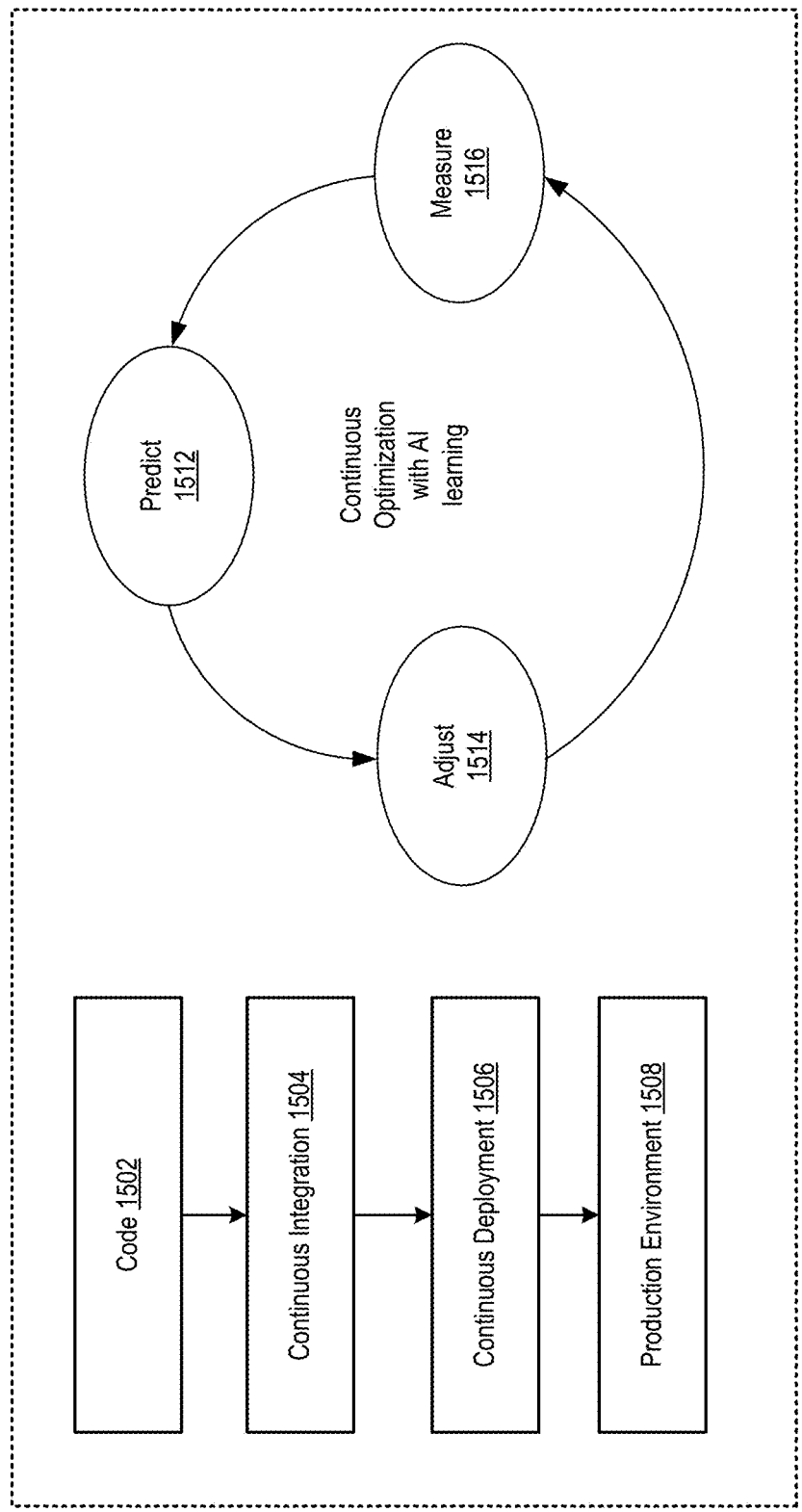
FIG. 15 provides an example illustration of how the Optune™ optimization service may be integrated in the continuous integration (CI)/continuous deployment (CD) toolchain

FIG. 15 provides an example illustration of how the Optune™ optimization service may be integrated in the continuous integration (CI)/continuous deployment (CD) toolchain to provide continuous optimization as part of this process (e.g., automated process which propagates new code commits to production deployment).

For example, by way of illustration with respect to the example embodiment of FIG. 15:
1502: a software code change or addition is committed to a code repository.
1504: the code check-in (1502) is verified by an automated build and test (early problem detection).
1506: if the build and test (1504) passes, new artifacts (e.g., container or VM images based on code) are deployed either to a test environment, or directly to production (1508).

Test environment: The Optimizer System performs continuous optimization with AI learning to optimize the application in the test environment under generated load, and to promote the optimal result to production (1508). As illustrated in the example embodiment of FIG. 15, the continuous optimization activities may be implemented as a cyclical flow which cycles through predict operations 1512, adjust operations 1514, and measure operations 1516. In the case of optimizing in a test environment, optimization is continuous in the sense that optimization is integrated in the CI/CD process, optimization results are promoted to production as part of this process, and this CI/CD process recurs throughout the lifetime of the application.

Direct deployment to production: The Optimizer System optimizes a canary (typically a single instance of a production deployment—e.g., one of the many instances of the application or component being optimized) in relation to the other production instances, in order to determine optimal settings for the canary. These optimal settings are then promoted to production (1508) (e.g., if they differ from what is currently running). In this way, Optune can tune an application directly in production using live variable load, by means of tuning a canary whose performance and cost are evaluated in relation to the production baseline deployment. In the case of optimizing directly in production, new artifacts are promoted to production (updating both the canary and all other production instances of the application), whereupon the Optimizer System optimizes the canary in relation to the other production instances, and then promotes its optimal results to these other production instances. In this case, too, optimization is continuous in the sense that it is integrated into the CI/CD process and recurs throughout the lifetime of the application.

1508: new artefacts are deployed to production.

In at least one embodiment, the Optune™ service optimizes either an application in a test environment under generated load, or a canary in the production environment under live production load. In at least one embodiment, the optimization activities performed by the Optune™ service may be implemented as a cyclical process comprising:

Predict operations 1512: determine a next runtime configuration to assess. In one embodiment, this prediction of a next solution is provided by any of the optimization algorithms/heuristics configured for this optimization run in Optune™

Adjust operations 1514: adjust the application (testbed or canary) to conform with the predicted next runtime configuration to assess (e.g., as determined at 1512).

Measure operations 1516: measure performance metrics of the application being optimized, e.g., request throughput, request response time, error rate, etc. In the case of canary optimization, metrics for both the canary and the base production deployment may be measured, so that they may be relatively compared.

1518: continue this cycle of predict-adjust-measure until finished or done. Promote the results to production (1508).

Figure 16:
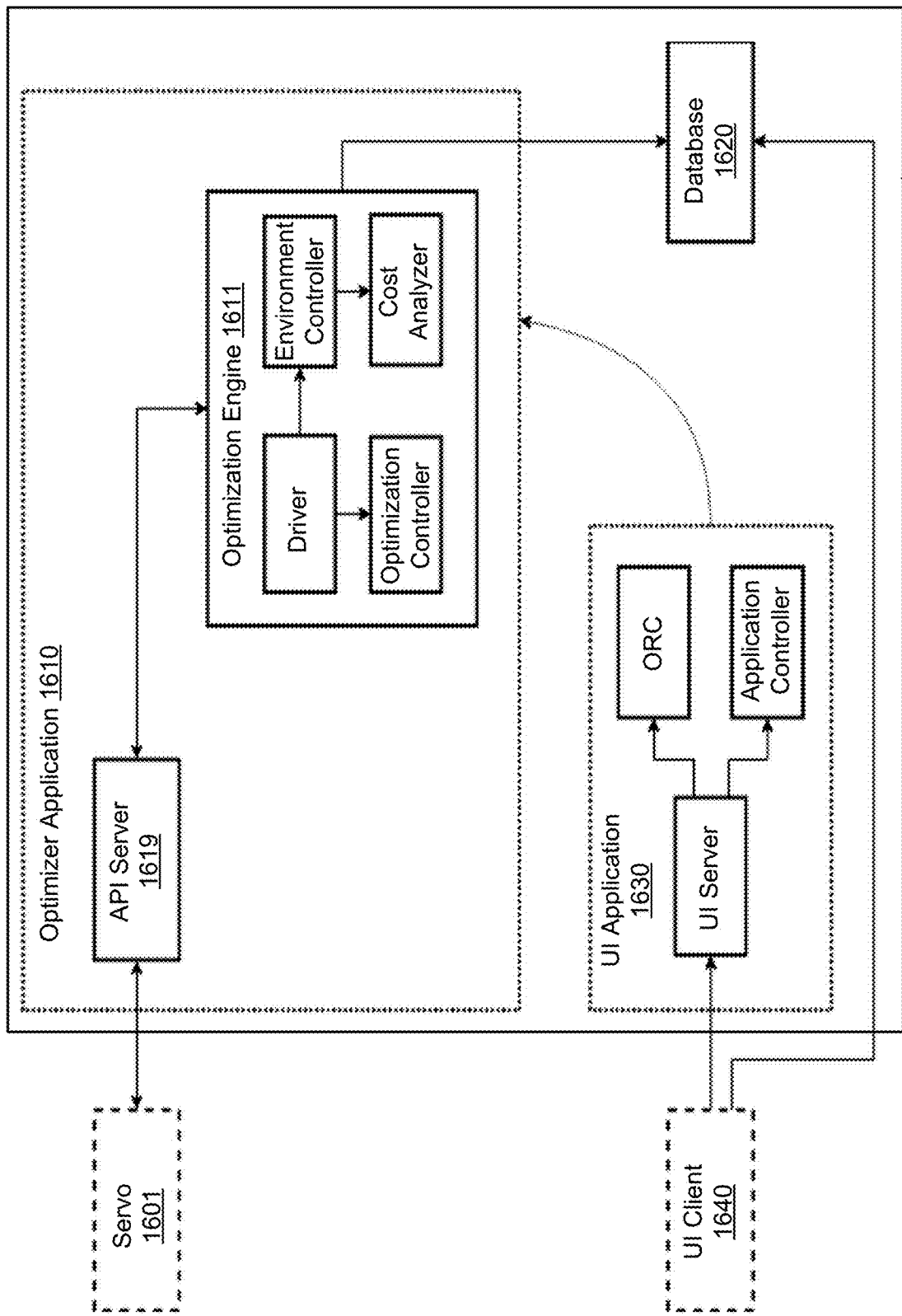
FIG. 16 illustrates an example functional decomposition of the optimizer, in accordance with a specific embodiment.

FIG. 16 illustrates an example functional decomposition of the optimizer, in accordance with a specific embodiment. In the specific example embodiment of FIG. 16, the servo 1601 and UI client 1640 each remotely interact with the optimizer 1650. To help clarify the detailed description of the functional decomposition which follows, a brief overview of the optimizer is described below, as well as an overview of the descriptors which configure an optimization run.

In one embodiment, the API server 1619 and the optimization engine 1611 are packaged together as a Docker container based on a minimal Python 3 image. This container is instantiated as part of an optimizer application at the start of an optimization run. The entrypoint script of this container initializes and starts the API server. The API server initializes and starts the driver of the optimization engine, communicates with the servo to accomplish update and measurement of the remote application, and returns results to the optimization engine. The API server and the functional components of the optimization engine are some or all implemented as Python 3 classes. The optimizer application also optionally includes an Nginx container which may be configured or designed to provide traffic encryption as well as authentication for the servo using services provided by the database.

In one embodiment, the optimizer uses Google Firestore for its database 1620 and Firebase for authentication. Firestore may be configured or designed to provide realtime NoSQL database services, authorization (data access controls), and event subscriptions and cloud functions which are used by the Optune™ UI client.

The UI server, optimization run constructor (ORC), and application controller are implemented as Python3 classes and packaged together as a Docker container based on a minimal Python 3 image. This container is instantiated as part of a UI application 1630. This application is persistent and may be configured or designed to provide the Optune™ customer facing web interface for some or all accounts and some or all applications, as well as the backend functionality for orchestrating the deployment of optimizer applications. The UI application also optionally includes an Nginx container which may be configured or designed to provide traffic encryption as well as authentication for UI clients using services provided by the database.

API Server

In at least one embodiment, the API server is created and run on start of the optimizer application. It is initialized with the account ID, application ID, application descriptor, and optimization descriptor provided to the optimizer application on its instantiation. The API server implements the server side of the SaaS protocol used to communicate with the servo. It responds to servo whatsnext requests with update and measure commands yielded on demand from the optimization engine, and returns the results of these commands asynchronously to the optimization engine.

On start, the API server creates a CherryPy web server and enters an initial state. In its initial state, the API server runs the web server and uses an initial event handler to synchronize with the servo. This handler responds to servo queries as follows:

whatsnext: return the describe command description: save the returned remote application descriptor and exit the web server Having synchronized with the servo, the API server initializes the driver of the optimization engine with:

the account ID, application ID, application descriptor, and optimization descriptor the remote application descriptor obtained during synchronization with the servo an asynchronous batch wrapper The batch wrapper is used to invert control between the API server and the driver so that the API server leads and the driver follows. When sequencing a batch, the driver initializes this wrapper with:

a run_batch generator function (a generator iterator which yields update and measure commands) which implements the optimization control loop of the batch the environment controller object: this exposes the methods of the environment controller to the API server The API server leads the driver by calling next or send on the run_batch iterator. The optimization control loop of this function then progresses until it yields an update or measure command, whereupon it waits until the API server instigates a next yield.

The env controller object exposes methods the API server uses to:

get a specification of the metrics to be measured and the measure driver configuration: these are used as parameters for the measure command returned by the API server to the servo as a response to whatsnext get the application target state and the update driver configuration: these are used as parameters for the update command returned by the API server to the servo as a response to whatsnext asynchronously return the results of a measure or update command (e.g., the measured operational metrics of the application, or the updated application state)

Having initialized the driver, the API server runs it and calls next on the run_batch iterator of the wrapper. The driver yields its first command, which is saved, and the API server again starts the web server and enters a running state. In its running state, the API server uses a running event handler which responds to servo queries as follows:

whatsnext: respond with the command last yielded from the run_batch iterator completion of an update or measure command:

return the completion data to the optimization engine using the asynchronous callback methods of the environment controller call send on the run_batch iterator and save the yielded command respond with OK Optimization Engine In at least one embodiment, the optimization engine is responsible for controlling and moving forward application optimization. The optimization engine may be comprised of the following functional components which are presented in an order convenient for explication.

Environment Controller

In at least one embodiment, the environment controller keeps state for the application environment and represents this state to the driver, and indirectly through the driver to the API server. The environment controller may represent the application environment in one or more of the following ways:

As an N-dimensional optimization problem space: the environment controller maintains a list of actuators, as described below, where at least one actuator represents one dimension of the problem space, where the value of an actuator is the present application runtime configuration in respect of the dimension of the actuator, and where the values of actuators may be changed (increased/decreased or incremented/decremented), as indicated by the attributes of the actuator, during the course of optimization As an application state: the application state represents the runtime configuration of the application as a list of numbers, where at least one number is the value of an actuator As an application effective state: the application effective state represents the runtime configuration of the application as a list of values of settings of the application As application metrics: the application metrics represent the operational metrics of the last measured application state The environment controller exposes functional methods which may be used to:

get the list of actuators get or set the application state get the application effective state get or set application metrics change the current application state to a target state: the environment controller may reject this change because it violates boundary conditions get a cost or performance measurement of the application get configuration for the servo measure or update drivers re-configure the environment controller on the start of any batch: as provided, a batch override descriptor is merged into the application descriptor to effect changes to the actuators; this allows a batch to specify an initial runtime configuration, or to change actuator attributes such as delta, as described below The environment controller is initialized with the application ID, the application descriptor, and its own configuration (e.g., cost model, performance function, or boundary conditions such as the maximum cost allowable for the application).

The environment controller parses the application descriptor to obtain:

a list of settings whose values are to be optimized, at least one setting being related either to the application as a whole or to a particular component of that application a list of operational metrics to use: these are the metrics which are to be returned by the measure operation from servo configuration for the servo measure and update drivers From at least one setting, the environment controller constructs a list of one or more actuator objects, or actuators. A first actuator may represent one dimension of that setting. For example, a range setting such as CPU allocation is represented by one actuator, while a matrix setting, such as a two-dimensional matrix of VM instance types, is represented by two actuators the values of at least one of which are indices in one dimension of the matrix. Each actuator is attributed with its name, its present value, and any configuration for its modification. For example, a range setting may have configuration for its minimum value, maximum value, and delta. Here delta is the magnitude of change to enact in this setting when this setting is modified, e.g. 0.2 CPU cores.

Actuators allow arbitrary settings of an application to be abstracted and optimized together. Some or all actuators for some or all settings are combined into a single list whose ordering is deterministic (e.g., a list element may be related by its index to the particular setting of a particular component). The list of actuators is provided to the driver through a functional method, and are in turn provided by the driver to the optimization controller on its initialization In this way, the problem space of optimization is represented to optimization controller as a list of actuators, where at least one actuator represents one dimension of the problem space, and the value of at least one dimension is indicated by a number (e.g., a floating point number). At least one actuator is attributed with the delta to be used when changing its value, e.g., as a number for a range setting or as the indication next for a dimension of a matrix setting. Here next indicates that to change that setting use the value of the next non-empty cell of the matrix in the dimension of the actuator in the direction of change.

When the environment controller is instructed to change the current application state to a target state, the driver specifies the update to perform as a list of actions relative to the current state. At least one action is represented as a tuple of an index in the list of actuators and the delta for that actuator's modification, including a sign for the direction of modification (e.g., change the CPU allocation by adding 0.2 cores or removing 0.2 cores, +0.2 or −0.2). The environment controller may reject that update operation because the new runtime configuration violates a boundary condition. For example, a new CPU setting value may be out of range, or the cost of the new runtime configuration may exceed a maximum cost constraint. If the update is not rejected, the application state is marked dirty, e.g., until the callback from the API server on completion of the update to the remote application marks it clean.

As instructed by the driver, the environment controller also may be configured or designed to provide a cost or performance measurement of the current state of the application. The environment controller returns the cost provided by the cost analyzer as described below, and the performance as calculated from metrics using the performance function.

Driver

The driver performs the following basic functions which are described in more detail in the sub-sections below:
- sequence batches and for at least one batch implement the main control loop for the optimization cycles of select, update and measure
- calculate a score for at least one application runtime configuration based on its performance and cost
- deduplicate optimization runs
- save and replay traces of optimization runs
- handle discovery and calibration runs as special cases At the beginning of an optimization run, the driver is initialized with
- an account ID, application ID, application descriptor, and optimization descriptor
- the remote application descriptor obtained during synchronization with the servo
- an asynchronous batch wrapper In general, the application descriptor may be configured or designed to provide configuration for the environment controller while the optimization descriptor may be configured or designed to provide configuration for the driver and the optimization controller (e.g., via the batches sequenced by the driver). The batch wrapper is used to invert control between the API server and the driver and to expose the methods of the environment controller to the API server, as described in the API server section above.

The driver compares the remote application descriptor from the servo to that read from the database, and if they are not the same, the run terminates with an error. Otherwise, the driver in turn initializes the environment controller and the optimization controller.

Batch Sequencing and Optimization Control

The driver sequences batches, beginning with the first batch specified in the optimization descriptor, and continuing until a last batch, if any, completes (batches may be cyclic). At the beginning of at least one batch the driver:
- calls the batch initialization method of the environment controller to merge any batch override descriptor into the application descriptor of the environment controller
- calls the batch initialization method of the optimization controller to configure options used by reinforced learning or other heuristics/algorithms
- initializes the batch wrapper with:
  - a run_batch generator iterator which implements the optimization control loop of the batch and yields update and measure commands
  - the environment controller object (thereby exposing its methods to the API server)

The function of the run_batch iterator is driven forward by the API controller calling next or save, causing this function to yield an update or measure command to the API server. In at least one embodiment, the optimization control loop of this function iterates through cycles of (see, e.g., FIG. 8):

1. Select a next application state:
   - get the current application state from the environment controller
   - get the target application state from the optimization controller, providing the current state and receiving the target state in the form of a list of actions
   - apply the actions using the environment controller to set the application state to the target state (marking this state as dirty or not deployed): if this change is rejected, feedback the rejection to the optimization controller and get a new target state from that controller
2. Update the remote application to the target state:
   - get the application state (the target state) from the environment controller
   - yield an update command to the API server which effects this update using the servo and on completion asynchronously marks the application state of the environment controller as clean
3. Measure the operational metrics of the remote application:
   - yield a measure command to the API server which effects this measurement using the servo and on completion asynchronously updates the metrics of the environment controller
   - feedback the results of measurement to the optimization controller:
     - get the performance and cost measurements for the application from the environment controller
     - adjust the performance: if the driver is configured with a min_perf option and the performance is greater than this threshold, set performance to this threshold value (this causes the optimization controller to optimize in respect of cost only wherever the performance exceeds the threshold)
     - normalize cost and performance
     - calculate the score for the new current application state from the performance and cost calculate a reward: the difference between the new score and the previous score feedback the new state and the reward to the optimization controller Scoring In at least one embodiment, the driver supports the following configurable scoring functions, at least one of which calculates a score based on performance and cost:

Weighted linear: (w1*perf)−(w2*cost)

Exponentially weighted performance cost ratio: perf^w1/cost (where the normalized perf and cost are first scaled by the same constant to ensure their scaled values are >1, and the resulting score is scaled into a fixed/usable range).

Variations of the above scoring methods:

performance: optimize performance only. This is achieved by using a fixed-cost cost model with either of the above scoring functions, or by setting the cost weight w2 to 0 using the weighted linear scoring function.

performance with maximum cost: optimize for performance within a maximum cost boundary. This is achieved using a maximum cost application scoped boundary condition enforced by the environment controller.

cost with minimum performance: optimize for minimum cost within a minimum performance boundary. This is achieved using the min_perf driver option as described above.

Deduplication

If the driver is configured to perform deduplication, the update and measurement of the remote application is skipped for duplicate states. Instead, the previous measurement is used for at least one such duplicate state. The driver tracks duplicates by the identity of their effective states, and skips their deployment and measurement as configured, e.g., contingent on the number of measurements of an effective state already made and the age of the last measurement.

Save and Replay Traces

During an optimization run, the driver writes a trace of the run synchronously, step-by-step, to the optimizer database. At least one step of this trace includes:

step number the application state and effective state measured operational metrics performance, cost and score as calculated for this step during the run In addition to the per-step data, the driver also saves the application and optimization descriptors to the optimizer database as part of the trace for this run. This live trace may be used by a UI client to display graphs of the performance, cost and score over time during the course of the run, the net change in these since the beginning of the run, and the current application settings values (effective state).

As configured in the optimization descriptor, the driver may also replay the trace of an historical optimization run for this application at the beginning of any batch. The driver reads this trace from the database, iterates through the steps of the trace, and for at least one step:

re-calculates the performance, cost and score: this allows for changes in the cost model or performance or scoring functions to be applied to a previous optimization run during replay as configured, includes this step in duplicate tracking (e.g., so that the application state of this step may not be re-deployed or re-measured during the run)

as configured, replays this step through the optimization controller to train the neural network used by reinforced learning Discovery and Calibration Runs In at least one embodiment, discovery and calibration runs are handled as special cases by the driver:

during a discovery run the driver saves the remote application descriptor to the database and terminates the run during a calibration run the driver:

algorithmically determines three application states, one where the actuator values are in the middle of their ranges, one at the lower end, and one at the upper end (in respect of any application scoped boundary conditions such as maximum cost)

measures the application in these three states and the initial application state several times (yielding update and measure commands to the API server)

uses these measurements to calculate default normalization coefficients for performance and cost, and a performance precision, and saves these to the database terminates the run Optimization Controller In at least one embodiment, the optimization controller exposes functional methods which the driver uses to:

select a next runtime configuration to assess feedback the results of a selection, e.g., a reward (change in score) resulting from the change in runtime configuration, or the rejection of that selection by the environment controller replay the trace of a previous optimization run for this application re-configure the optimization controller on the start of any batch In at least one embodiment, Optune™ may be configured or designed to include functionality for implementing at least two different optimization controllers: bruteforce and reinforced learning. The bruteforce optimization controller is used to perform bruteforce, or exhaustive, exploration of the optimization problem space (e.g., with a granularity specified by actuator deltas); this is also known as grid search. It is used primarily for calibration runs, or for testing, but may also be used for optimizing unordered settings (e.g., an enumerated list setting whose value indicates which Java garbage collection algorithm to use), as well as to optimize applications where the set of runtime configurations in the problem space is small enough. Of course, the bruteforce controller makes no use of feedback. The reinforced learning optimization controller is ordinarily used for application optimization. It implements Q-learning using a neural network to select runtime configurations to assess during optimization, and to back propagate the resulting rewards in order to train the neural network. As described herein, this controller also implements a variety of heuristic or algorithmic techniques whose selections may also be used to train the neural network. The optimization controller descriptions which follow are applicable to the reinforced learning optimization controller.

The optimization controller is initialized with a list of actuators (as provided by the environment controller to the driver) and its own configuration (e.g., options used by reinforced learning such as gamma or epsilon, or configuration for other heuristics or algorithms such as ouch, as described below).

The optimization controller uses the Keras high-level neural networks API running on top of TensorFlow to implement Q-learning using a neural network as the Q function. On initialization, the optimization controller constructs and compiles a sequential Keras model using:
- a single hidden layer (by default, although this is configurable) using rectified linear unit activation; the input shape to the first layer sets the number of dimensions to the number of actuators
- a neuron count equal to twice the number of actuators—one for at least one direction of change for at least one dimension of the problem space (other values are possible based on a non-default configuration for the hidden layers)
- an output layer which uses linear activation to provide a range of linear valued outputs, one output for at least one direction of change for at least one dimension of the problem space (two per actuator—one for at least one direction of change of at least one actuator)

In addition to reinforced learning, the optimization controller uses a variety of other heuristics or algorithms to select a next runtime configuration to assess, and to receive feedback from any selection. These may be implemented within the same context as reinforced learning so that they may use the same select and feedback functional interfaces as reinforced learning (some or all of these may make use of the same feedback, regardless of the method used to make the selection).

The interface requesting the selection of a next runtime configuration to assess may be configured or designed to provide as input the current application state and may be configured or designed to provide as output a list of actions (both as described above in the explication of the environment controller) to be used to update the application to its next state. Because the Q function of reinforced learning represents the quality of taking a given action from a given state, the list of actions provided as output for a selection ordinarily contains a single element so that the feedback from that selection may be back propagated to train the neural network. If there is more than one element in the list of actions, then more than one actuator has been changed by the selection, and the result is not used to train the neural network.

The interface providing feedback for a previous selection may be configured or designed to provide as input the new application state, the reward resulting from the change in application state produced by enacting the selection, and an indication or whether or not the selection was rejected (e.g., by the environment controller). In the case where the selection is rejected, the input application state has not changed (there is no new state) and the reward is meaningless.

The optimization controller implements the following heuristics or algorithms which may be used to select a next runtime configuration, and which may also make use of any feedback.

Reinforced Learning

In at least one embodiment, reinforced learning uses an epsilon greedy implementation so that at step N, counted from the beginning of the current batch, with probability $\epsilon$ a random action is chosen, while with probability $1-\epsilon$ the action associated with the highest Q-value from the neural network is chosen. Optionally, the value of epsilon may decay with at least one step so that as the batch progresses less stochastic exploration is performed while more exploitation is performed as the neural network is trained. In this way, reinforced learning may be configured or designed to provide at least two distinct heuristics/algorithms for selecting a next application state.

In one embodiment, reinforced learning may configured with one or more the following options:
- epsilon: the probability of choosing a random action to select a next runtime configuration
- epsilon_decay: a constant used to decrement epsilon on at least one epoch (step forward)
- min epsilon: minimum value for epsilon
- gamma: the discount factor used to determine the importance of future rewards when propagating feedback
- max_epoch: terminate the current batch on this epoch
- on_rejection the value of this option configures how to make a next selection if the previous selection was rejected, e.g.:
  - random: chose a random action
  - next: choose the action associated to the next-highest Q-value In one embodiment, reinforced learning selects an action to use to update the application from its current state to a new state, for example, by implementing the following steps:
1. Use the Keras model to generate output predictions for the input current state, obtaining a list of Q-values, one for at least one possible action in the output layer (e.g., one for at least one output where at least one output represents a direction of change of one dimension of the problem space).
2. Choose an action: with probability c choose a random action otherwise choose the action with the highest Q-value.
3. Convert the chosen action (a particular output), into a tuple of: an index in the list of actuators and the delta for that actuator's modification (including the sign for the direction of modification). The optimization controller returns, as the response to a request by the driver to select a next runtime configuration to assess, a list of actions containing as its single element this tuple.
4. Save data to be used during feedback from taking this action: the application state (last_state), the output chosen (last_output), and the list of Q-values returned by the prediction (last_qvalues). Note: the prediction is made, and the this data is saved, even if a different heuristic/algorithm is used to select an action, so that regardless of the means of selection, the neural network may be trained.

In one embodiment, Q-learning processes feedback from a previous selection to train the neural network using the following steps:
1. Use the Keras model to generate output predictions for the input new state, obtaining a list of Q-values, and from this list the new maximum Q-value (new_maxq).
2. Create an output vector Y based on the output vector from the last action taken (last_qvalues) where the Q-value for last_output is set to the target value for training the neural network: reward+(gamma*new_maxq)
3. Train the Keras model using the previous state (last_state) and the output vector Y.

Ouch

If the reward fed back from the previous non-rejected selection is negative and its magnitude is above a threshold value, ouch selects as the next application state the previous application state (it returns for selection an action which undoes the previous action). The effect of ouch is to back out the step which produced the negative reward and cut off any further exploration of the problem space going forward from the previous application state through the backed out state. If used, ouch takes precedence over reinforced learning in selecting a next action.

In one embodiment, Ouch may be configured with the following options:
threshold: the magnitude of the negative reward which triggers ouch. If the value of this option is >0 then ouch may be configured so that it may be used.

Monitor

The monitor heuristic/algorithm is used during a continuous optimization run to monitor an application through repeated measurement, without changing its runtime configuration, until the monitored score decreases from a baseline more than a threshold value. Monitor always selects as the next application state the previous application state, returning an empty list of actions. If the threshold is passed, monitor terminates the current batch. In practice, monitor is used to maintain an application in a satisfactorily performing state and to provide a trigger for terminating that maintenance which is based on a decline in score. In this way it may be configured or designed to provide a form of environment change detection.

For example, a change in the application environment such as a significant increase in sustained load, or a functional change introduced by an update to the application's code or virtual infrastructure, may decrease the application's performance and drive the measured score below the monitor threshold.

Monitor may be configured with the following options:
baseline_iterations: the number of initial measurements to use to establish the baseline score (e.g., the first three measurements of the batch)
threshold: the magnitude of the negative score change from the baseline which causes batch termination Continuous Optimization Illustrative Example The following example is intended to provide a high level example of how the heuristics/algorithms of the optimization controller may be used in different combinations or configurations, in different batches, to perform continuous optimization. This example uses three batches which together form a cyclic graph:

Exploring: the exploring batch performs relatively more aggressive exploration and less exploitation:
  optimization controller configuration for heuristics/algorithms:
    reinforced learning: epsilon=0.6, epsilon_decay=0.002, gamma=0.6, max_epoch=100
    ouch: threshold=3.0
  environment controller configuration for CPU (in cores) and memory (in GiB) settings: delta=0.2
  driver configuration: next_batch=exploiting, deduplication=1 (one measurement per application state), set_best=true (update application to best state at end of batch)
Exploiting: the exploiting batch performs relatively less aggressive exploration and more exploitation:
  optimization controller configuration for heuristics/algorithms:
    reinforced learning: epsilon=0.3, epsilon_decay=0.002, gamma=0.3, max_epoch=100
    ouch: threshold=2.0
  environment controller configuration for CPU and memory settings: delta=0.1
  driver configuration: next_batch=monitoring, deduplication=1, set_best=true
Monitoring:
  optimization controller configuration for heuristics/algorithms:
    monitor: baseline iterations=3, threshold=3.0
  driver configuration: next_batch=exploring, deduplication=0 (no deduplication)

The first batch, or entrypoint into the graph, is the exploring batch, which progresses to the exploiting batch and then to the monitoring batch. The monitoring batch makes no changes to the runtime configuration of the application, but terminates the batch if the score drops by a threshold value. This causes the exploring batch to be started next.

Replay

The optimization controller also exposes functional methods which the driver may use to replay the trace of a previous optimization run for the application. The driver replays at least one step of a trace in sequence, providing to the optimization controller for that step the application state and, for some or all but the first step, a reward (change in score) computed in relation to the previous replayed state.

In at least one embodiment, replay may be configured or designed to follow the same general Q-learning select and feedback processes described above, except:
  The optimization controller does not select at least one next application state through choosing an action; instead, the driver sequences the replayed states.
  The last output used during feedback is determined by comparing the previous state to the current state to determine the changed actuator and the direction of its change.

Cost Analyzer

The cost analyzer may be configured or designed to provide a cost measurement of the current runtime configuration of an application based on a cost model. In at least one embodiment, Optune™ may be configured or designed to support at least three different cost models:
  EC2 instance type pricing: this model is used for applications whose components are Amazon EC2 instances, e.g., when optimizing component instance types
  CPU and memory resource consumption pricing: this model is used for applications whose components may be assigned variable CPU and memory resources (e.g., containerized applications). Resource pricing is based on the resource costs underlying the EC2 C5 family pricing, e.g., currently $0.0175 per hour per CPU core and $0.0125 per hour per GiB of memory.
  fixed cost: the application cost is fixed at a constant value (e.g., 1.0) the effect of which is to cause optimization to be performed in respect of performance only The cost analyzer is initialized by the environment controller, at which time it reads a JSON format EC2 pricelist from the filesystem. This pricelist is packaged with the image of the optimization engine and is created by parsing the full EC2 us-east-1 region pricelist obtained from the AWS API. At least one available instance type is represented in this pricelist with attributes for family code (e.g., t2), subcode (e.g., medium), price per hour, memory in GiB and CPU in normalized cores.

The cost analyzer exposes a functional method which may be used to measure the cost of an application, providing as input the cost model and an application descriptor, and receiving as output the cost per hour for running the application.

Database

In one embodiment, the optimizer database is implemented using Google Firestore which may be configured or designed to provide:
- realtime NoSQL database services including event subscriptions (document listeners)
- authorization: security rules provide access control to documents and collections where customer facing access is isolated by customer account
- cloud functions, e.g., for creating users under customer accounts, or for moving a document (a combination of get, write and delete operations)

The Optune™ database implements a root-level collection for customer accounts, and under this collections by account ID. Under at least one account ID are collections for users and for applications, under which are further collections by user ID or application ID. Some or all of the per-application data, then, is stored in its own collection, accessible by a combination of account ID and application ID, where at least one such collection includes:
- a collection for the trace of a current optimization run which includes documents for:
  - the optimization descriptor
  - the application descriptor
  - the step-by-step trace
  - the optimization run state: initial, running, end, or none (no current optimization run)
- a collection for the collections of historical traces documents for:
  - the remote application descriptor
  - the operator override descriptor
  - run configuration: common configuration for optimization runs including
    - cost model, performance and scoring functions
    - performance precision and normalization coefficients for performance (e.g., from the last calibration run)

UI Server

In one embodiment, the UI Server serves the static content (JavaScript, HTML, CSS, etc.) of the Optune™ customer facing web interface (a UI client obtains its dynamic data content directly from the database). The UI Server also exposes a control API which UI clients may use to start or stop an optimization run for an application associated to that user's account.

The UI server creates and runs a CherryPy web server on start of the UI application. It also initializes the optimization run constructor (ORC) and the application controller. The web server serves static content from a server root directory and exposes an endpoint for the control API which may be used to start or stop an optimization run. The start operation creates, configures and runs an optimizer application, while the stop operation destroys such an application (this is a user interrupt—ordinarily optimization runs are continuous or terminate on their own). The web server implements an event handler which may be configured or designed to respond to start and stop requests as follows:

start:
- get the application run state from the application controller and verify it is none (no optimization application exists for this customer application)
- get from the database:
  - the remote application descriptor
  - the operator override descriptor
  - common configuration for optimization runs (a document containing the cost model, performance and scoring functions, normalization coefficients for performance and cost, and performance precision)
- create an application descriptor by merging the override descriptor into the remote application descriptor
- generate an optimization descriptor using ORC
- start the application using the application controller stop:
- get the application run state from the application controller and verify it is not none (an optimization application exists for this customer application)
- stop the application using the application controller Optimization Run Constructor The optimization run constructor (ORC) exposes a functional method which may be used to generate and get an optimization descriptor for an optimization run. This method receives as input:
- an application descriptor
- the common run configuration for the application (as noted above)
- the type of run: discovery, calibration, or optimization
- options for an optimization run:
  - continuous: a boolean indicator
  - optionally:
    - a historical optimization run trace to replay at the beginning of the first batch of the optimization run
    - maximum cost or minimum performance boundary conditions For an optimization run, ORC creates a set of batches (e.g., as per this example in the optimization controller detailed description). The batches of this set and their configuration may be determined based on whether the run is continuous or not, and may be based on the settings of the application descriptor, such as, for example:
- driver configuration:
  - a batch termination condition such as max_epoch may be calculated based on the number of settings being optimized
  - deduplication and a next batch may be determined based on the type of batch (e.g., exploring, exploiting or monitoring)
- environment controller configuration:
  - settings such as the delta for range settings in a batch override descriptor may be calculated based on magnitude of the range and the type of batch
- optimization controller configuration:
  - configuration for reinforced learning such as epsilon or gamma may be determined based on the type of batch
  - the use and configuration heuristics/algorithms such as ouch or monitor may be determined based on the type of batch Application Controller In one embodiment, the application controller exposes functional methods which may be used to start or stop an optimizer application, or get its run state. The application controller uses docker-compose to deploy optimizer applications to a target Docker host or Docker Swarm cluster. At least one such application exposes its API server endpoint on a port configured on its instantiation. The application controller maintains a mapping of at least one deployed optimizer application to its API server endpoint port. The optimizer uses an Amazon AWS Application Load Balancer (ALB) to perform path based routing for API requests made to optimizer applications, routing at least one request to the port exposed by the optimizer application according to the path (e.g., by account ID and application ID).

Run State

The run state method of the application controller receives as input an account ID and application ID. It returns the application run state, one of initial, running, end, or none (no current optimization run). This state is retrieved from the optimization run state document for the application in the optimizer database.

Start

The start method of the application controller receives as input an account ID, application ID, application descriptor and optimization descriptor. These are provided as configuration to the optimizer application which may be started. To start this application the controller:

- verifies the run state of the application is none
- subscribes to the database run state document for the application, providing a callback which is used to cleanup when the application run state become end (see stop below)
- creates a launch directory named {account_ID}-{application_ID} and within this directory creates a .env file used to configure the template docker compose file used to instantiate the optimizer application
- changes the current working directory to the launch directory and starts the optimizer application using docker-compose up -d --build --file {template} (this builds, creates and starts the services for the optimizer application)
- updates the application-to-port mapping and changes the run state of the application in the database to initial
- uses the Amazon AWS API to configure the optimizer ALB with a target group and path based routing rule to route requests by account ID and application ID to the exposed port of the started application Stop The stop method of the application controller receives as input an account ID and application ID. To stop this application the application controller:

- verifies the run state of the application is not none
- stops (destroys) the application using docker-compose down
- removes the launch directory
- uses the Amazon AWS API to configure the optimizer ALB, removing the routing rule and target group
- removes the application from the application-to-port mapping and changes the run state of the application in the database to none UI Client The Optune™ UI client web interface may be configured or designed to include functionality for enabling customers to:

- create or destroy an application within the scope of the user's Optune™ account
- configure the settings of an application
- configure common configuration for optimization runs, e.g., cost model, performance and scoring functions
- configure an optimization run, e.g., the type of run and its options
- start or stop an optimization run
- view the progress and results of an optimization run The static content of the UI client is served by the UI server. The client interface is implemented using the Angular front-end web application framework and Google Charts. The client uses the Firestore JavaScript SDK to directly read from and write to the database, while authentication services are provided by Firebase.

Figure 17:
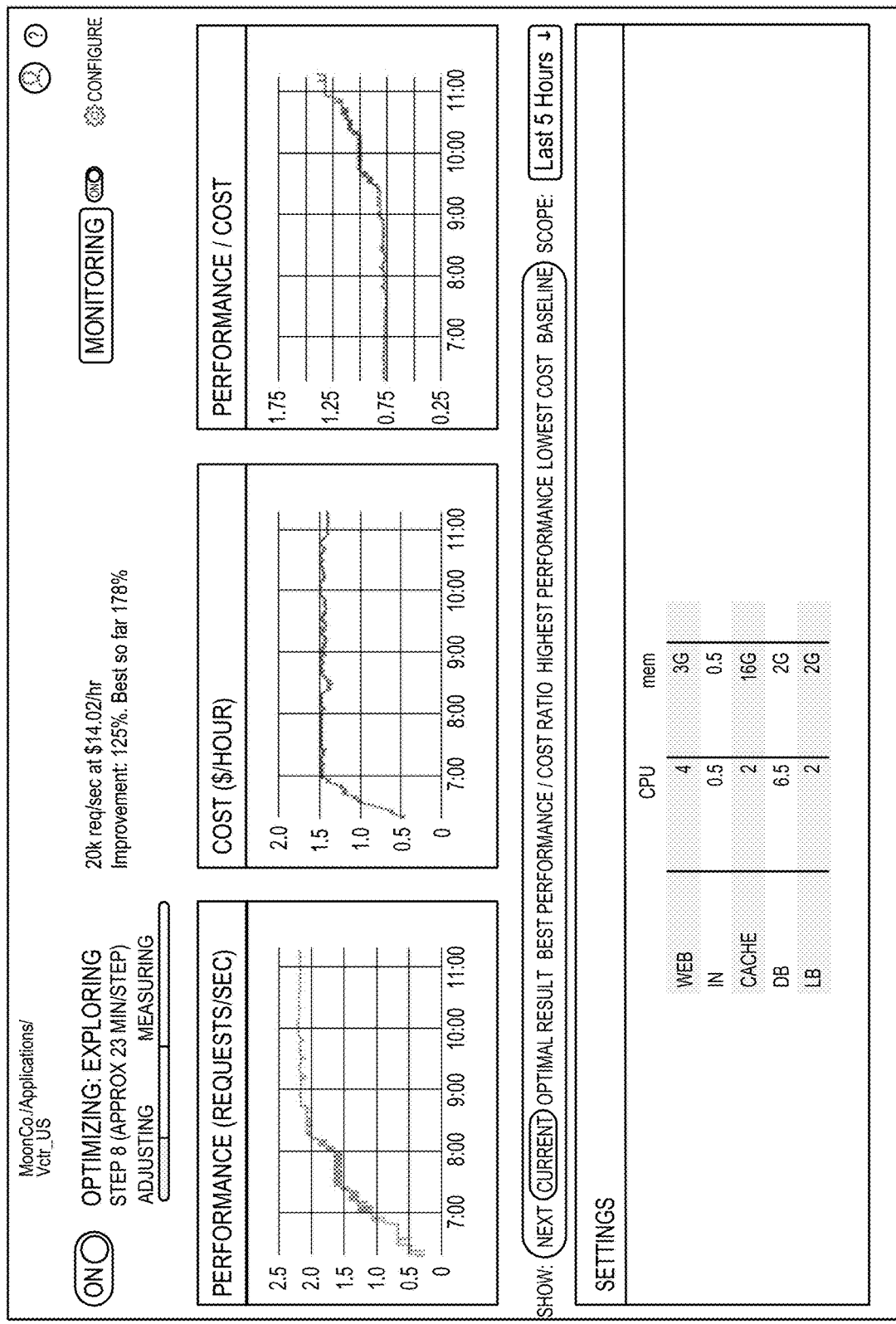
FIGS. 17 and 18 illustrate different screenshots representing example embodiments of different graphical user interfaces (GUIs) 1701, 1801 which may be used to facilitate, initiate and/or perform various operation(s) and/or action(s) relating to the application optimization techniques described herein.
Figure 18:
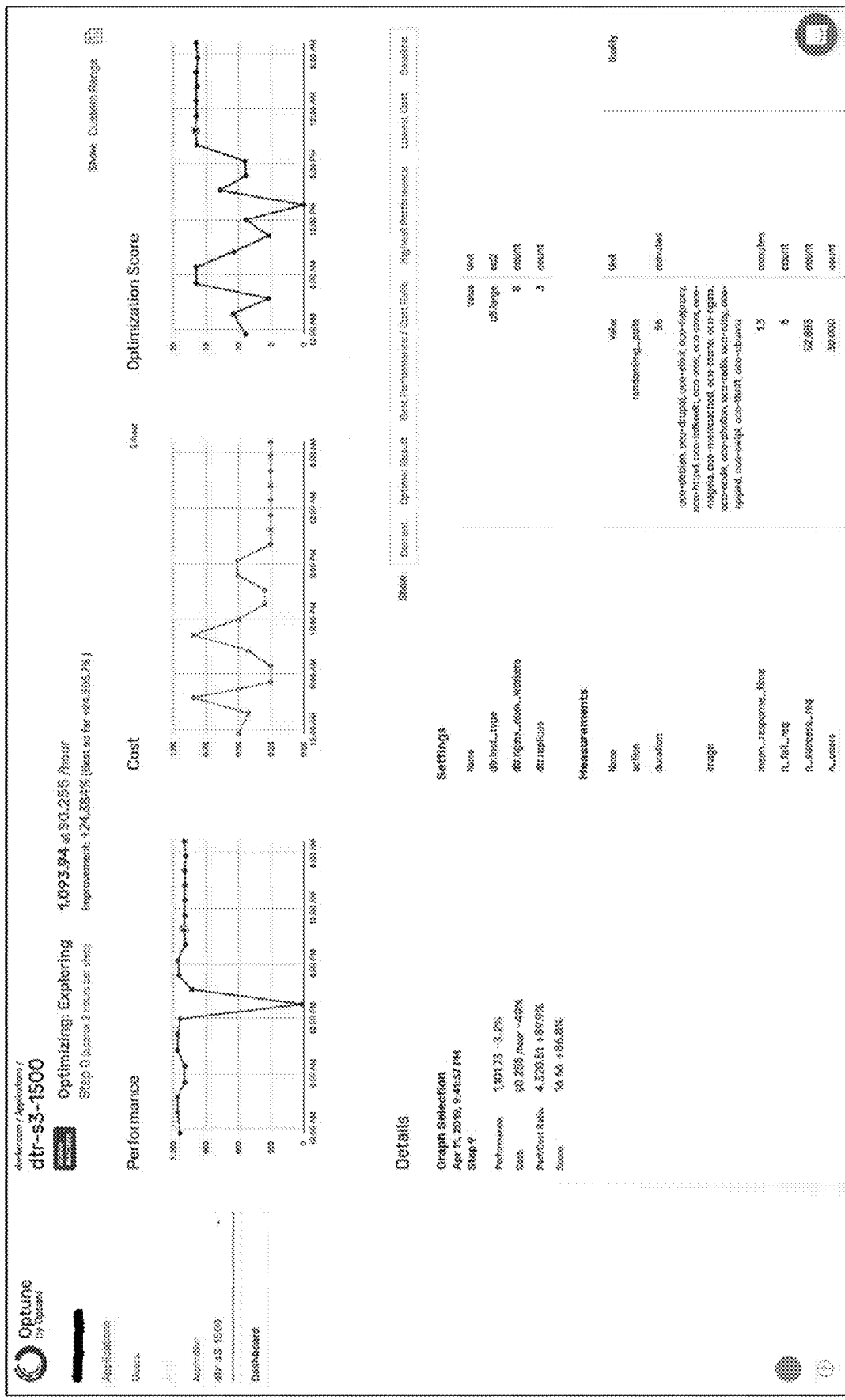

FIGS. 17 and 18 illustrate different screenshots representing example embodiments of different graphical user interfaces (GUIs) 1701, 1801 which may be used to facilitate, initiate and/or perform various operation(s) and/or action(s) relating to the application optimization techniques described herein.

In at least one embodiment, GUIs 1701, 1801 may be configured or designed to function as an interface of the UI client (e.g., 140, FIG. 1), and may be configured or designed to include functionality for enabling users to visualize and monitor details of optimization runs while such optimization runs are in progress.

For example, as illustrated in the example embodiments of FIGS. 17 and 18, UI client GUIs 1701 and/or 1801 may be configured or designed to include functionality for displaying separate time series graphs for performance, cost and score (e.g., performance/cost). UI client GUIs may also be configured or designed to include functionality for enabling a user to view the values of current application settings by component, as well as the values for the baseline (initial state), best result, lowest cost, highest performance, etc. In one embodiment, the UI client may be configured or designed to set up a communication channel with the database 120 to monitor real-time optimization data relating to one or more applications optimization runs which are running at the Optimizer System, and may also be configured or designed to provide a callback which is used to update the local document snapshot on change (e.g., as the optimization engine saves its trace step-by-step to this document).

Additional Features, Benefits, Advantages

In some embodiments, Optune™ may be configured or designed to run an optimizer application for at least one optimization run, and the lifecycle of this application may be limited to that of the run. However, this method does not scale well to thousands of simultaneous optimization runs. Also, an optimizer application is often idle while its servo performs an update or measure operation.

To address these concerns, a different embodiment of Optune™ may use a data driven serverless architecture where changes in data (e.g., the completion of an update operation as written to the database) trigger functions embodied only during their execution (e.g., an optimizer function responds to the update data change by instigating a measure operation). In this way compute resources for the Optune™ backend optimization services are provisioned and consumed only on demand.

A different embodiment of Optune™ may implement a profiler heuristic/algorithm which analyzes traces of historical optimization runs for many applications to determine a next runtime configuration to assess for a present optimization run by relating the historical data to the present optimization run through application characteristics such as component types.

A different embodiment Optune™ may implement predictive optimization through time series analysis of an application's operational metrics in order to adjust the application's runtime configuration in anticipation of a change in the application's sustained load.

SaaS Protocol Error Handling

The coupling between the servo (client) and optimizer (server) is loose, and at least one may expect the other to be restarted at any time; also, the client may expect that the server may be temporarily unavailable. The SaaS protocol error handling detailed below facilitates continuation, recovery, or resynchronization between client and server in the event either encounters TCP errors, unexpected responses, or HTTP errors.

For illustrative purposes, the following describes an exemplary list of exceptions and how they may be handled on at least one side:

- A request from the client fails with a TCP error (DNS failure, TCP connect timeout, no response after sending the HTTP request): the client assumes the server is temporarily unavailable and retries with decreasing frequency.
- Client receives response to whatsnext that contains a command which exactly matches one that it is currently running: the client may do nothing, assuming that the server lost connection and is retrying the command Continue sending normal progress and completion messages for the running command
- Client receives a new (different) command while running another one: this indicates loss of synchronization. The client immediately sends a completion request for the new command with a busy status. The server handle this request as appropriate (e.g., abort the old command and re-submit the new one, retrying it until it stops getting a busy status—in case the client is not actually able to abort a running command and has to wait for it to complete).
- HTTP Failure 40x errors: unless the error is 400, with an indication that the request was rejected as malformed, this indicates loss of synchronization. Either way, the client ignores the response and proceeds as if the request succeeded, except if the error occurs on a whatsnext request (in this case the client may terminate, logging a fatal error).
- HTTP Failure 500: this indicates an unexpected server failure. The client logs an error message and either exits or enters a retry loop.
- HTTP Failure 503: service temporarily unavailable may be treated as the TCP errors are, with exponential backoff and retry.
- Server receives a progress request for a command it did not send: this likely means the server was restarted while the client was in the middle of running a command (and the server either did not have a stored record of sending the command or the server's state was deleted before it got restarted). The server sends a reset command at the first whatsnext opportunity, then retries any command it might have requested before continuing normal operation.
- Server receives a completed request for a command it did not send: handled as in the unexpected progress request, except no reset is needed.
- Server receives an end request or gets a TCP reset on an open connection with a pending whatsnext request: this indicates the client has exited or is about to exit. The server keeps some or all state intact for any optimization run and re-sends the last command when the client re-connects and sends a whatsnext request.
- Server gets a TCP error on an incoming request (other than a waiting on a whatsnext request): If there is a pending whatsnext request, the server uses it to request application state (send a description command with the reply); if not, the server does nothing, but remembers to request description at first opportunity, if the client doesn't send a description before that (which it may do anyway, if it just lost connection or restarted).

Application Settings

In at least one embodiment, Optune™ may be configured or designed to support one or more types of settings, as described below.

Range Setting

The values of a range setting are numeric (integer or float) and may be set over a numeric range (e.g., memory allocation). This setting is specified with the following attributes:

type: range
value: the current value of the setting
min: the minimum value of the setting
max: the maximum value of the setting
delta: the current magnitude of a change in value
min delta: the minimum magnitude of a change in value
step: the step size for changes in value (e.g., if used, delta is constrained to be an integer multiple of step)

Enumerated List Setting

The values of an enumerated list setting may be any scalar type, and may or may not have a meaningful ordering (e.g., an enumerated list of Java garbage collection algorithms has no meaningful ordering). This setting is specified with the following attributes:

type: enum
value: the current value of the setting
delta: next (e.g., use the next enumerated setting in the direction of change)
values: a list of values of the same scalar type Matrix Setting A matrix setting is an abstraction which is used to introduce ordering to a set of setting values in more than one dimension. Optune™ may be configured or designed to use matrix settings for optimizing VM instance types. For example, the set of available Amazon EC2 instance types may be organized into a two-dimensional matrix where at least one row represents a VM family (e.g., r4, c5, i3), and at least one column represents a grouping of normalized CPU and memory resources, so that within at least one row, the family sub-codes are ordered from least to most resources (e.g., large, xlarge, 2xlarge, 4xlarge, etc.). This setting is specified with the following attributes:

type: matrix
value: the current value of the setting (e.g., the VM instance type indicated by the effective state of the setting which is derived from the values of the two actuators representing the two dimensions of the matrix)
delta: next (e.g., use the value of the next non-empty cell of the matrix in the dimension of the actuator in the direction of change)
mtx_base: either a string value indicating a predefined or algorithmically defined base matrix (e.g., family) or a list value whose elements are lists and which together explicitly specify a base matrix
mtx_families: an optional list of family codes which may be used to limit mtx_base to just these families (e.g., a value of [m4, m5] implies use only these families from mtx_base)

For example, a YAML application descriptor may use mtx_base to explicitly specify a matrix of VM instance types which may be used for this setting:

mtx_base:
  [r3.large, r3.xlarge, r3.2xlarge, r3.4xlarge, r3.8xlarge]
  [r4.large, r4.xlarge, r4.2xlarge, r4.4xlarge, r4.8xlarge]
  [i3.large, i3.xlarge, i3.2xlarge, i3.4xlarge, i3.8xlarge]
  [m4.xlarge, m4.2xlarge, m4.4xlarge, m4.10xlarge, m4.16xlarge]
  [m5.xlarge, m5.2xlarge, m5.4xlarge, null, m5.12xlarge]

In another example, mtx_base may have a string value of family. In this case, Optune™ algorithmically generates a matrix which includes some or all of the present EC2 families, and some or all of their sizes (e.g., sub-codes), as parsed from the same EC2 pricelist used by the cost analyzer.

Illustrative Examples of Settings Types and Parameters
Resource Settings
  VM instance type (e.g., EC2 instance type for vertically scaling VM components)
  replicas (e.g., for horizontally scaling components)
  CPU allocation (e.g., Kubernetes CPU request or limit)
  memory allocation
  network bandwidth allocation
  storage I/O allocation
Kernel Tuning Parameters
  CPU scheduler: scheduler class, priorities, migration latency, tasksets
  virtual memory: swappiness, overcommit, OOM behavior
  huge pages: explicit huge page use, transparent huge pages
  NUMA balancing
  filesystem: page cache flushing
  storage I/O: read ahead size, number of in-flight requests, I/O scheduler
  networking: TCP buffer sizes, TCP backlog, device backlog, TCP reuse
  hypervisor: kernel clocksource
Application Operational Parameters
  Apache: number of worker threads, max connections per child, concurrency model (MPM), etc.
  MySQL: memory pool size, maximum number of connections, query cache size, etc.
  PostgreSQL: maximum number of connections, shared buffers, effective cache size, working memory, commit delay, etc.
  Java: garbage collection algorithm, heap size, etc.
  Nginx: number of worker processes, maximum number of connections per worker, keepalive requests, keepalive timeout, etc.
  HAProxy: maximum number of connections, number of worker processes, etc.
  Magento: cache configuration, etc.
Deployment Constraints
  Amazon EC2 availability zone (for applications whose components are EC2 VMs)
  colocation (e.g., colocating VM components on the same physical machine, or container components on the same cluster node)

Exponential Performance-Cost Ratio Scoring

In at least one embodiment, Optune™ may be configured or designed to include functionality for using an exponentially weighted performance-cost ratio as one of its scoring methods. Put simply, this method uses as the score the ratio of performance raised to an exponent over cost (perf^w1/cost). The general form of this function allows for separately normalizing performance and cost, normalizing a particular score to a particular value (e.g., normalize such that the score of the first runtime configuration is 0), and scaling the exponential scores into a usable/fixed range. This scoring function allows one to control, using the exponent w1, where on the simple performance/cost curve the optimization objective is pointed (e.g., where on the saturation curve of a sigmoid function).

In at least one embodiment, a general form of this scoring function may be expressed as:

$$\text{score} = \text{const}A + \text{scale}B * ((\text{scale}A * \text{norm}P * \text{perf})^{w1} / (\text{scale}A * \text{norm}C * \text{cost}))$$

where:

perf: the application performance as provided by the environment controller, which constructs this performance measurement from one or more operational metrics measured by the servo. For example, performance may be the value of a single throughput metric such as the number of requests-per-second served by the application. In another example, performance may be functionally defined as throughput/max(threshold, latency) where latency is the average time taken per request. In this example, as latency increases above a constant threshold, the performance decreases.

cost: the application cost as provided by the environment controller using the cost analyzer. This cost is typically per-hour, and may be based on VM instance type pricing, or CPU/memory resource consumption pricing.

normP: the performance normalization coefficient as determined during the calibration run for the application, e.g., to normalize the performance of the initial runtime configuration to 1.0.

normC: the cost normalization coefficient as determined during the calibration run for the application, e.g., to normalize the cost of the initial runtime configuration to 1.0.

scaleA: a scaling coefficient applied to both performance and cost to ensure the values of both of these are >1.0, e.g., before raising performance to an exponent or dividing by the cost. The same scaleA scaling is applied to both performance and cost so as not to affect their unweighted ratio. The value of scaleA defaults to 1000.

w1: the weighted exponent for performance. Typical values are in the range 0.75 to 4.0, where values <1.0 weight cost over performance, values >1.0 weight performance over cost, and a value of 1.0 weights both equally.

scaleB: a scaling coefficient which scales the exponential score into a usable range. The value of scaleB is functionally defined as $5*(\text{scale}A/(q*(\text{scale}A^{w1})))$ where the value of q is determined as follows:
  if w1<1.0 then q=1.0
  if w1>=1.0 then q=2^(w1−1.0)

constA: a constant used to adjust at least one score, e.g., so that the score of the initial runtime configuration may be set to a particular value such as 0.

Various aspects described or referenced herein are directed to different methods, systems, and computer program products for implementing real-time optimization of computer-implemented application operations using machine learning techniques. One aspect disclosed herein is directed to different methods, systems, and computer program products for optimizing the mutable runtime configuration of an application. In at least one embodiment, various method(s), system(s) and/or computer program product(s) may be operable to cause at least one processor to execute a plurality of instructions for facilitating, enabling, initiating, and/or performing one or more of the following operation(s), action(s), and/or feature(s) (or combinations thereof):

(A) Using reinforced learning (Q-learning using a neural network), or any of a variety of heuristic or algorithmic techniques, where:
  1. An application is a system of one or more components (virtual or non-virtual);
  2. Any application settings (e.g., any of the application's mutable runtime configuration) may be dynamically adjusted (e.g., with or without restarting the target application) to accomplish:

(a) vertical resource scaling adjustment, and/or
(b) horizontal scaling adjustment, and/or
(c) parameter tuning adjustment (e.g., operational parameters such as middleware configuration or kernel tuning parameters).
3. Types of application settings that may be automatically and dynamically adjusted:
  (a) Resources provided to any component, such as a virtual machine or container, or to the application as a whole, such as, for example, one or more of the following (or combinations thereof):
  CPU cores,
  memory,
  network bandwidth,
  provisioned disk IOPS (Input/Output Operations Per Second),
  database TPM (Transactions Per Minute),
  or a setting such as Amazon EC2 instance type which indicates a collection of resource settings such as CPU, memory, or network/disk IOPS,
  number of replicas (copies) of a component deployed. Some application components may scale horizontally by increasing or decreasing the number of copies, or replicas, of that component which are running (e.g., a horizontally scalable web tier in an N-tier application),
  etc.
  (b) Operational parameters of application components may also be changed (e.g., the number of Apache worker threads, or My SQL memory pool size, or kernel tuning parameters such as TCP buffer size or the use of transparent huge pages). Deployment constraints may also be changed (e.g., co-locating VM components on the same physical machine, or container components on the same host).
  (c) Taken together, the mutable runtime configuration of an application or its components is here termed settings, as in application settings or component settings. The term application settings may be taken to include both application wide settings (such as availability zone in which to deploy the application) and component specific settings (such as resource assignments).
4. Optimization may be continuous, or periodic, or implemented based on triggering events/conditions.
(B) Using as the optimization objective a scoring function which relates application performance to cost, where performance is computed from a combination of measured application metrics such as throughput or response time, and cost is computed from the application's costable resources such as component VM instance types, or component cpu or memory resources, or the number of each such component. For example, the objective may be defined to maximize one or more of the following (or combinations thereof):
1. performance-to-cost ratio (perf/cost);
2. a weighted balance between performance and cost, such as perf**w1/cost;
3. perf (where cost is represented as constant);
4. perf bounded by a maximum cost;
5. cost while maintaining a minimum perf; and/or
6. number of users supported (or other business metric or Key Performance Indicator (KPI))

Another aspect disclosed herein is directed to different methods, systems, and computer program products for optimizing the mutable runtime configuration of an application via a SaaS service, together with one or more servos, which can securely optimize a customers applications in any of a wide variety of remote environments (e.g., public clouds or container services, private clouds or container clusters).

Architecturally, the SaaS service separates functionality between a servo, or agent, which is installed in the customer's environment and a backend SaaS service here termed the optimizer, or server. The servo uses pluggable update and measure drivers which support the specific customer application environment, and uses a fault tolerant SaaS protocol to communicate with the optimizer. This protocol inverts the usual client-server control relationship such that the servo self-synchronizes with the optimizer leading and the servo following. The optimizer, or backend server, steers and moves forward the application optimization as described in #1.

According to different embodiments, optimization runs are descriptor driven: both an application descriptor and an optimization descriptor are provided as input to an optimization run. An application descriptor specifies the settings of the application which are to be optimized, the operational metrics used to measure performance, and configuration for the servo update and measure drivers. An optimization descriptor specifies how the application is to be optimized during the optimization run, e.g., as a sequence of batches where each batch may use different heuristics or algorithms, if any, may use reinforced learning or not, and may specify configuration options for any of these.

Another aspect disclosed herein is directed to different methods, systems, and computer program products for optimizing the mutable runtime configuration of an application via use of a scoring function (e.g., Exponential Performance-Cost Ratio Scoring) and optimization feedback technique which utilizes scores generated from the scoring function to automatically and dynamically improve optimization of customer applications.

It will be appreciated that one having ordinary skill in the art may readily adapt the various optimization techniques disclosed herein in order to perform automated optimization in a variety of other use cases. For example, in at least one embodiment, various optimization techniques disclosed herein may be adapted to provide automated optimization of high-frequency trading applications, financial transactions, e-commerce transactions, etc. Moreover, it will be appreciated that the various optimization techniques disclosed herein are particularly advantageous in use case scenarios where relatively small increases/decreases in system performance may result in relatively large increases/decreases in economic impact.

Apdex

Apdex (Application Performance Index) is an open standard developed by an alliance of companies that defines a standardized method to report, benchmark, and track application performance. Apdex is a numerical measure of user satisfaction with the performance of enterprise applications. It converts many measurements into one number on a uniform scale of 0-to-1 (0=no users satisfied, 1=all users satisfied). This metric can be applied to any source of end-user performance measurements. If you have a measurement tool that gathers timing data similar to what a motivated end-user could gather with a stopwatch, then you can use this metric. Apdex fills the gap between timing data and insight by specifying a uniform way to measure and report on the user experience.

The index translates many individual response times, measured at the user-task level, into a single number. A Task is an individual interaction with the system, within a larger process. Task response time is defined as the elapsed time between when a user does something (mouse click, hits enter or return, etc) and when the system (client, network, servers) responds such that the user can proceed with the process. This is the time during which the human is waiting for the system. These individual waiting periods are what define the "responsiveness" of the application to the user.

Performance measurement and reporting tools that support Apdex will conform to a specification developed by the Alliance that will be publicly available. It specifies a process that Apdex compliant tools and services will implement. A key attribute of the process is simplicity. What follows is a basic overview.

The index is based on three zones of application responsiveness:
  Satisfied: The user is fully productive. This represents the time value (T seconds) below which users are not impeded by application response time.
  Tolerating: The user notices performance lagging within responses greater than T, but continues the process.
  Frustrated: Performance with a response time greater than F seconds is unacceptable, and users may abandon the process.

The Apdex formula is the number of satisfied samples plus half of the tolerating samples plus none of the frustrated samples, divided by all the samples. It is easy to see how this ratio is always directly related to users' perceptions of satisfactory application responsiveness. To understand the full meaning of the ratio, it is always presented as a decimal value with a sub-script representing the target time T. For example, if there are 100 samples with a target time of 3 seconds, where 60 are below 3 seconds, 30 are between 3 and 12 seconds, and the remaining 10 are above 12 seconds, the Apdex is 0.75.

It will be appreciated that, via the use of specifically configured computer hardware and software, the problems which are solved and/or overcome by the various Optune™ techniques described herein are necessarily rooted in computer technology in order to overcome problems specifically arising in the realm of computer networks. For example, as described previously, numerous problems and limitations are typically encountered when attempting to use existing technology to implement various services and/or features such as those provided in Optune-enabled environments. Such problems and limitations specifically arise in the realm of computer networks, and the solutions to these Optune™ environment problems and limitations (e.g., as described herein) are necessarily rooted in computer technology.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims It is claimed:

1. A computer implemented method for optimizing a mutable runtime configuration of a first application hosted at a remote networked environment, the remote networked environment being communicatively coupled to a computer network, the computer network including an Optimizer System, the Optimizer System including a first set of optimizer algorithms, the method comprising causing at least one processor to execute instructions stored in non-transient memory to:

cause at least one network device to initiate a first measurement of a first operational metric of the first application while the first application is operating in accordance with a first runtime configuration;

cause the at least one network device to transmit first measurement information to the Optimizer System, where the first measurement information relates to the first measurement of the first operational metric of the first application;

calculate, using the first measurement information, a first score in relation to a first optimization objective, the first score being calculated using a first scoring function;

determine, at the Optimizer System, a first set of updated application settings relating to the mutable runtime configuration of the first application;

cause, using the at least one network device, the first set of updated application settings to be deployed at the first application to thereby cause the first application to operate in accordance with a second runtime configuration;

cause the at least one network device to initiate a second measurement of the first operational metric of the first application while the first application is operating in accordance with the second runtime configuration;

cause the at least one network device to transmit second measurement information to the Optimizer System, where the second measurement information relates to the second measurement of the first operational metric of the first application;

calculate, using the second measurement information, a second score in relation to the first optimization objective, the second score being calculated using the first scoring function;

compute, using at least the second score, a first reward;

update the first set of optimization algorithms using information relating to the first reward;

select, from the first set of optimization algorithms, a first optimization algorithm to be used for determining a second set of updated application settings relating to the mutable runtime configuration of the first application;

determine, using the first optimization algorithm, a second set of updated application settings relating to the mutable runtime configuration of the first application;

cause, using the at least one network device, the second set of updated application settings to be deployed at the first application to thereby cause the first application to operate in accordance with a third runtime configuration;

cause the at least one network device to initiate a third measurement of the first operational metric of the first application while the first application is operating in accordance with the third runtime configuration;

cause the at least one network device to transmit third measurement information to the Optimizer System, where the third measurement information relates to the third measurement of the first operational metric of the first application;

calculate, using the third measurement information, a third score in relation to the first optimization objective, the third score being calculated using the first scoring function;

compute, using at least the third score, a second reward;

update the first set of optimization algorithms using information relating to the second reward;

select, from the first set of optimization algorithms, a second optimization algorithm to be used for determining a third set of updated application settings relating to the mutable runtime configuration of the first application;

determine, using the second optimization algorithm, a third set of updated application settings relating to the mutable runtime configuration of the first application;

cause, using the at least one network device, the third set of updated application settings to be deployed at the first application to thereby cause the first application to operate in accordance with a fourth runtime configuration; and determine, at the Optimizer System, if additional cycles of optimization adjustment are to be performed for the first application.

2. The computer implemented method of claim 1 further comprising causing, if it is determined that additional cycles of optimization adjustment are to be performed for the first application, the at least one processor to execute additional instructions to:

cause the at least one network device to initiate a fourth measurement of the first operational metric of the first application while the first application is operating in accordance with the fourth runtime configuration;

cause the at least one network device to transmit forth measurement information to the Optimizer System, where the fourth measurement information relates to the fourth measurement of the first operational metric of the first application;

calculate, using the fourth measurement information, a fourth score in relation to the first optimization objective, the fourth score being calculated using the first scoring function;

compute, using at least the fourth score, a third reward;

update the first set of optimization algorithms using information relating to the third reward;

select, from the first set of optimization algorithms, a third optimization algorithm to be used for determining a fourth set of updated application settings relating to the mutable runtime configuration of the first application;

determine, using the third optimization algorithm, a fourth set of updated application settings relating to the mutable runtime configuration of the first application; and cause, using the at least one network device, the fourth set of updated application settings to be deployed at the first application to thereby cause the first application to operate in accordance with a fifth runtime configuration.

3. The computer implemented method of claim 1 wherein the at least one network component includes a servo component deployed at the remote networked environment and configured or designed to implement instructions received from the Optimizer System, and to initiate interactions with the first application in response to the received instructions.

4. The computer implemented method of claim 1 wherein the at least one network component includes a servo component deployed at the Optimizer System and configured or designed to implement instructions generated by the Optimizer System and to initiate interactions with the first application in response to the instructions.

5. The computer implemented method of claim 1 further comprising causing the at least one processor to execute additional instructions to:

calculate, using the first measurement information, a first performance indicator of the first application, the first performance indicator being representative of a first performance of the first application while operating in accordance with the first runtime configuration;

calculate, using information relating to the first runtime configuration, a first cost indicator of the first application, the first cost indicator being representative of a first cost of resources utilized for operating the first application in accordance with the first runtime configuration;

wherein the first score is calculated using the first performance indicator and first cost indicator;

calculate, using the second measurement information, a second performance indicator of the first application, the second performance indicator being representative of a second performance of the first application while operating in accordance with the second runtime configuration;

calculate, using information relating to the second runtime configuration, a second cost indicator of the first application, the second cost indicator being representative of a second cost of resources utilized for operating the first application in accordance with the second runtime configuration; and wherein the second score is calculated using the second performance indicator and second cost indicator.

6. The computer implemented method of claim 1 wherein the first reward corresponds to the second score.

7. The computer implemented method of claim 1 wherein the first reward is calculated based on a comparison of the second score and the first score.

8. The computer implemented method of claim 1 further comprising causing the at least one processor to execute additional instructions to:

calculate, using the first measurement information, a first performance measurement of the first application;

calculate, using information relating to the first runtime configuration, a first cost of the application;

wherein the first score is calculated using the first performance measurement and first cost; and wherein the first scoring function corresponds to a scoring function selected from a group consisting of:

performance measurement/cost;

performance measurement W1/cost, where W1 represents a weighted value;

performance measurement, where cost is represented as constant;

performance measurement bounded by a maximum cost; and cost while maintaining a minimum performance measurement value.

9. The computer implemented method of claim 1:

wherein at least one set of updated application settings is selected from a group consisting of:

at least one virtual machine associated with the first application;

at least one container associated with the first application;

at least one CPU core associated with the first application;

at least one memory associated with the first application;

network bandwidth associated with the first application;

at least one provisioned disk TOPS associated with the first application;

at least one resource setting associated with the first application; and number of replicas of a component deployed at the first application.

10. The computer implemented method of claim 1:

wherein at least one set of updated application settings is selected from a group consisting of:
the number of Apache worker threads associated with the first application;
My SQL memory pool size associated with the first application;
kernel tuning parameters associated with the first application;
number of virtualized components of the first application which are co-located on a same physical machine; and
number of virtualized container components of the first application which are co-located on a same host.

11. The computer implemented method of claim 1 wherein at least one selected optimization algorithm corresponds to a reinforced learning algorithm configured or designed to employ Q-learning using a neural network as a Q function.

12. The computer implemented method of claim 1:
wherein the first optimization algorithm corresponds to a first type of optimization algorithm selected from a group consisting of: a reinforced learning algorithm configured or designed to employ Q-learning using a neural network as a Q function, a Bayesian algorithm, an Evolutionary algorithm, an Ouch heuristic algorithm, a Stochastic algorithm, and a Bruteforce algorithm;
wherein the second optimization algorithm corresponds to a second type of optimization algorithm selected from a group consisting of: a reinforced learning algorithm configured or designed to employ Q-learning using a neural network as a Q function, a Bayesian algorithm, an Evolutionary algorithm, an Ouch heuristic algorithm, a Stochastic algorithm, and a Bruteforce algorithm; and
wherein the first type of optimization algorithm is different from the second type of optimization algorithm.

13. The computer implemented method of claim 1 further comprising causing the at least one processor to execute instructions to cause at least one set of updated application settings to be deployed at the first application while the first application is running in a live production environment.

14. The computer implemented method of claim 1 further comprising causing the at least one processor to execute instructions to cause at least one set of updated application settings to be deployed at the first application while the first application is running in a test bed environment.

15. The computer implemented method of claim 1 further comprising causing the at least one processor to execute instructions to cause at least one set of updated application settings to be deployed at the first application while the first application is running in a canary environment.

16. The computer implemented method of claim 1 wherein the method is implemented as a SaaS service which is configured or designed to utilize the Optimizer System to remotely and securely optimize the first application.

17. A computer implemented system for optimizing a mutable runtime configuration of a first application hosted at a remote networked environment, the remote networked environment being communicatively coupled to a computer network, the computer network including an Optimizer System, the Optimizer System including a first set of optimizer algorithms, the system comprising:
at least one non-transient memory;
at least one processor operable to execute a plurality of instructions stored in the at least one non-transient memory to:

cause at least one network device to initiate a first measurement of a first operational metric of the first application while the first application is operating in accordance with a first runtime configuration;
cause the at least one network device to transmit first measurement information to the Optimizer System, where the first measurement information relates to the first measurement of the first operational metric of the first application;
calculate, using the first measurement information, a first score in relation to a first optimization objective, the first score being calculated using a first scoring function;
determine, at the Optimizer System, a first set of updated application settings relating to the mutable runtime configuration of the first application;
cause, using the at least one network device, the first set of updated application settings to be deployed at the first application to thereby cause the first application to operate in accordance with a second runtime configuration;
cause the at least one network device to initiate a second measurement of the first operational metric of the first application while the first application is operating in accordance with the second runtime configuration;
cause the at least one network device to transmit second measurement information to the Optimizer System, where the second measurement information relates to the second measurement of the first operational metric of the first application;
calculate, using the second measurement information, a second score in relation to the first optimization objective, the second score being calculated using the first scoring function;
compute, using the second and first scores, a first reward;
update the first set of optimization algorithms using information relating to the first reward;
select, from the first set of optimization algorithms, a first optimization algorithm to be used for determining a second set of updated application settings relating to the mutable runtime configuration of the first application;
determine, using the first optimization algorithm, a second set of updated application settings relating to the mutable runtime configuration of the first application;
cause, using the at least one network device, the second set of updated application settings to be deployed at the first application to thereby cause the first application to operate in accordance with a third runtime configuration;
cause the at least one network device to initiate a third measurement of the first operational metric of the first application while the first application is operating in accordance with the third runtime configuration;
cause the at least one network device to transmit third measurement information to the Optimizer System, where the third measurement information relates to the third measurement of the first operational metric of the first application;
calculate, using the third measurement information, a third score in relation to the first optimization objective, the third score being calculated using the first scoring function;
compute, using the second and third scores, a second reward;
update the first set of optimization algorithms using information relating to the second reward;

select, from the first set of optimization algorithms, a second optimization algorithm to be used for determining a third set of updated application settings relating to the mutable runtime configuration of the first application;

determine, using the second optimization algorithm, a third set of updated application settings relating to the mutable runtime configuration of the first application;

cause, using the at least one network device, the third set of updated application settings to be deployed at the first application to thereby cause the first application to operate in accordance with a fourth runtime configuration; and determine, at the Optimizer System, if additional cycles of optimization adjustment are to be performed for the first application.

18. The computer implemented system of claim 17 being further operable to cause, if it is determined that additional cycles of optimization adjustment are to be performed for the first application, the at least one processor to execute additional instructions to:

causing the at least one processor to execute additional instructions to:

cause the at least one network device to initiate a fourth measurement of the first operational metric of the first application while the first application is operating in accordance with the fourth runtime configuration;

cause the at least one network device to transmit forth measurement information to the Optimizer System, where the fourth measurement information relates to the fourth measurement of the first operational metric of the first application;

calculate, using the fourth measurement information, a fourth score in relation to the first optimization objective, the fourth score being calculated using the first scoring function;

compute, using the third and fourth scores, a third reward;

update the first set of optimization algorithms using information relating to the third reward;

select, from the first set of optimization algorithms, a third optimization algorithm to be used for determining a fourth set of updated application settings relating to the mutable runtime configuration of the first application;

determine, using the third optimization algorithm, a fourth set of updated application settings relating to the mutable runtime configuration of the first application; and cause, using the at least one network device, the fourth set of updated application settings to be deployed at the first application to thereby cause the first application to operate in accordance with a fifth runtime configuration.

19. The computer implemented system of claim 17 wherein the at least one network component includes a servo component deployed at the remote networked environment and configured or designed to implement instructions received from the Optimizer System, and to initiate interactions with the first application in response to the received instructions.

20. The computer implemented system of claim 17 wherein the at least one network component includes a servo component deployed at the Optimizer System and configured or designed to implement instructions generated by the Optimizer System and to initiate interactions with the first application in response to the instructions.

21. The computer implemented system of claim 17 being further operable to cause the at least one processor to execute additional instructions to:

calculate, using the first measurement information, a first performance indicator of the first application, the first performance indicator being representative of a first performance of the first application while operating in accordance with the first runtime configuration;

calculate, using information relating to the first runtime configuration, a first cost indicator of the first application, the first cost indicator being representative of a first cost of resources utilized for operating the first application in accordance with the first runtime configuration;

wherein the first score is calculated using the first performance indicator and first cost indicator;

calculate, using the second measurement information, a second performance indicator of the first application, the second performance indicator being representative of a second performance of the first application while operating in accordance with the second runtime configuration;

calculate, using information relating to the second runtime configuration, a second cost indicator of the first application, the second cost indicator being representative of a second cost of resources utilized for operating the first application in accordance with the second runtime configuration; and wherein the second score is calculated using the second performance indicator and second cost indicator.

22. The computer implemented system of claim 17 wherein the first reward corresponds to the second score.

23. The computer implemented system of claim 17 wherein the first reward is calculated based on a comparison of the second score and the first score.

24. The computer implemented system of claim 17 being further operable to cause the at least one processor to execute additional instructions to:

calculate, using the first measurement information, a first performance measurement of the first application;

calculate, using information relating to the first runtime configuration, a first cost of the application;

wherein the first score is calculated using the first performance measurement and first cost; and wherein the first scoring function corresponds to a scoring function selected from a group consisting of:

performance measurement/cost;

performance measurement W1/cost, where W1 represents a weighted value;

performance measurement, where cost is represented as constant;

performance measurement bounded by a maximum cost; and cost while maintaining a minimum performance measurement value.

25. The computer implemented system of claim 17:

wherein at least one set of updated application settings is selected from a group consisting of:

at least one virtual machine associated with the first application;

at least one container associated with the first application;

at least one CPU core associated with the first application;

at least one memory associated with the first application;

network bandwidth associated with the first application;

at least one provisioned disk TOPS associated with the first application;

at least one resource setting associated with the first application; and
number of replicas of a component deployed at the first application.

26. The computer implemented system of claim 17:
wherein at least one set of updated application settings is selected from a group consisting of:
the number of Apache worker threads associated with the first application;
My SQL memory pool size associated with the first application;
kernel tuning parameters associated with the first application;
number of virtualized components of the first application which are co-located on a same physical machine; and
number of virtualized container components of the first application which are co-located on a same host.

27. The computer implemented system of claim 17 wherein at least one selected optimization algorithm corresponds to a reinforced learning algorithm configured or designed to employ Q-learning using a neural network as a Q function.

28. The computer implemented system of claim 17:
wherein the first optimization algorithm corresponds to a first type of optimization algorithm selected from a group consisting of: a reinforced learning algorithm configured or designed to employ Q-learning using a neural network as a Q function, a Bayesian algorithm, an Evolutionary algorithm, an Ouch heuristic algorithm, a Stochastic algorithm, and a Bruteforce algorithm;
wherein the second optimization algorithm corresponds to a second type of optimization algorithm selected from a group consisting of: a reinforced learning algorithm configured or designed to employ Q-learning using a neural network as a Q function, a Bayesian algorithm, an Evolutionary algorithm, an Ouch heuristic algorithm, a Stochastic algorithm, and a Bruteforce algorithm; and
wherein the first type of optimization algorithm is different from the second type of optimization algorithm.

29. The computer implemented system of claim 17 being further operable to cause the at least one processor to execute instructions to cause at least one set of updated application settings to be deployed at the first application while the first application is running in a live production environment.

30. The computer implemented system of claim 17 being further operable to cause the at least one processor to execute instructions to cause at least one set of updated application settings to be deployed at the first application while the first application is running in a test bed environment.

31. The computer implemented system of claim 17 being further operable to cause the at least one processor to execute instructions to cause at least one set of updated application settings to be deployed at the first application while the first application is running in a canary environment.

32. The computer implemented system of claim 17 wherein the system is implemented as a SaaS service which is configured or designed to utilize the Optimizer System to remotely and securely optimize the first application.

33. A non-transitory computer usable medium for use in a computer network, the computer network including a first application hosted at a remote networked environment, and including an Optimizer System configured to access a first set of optimizer algorithms, the computer network further including at least one processor, the computer usable medium having computer readable code embodied therein, the computer readable code comprising computer code for causing at least one processor to execute instructions stored in at least one memory to:
cause at least one network device to initiate a first measurement of a first operational metric of the first application while the first application is operating in accordance with a first runtime configuration;
cause the at least one network device to transmit first measurement information to the Optimizer System, where the first measurement information relates to the first measurement of the first operational metric of the first application;
calculate, using the first measurement information, a first score in relation to a first optimization objective, the first score being calculated using a first scoring function;
determine, at the Optimizer System, a first set of updated application settings relating to the mutable runtime configuration of the first application;
cause, using the at least one network device, the first set of updated application settings to be deployed at the first application to thereby cause the first application to operate in accordance with a second runtime configuration;
cause the at least one network device to initiate a second measurement of the first operational metric of the first application while the first application is operating in accordance with the second runtime configuration;
cause the at least one network device to transmit second measurement information to the Optimizer System, where the second measurement information relates to the second measurement of the first operational metric of the first application;
calculate, using the second measurement information, a second score in relation to the first optimization objective, the second score being calculated using the first scoring function;
compute, using the second and first scores, a first reward;
update the first set of optimization algorithms using information relating to the first reward;
select, from the first set of optimization algorithms, a first optimization algorithm to be used for determining a second set of updated application settings relating to the mutable runtime configuration of the first application;
determine, using the first optimization algorithm, a second set of updated application settings relating to the mutable runtime configuration of the first application;
cause, using the at least one network device, the second set of updated application settings to be deployed at the first application to thereby cause the first application to operate in accordance with a third runtime configuration;
cause the at least one network device to initiate a third measurement of the first operational metric of the first application while the first application is operating in accordance with the third runtime configuration;
cause the at least one network device to transmit third measurement information to the Optimizer System, where the third measurement information relates to the third measurement of the first operational metric of the first application;

calculate, using the third measurement information, a third score in relation to the first optimization objective, the third score being calculated using the first scoring function;

compute, using the second and third scores, a second reward;

update the first set of optimization algorithms using information relating to the second reward;

select, from the first set of optimization algorithms, a second optimization algorithm to be used for determining a third set of updated application settings relating to the mutable runtime configuration of the first application;

determine, using the second optimization algorithm, a third set of updated application settings relating to the mutable runtime configuration of the first application;

cause, using the at least one network device, the third set of updated application settings to be deployed at the first application to thereby cause the first application to operate in accordance with a fourth runtime configuration; and determine, at the Optimizer System, if additional cycles of optimization adjustment are to be performed for the first application.

* * * * *